US008244551B1

(12) United States Patent  
Mund

(10) Patent No.: US 8,244,551 B1  
(45) Date of Patent: Aug. 14, 2012

(54) APPARATUSES, METHODS AND SYSTEMS FOR ADVANCEMENT PATH CANDIDATE CLONING

(75) Inventor: Matthew Mund, Maynard, MA (US)

(73) Assignee: Monster Worldwide, Inc., New York, NY (US)

( * ) Notice: Subject to any disclaimer, the term of this patent is extended or adjusted under 35 U.S.C. 154(b) by 403 days.

(21) Appl. No.: 12/427,736

(22) Filed: Apr. 21, 2009

Related U.S. Application Data

(60) Provisional application No. 61/046,767, filed on Apr. 21, 2008.

(51) Int. Cl.
*G06Q 10/00* (2006.01)

(52) U.S. Cl. ............................ 705/1.1; 705/320; 705/321

(58) Field of Classification Search .......................... None
See application file for complete search history.

(56) References Cited

U.S. PATENT DOCUMENTS

| | | | |
|---|---|---|---|
| 4,912,648 | A | 3/1990 | Tyler |
| 5,416,694 | A | 5/1995 | Parrish et al. |
| 5,963,910 | A | 10/1999 | Ulwick |
| 5,978,767 | A | 11/1999 | Chriest et al. |
| 6,460,025 | B1 | 10/2002 | Fohn et al. |
| 6,567,784 | B2 | 5/2003 | Bukow |
| 7,292,243 | B1 | 11/2007 | Burke |
| 7,702,515 | B2 | 4/2010 | Fujino et al. |
| 7,827,117 | B2 | 11/2010 | MacDaniel et al. |
| 2002/0002479 | A1 | 1/2002 | Almog et al. |
| 2002/0194056 | A1 | 12/2002 | Summers |
| 2003/0177027 | A1 | 9/2003 | DiMarco |
| 2003/0182173 | A1 | 9/2003 | D'Elena et al. |
| 2003/0220811 | A1 | 11/2003 | Fan et al. |
| 2004/0128282 | A1 | 7/2004 | Kleinberger et al. |
| 2005/0050440 | A1 | 3/2005 | Meteyer et al. |
| 2005/0096973 | A1 | 5/2005 | Heyse et al. |
| 2005/0114203 | A1 | 5/2005 | Savitsky et al. |
| 2005/0125283 | A1 | 6/2005 | Fan et al. |
| 2006/0178896 | A1 | 8/2006 | Sproul |
| 2006/0265266 | A1 | 11/2006 | Chen et al. |
| 2006/0265267 | A1 | 11/2006 | Chen et al. |
| 2006/0265268 | A1 * | 11/2006 | Hyder et al. ...................... 705/9 |
| 2006/0265269 | A1 | 11/2006 | Hyder et al. |
| 2006/0265270 | A1 | 11/2006 | Hyder et al. |
| 2007/0190504 | A1 * | 8/2007 | Schwartz et al. ............. 434/219 |
| 2007/0203710 | A1 | 8/2007 | Habichler et al. |
| 2007/0271109 | A1 | 11/2007 | Wang et al. |
| 2007/0273909 | A1 | 11/2007 | Chen et al. |

(Continued)

*Primary Examiner* — Jonathan Ouellette  
(74) *Attorney, Agent, or Firm* — Walter G. Hanchuk; Chadbourne & Parke LLP

(57) ABSTRACT

The APPARATUSES, METHODS AND SYSTEMS FOR ADVANCEMENT PATH CANDIDATE CLONING ("CLONER") provides mechanisms allowing advancement seekers to identify, map out, structure and interact with various advancement paths to the seeker's goals. In one embodiment, the seekers are career advancement seekers, and the CLONER provides mechanisms allowing the seeker to explore various career paths and opportunities. In one embodiment, the CLONER interacts with a statistical engine, which allows seekers to map their experiences to various advancement states in the statistical engines state structure. By so doing, it allows seeker to explore multiple paths based on various criteria, and allows seekers to plan their career goals. In the process, the CLONER allows interested parties (e.g., an employer) to supply a good known seeker (e.g., a great current employee) and identify other candidates that have similar and/or identical experience in an attempt to "clone" the known seeker's abilities. In other embodiments, the seekers may be students wishing to advance their academic advancements. In yet other embodiments, the seekers are financial seekers who wish to achieve their financial goals.

20 Claims, 63 Drawing Sheets

U.S. PATENT DOCUMENTS

| | | |
|---|---|---|
| 2007/0288308 A1 | 12/2007 | Chen et al. |
| 2008/0133595 A1 | 6/2008 | Hyder et al. |
| 2008/0140680 A1 | 6/2008 | Hyder et al. |
| 2009/0138335 A1 | 5/2009 | Lieberman |
| 2009/0164282 A1 | 6/2009 | Goldberg |
| 2009/0198558 A1 | 8/2009 | Chen et al. |

* cited by examiner

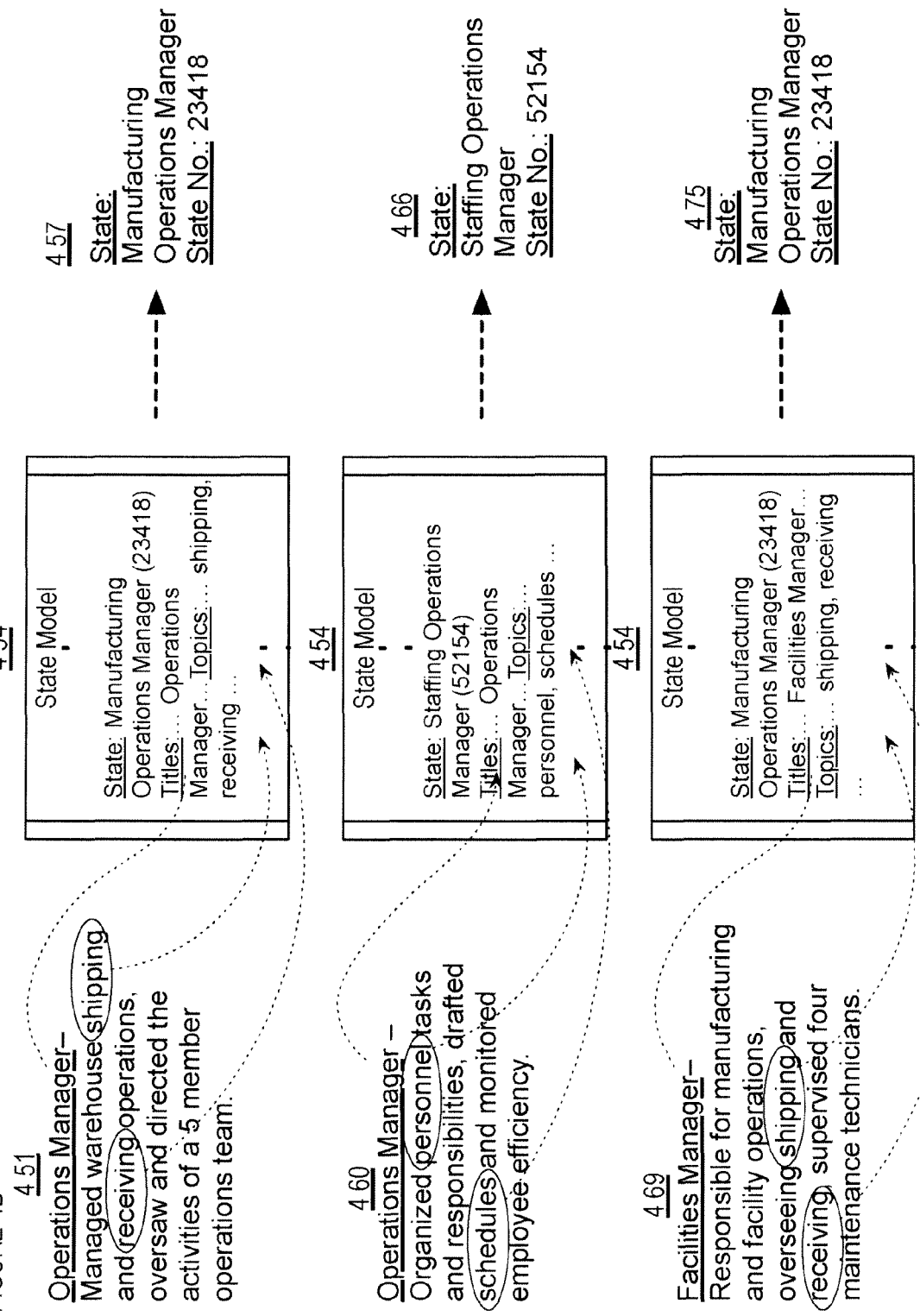

Figure 18    Path-Independent Stepwise CPS

FIG. 25G

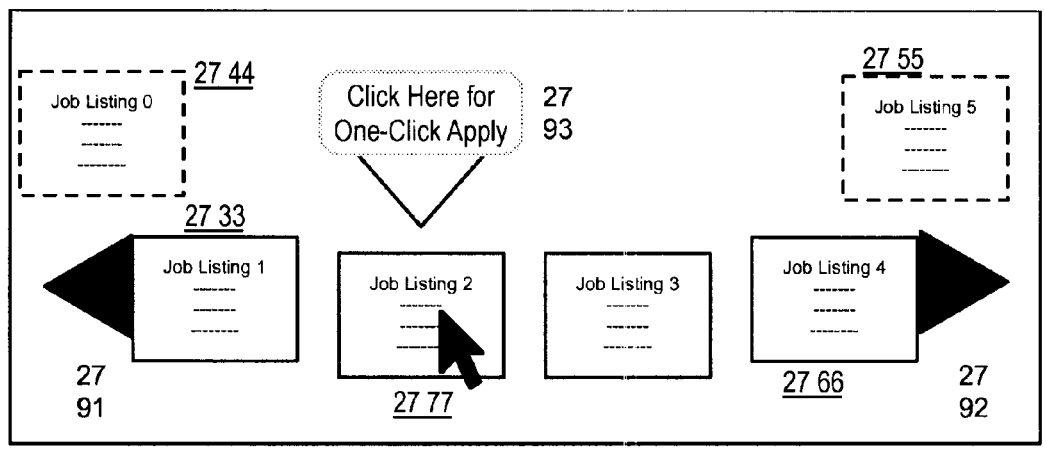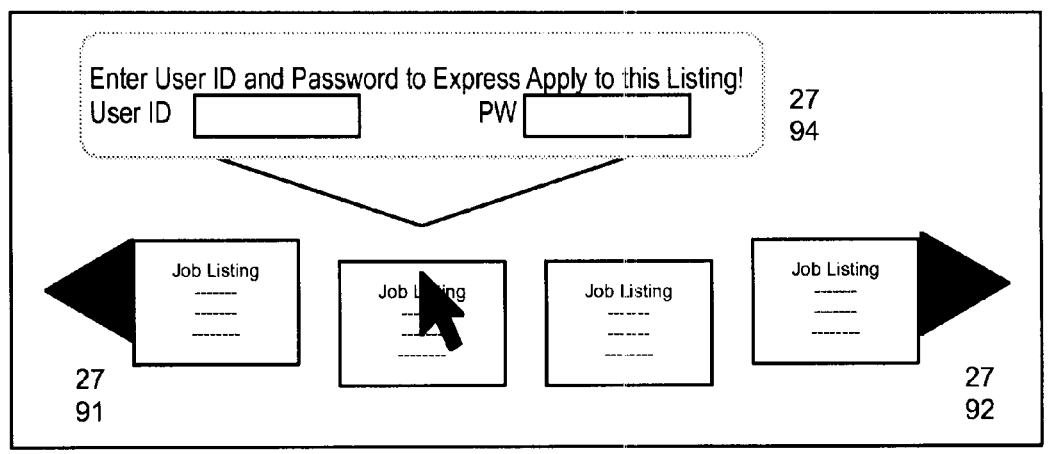
Figure 27

APPARATUSES, METHODS AND SYSTEMS FOR ADVANCEMENT PATH CANDIDATE CLONING

RELATED APPLICATIONS

Applicant hereby claims priority under 35 USC §119 for United States provisional patent application Ser. No. 61/046,767 filed Apr. 21, 2008, entitled "APPARATUSES, METHODS AND SYSTEMS FOR CAREER PATHING,".

The entire contents of the aforementioned application is herein expressly incorporated by reference.

FIELD

The present invention is directed generally to an apparatuses, methods, and systems of human resource management, and more particularly, to APPARATUSES, METHODS AND SYSTEMS FOR ADVANCEMENT PATH CANDIDATE CLONING.

BACKGROUND

People seeking employment traditionally have looked to job listings in printed media such as newspapers or through employment and/or career services bureaus. More recently internet web services have come about, providing the ability to search through job postings and/or unstructured job bulletins. For example, job seekers can look to printed listings, university career websites and company websites in order to find information about the required and/or recommended qualifications needed for specific jobs. To acquire a sense of which jobs a job seeker may be suited for and what advancement actions to take to acquire those jobs, job seekers may turn to career counselors or job-hunting books for recommendations or advice.

SUMMARY

The APPARATUSES, METHODS AND SYSTEMS FOR ADVANCEMENT PATH CANDIDATE CLONING ("CLONER") provides mechanisms allowing advancement seekers to identify, map out, structure and interact with various advancement paths to the seeker's goals. In one embodiment, the seekers are career advancement seekers, and the CLONER provides mechanisms allowing the seeker to explore various career paths and opportunities. In one embodiment, the CLONER interacts with a statistical engine, which allows seekers to map their experiences to various advancement states in the statistical engines state structure. By so doing, it allows seeker to explore multiple paths based on various criteria, and allows seekers to plan their career goals. In the process, the CLONER allows interested parties (e.g., an employer) to supply a good known seeker (e.g., a great current employee) and identify other candidates that have similar and/or identical experience in an attempt to "clone" the known seeker's abilities. In other embodiments, the seekers may be students wishing to advance their academic advancements. In yet other embodiments, the seekers are financial seekers who wish to achieve their financial goals.

BRIEF DESCRIPTION OF THE DRAWINGS

The accompanying appendices and/or drawings illustrate various non-limiting, example, inventive aspects in accordance with the present disclosure:

FIG. 4B shows a schematic illustration of experience to state conversion in one embodiment of CSE operation;

Figure 25G:
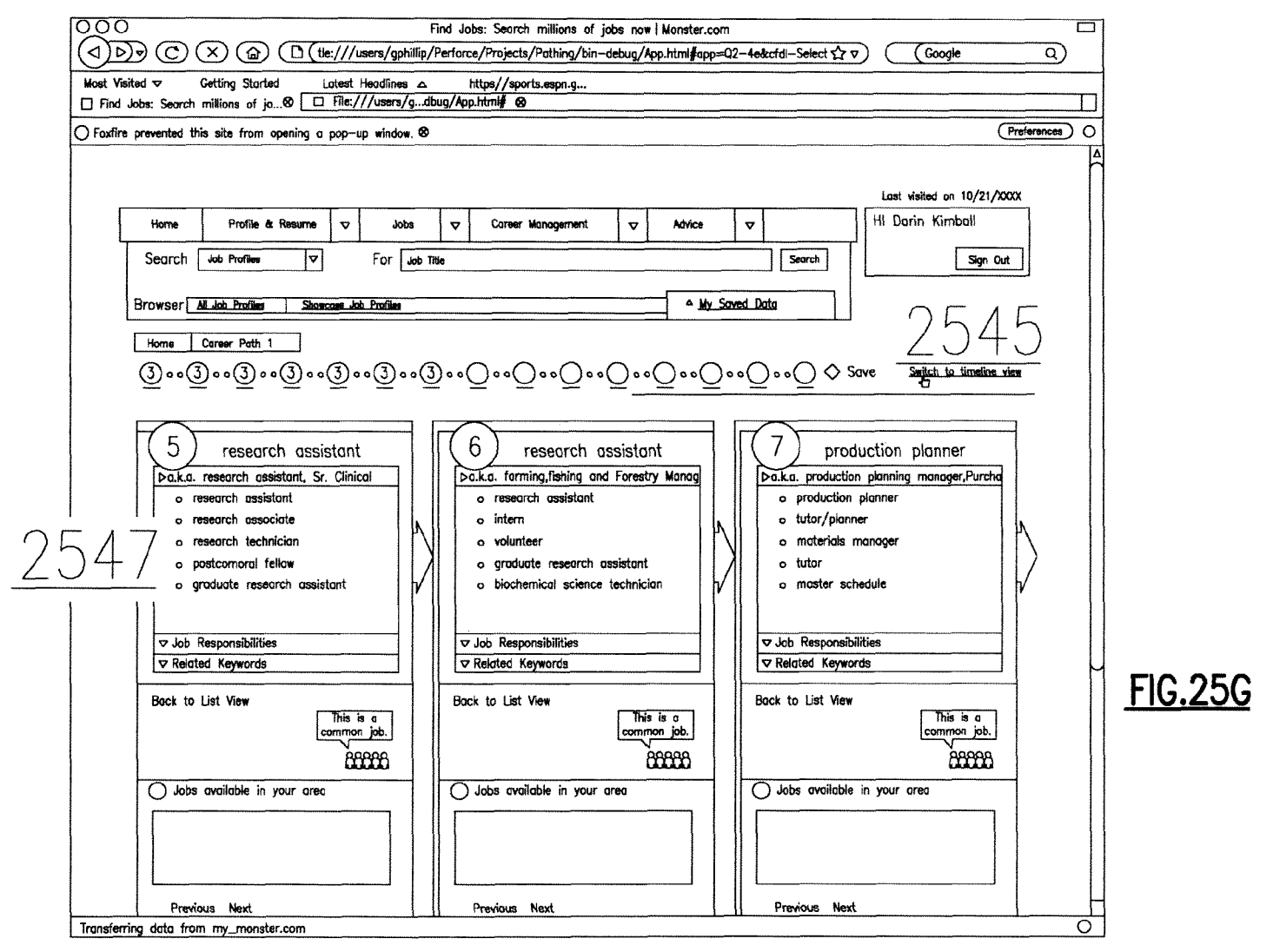

FIGS. 24A-24H, 25A-25G, and 26A-26H are of a screen shot diagram illustrating embodiments of the CLONER;

FIG. 27 is a block diagram illustrating job carousel embodiments of the CLONER;

FIG. 32 is of a block diagram illustrating benchmarking interface embodiments for the CLONER;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Career Statistical Engine

FIGS. 1-14B detail a career statistical engine (hereinafter, "CSE) component of the APPARATUSES, METHODS AND SYSTEMS FOR ADVANCEMENT PATH CANDIDATE CLONING (hereinafter "CLONER"), which is detailed in the remaining figures. The CSE allows for the generation and statistical mapping of an advancement state structure, which furthers analysis associated with job market analysis, job search strategies, career counseling, educational advancement, financial advancement, and/or the like. It is to be understood that depending on the particular needs and/or characteristics of a job seeker, employer, career counselor, system operator, hardware implementation, network environment, and/or the like, various embodiments of the CLONER may include a career statistical engine component, which may include implementations allowing a great deal of flexibility and customization. The instant disclosure discusses an embodiment of the CSE within the context of job market analysis, career path modeling, job search strategies/recommendations, and/or the like. However, it is to be understood that the CSE may be readily configured/customized for a wide range of other applications or implementations. For example, aspects of the CSE may be adapted for operation within a single computer system or over a network, for use in educational path modeling and/or recommendations, task management, skill development; and/or the like. It is to be understood that the CSE may be further adCLONERcd adapted to other implementations or experience analysis and management applications.

Figure 1:
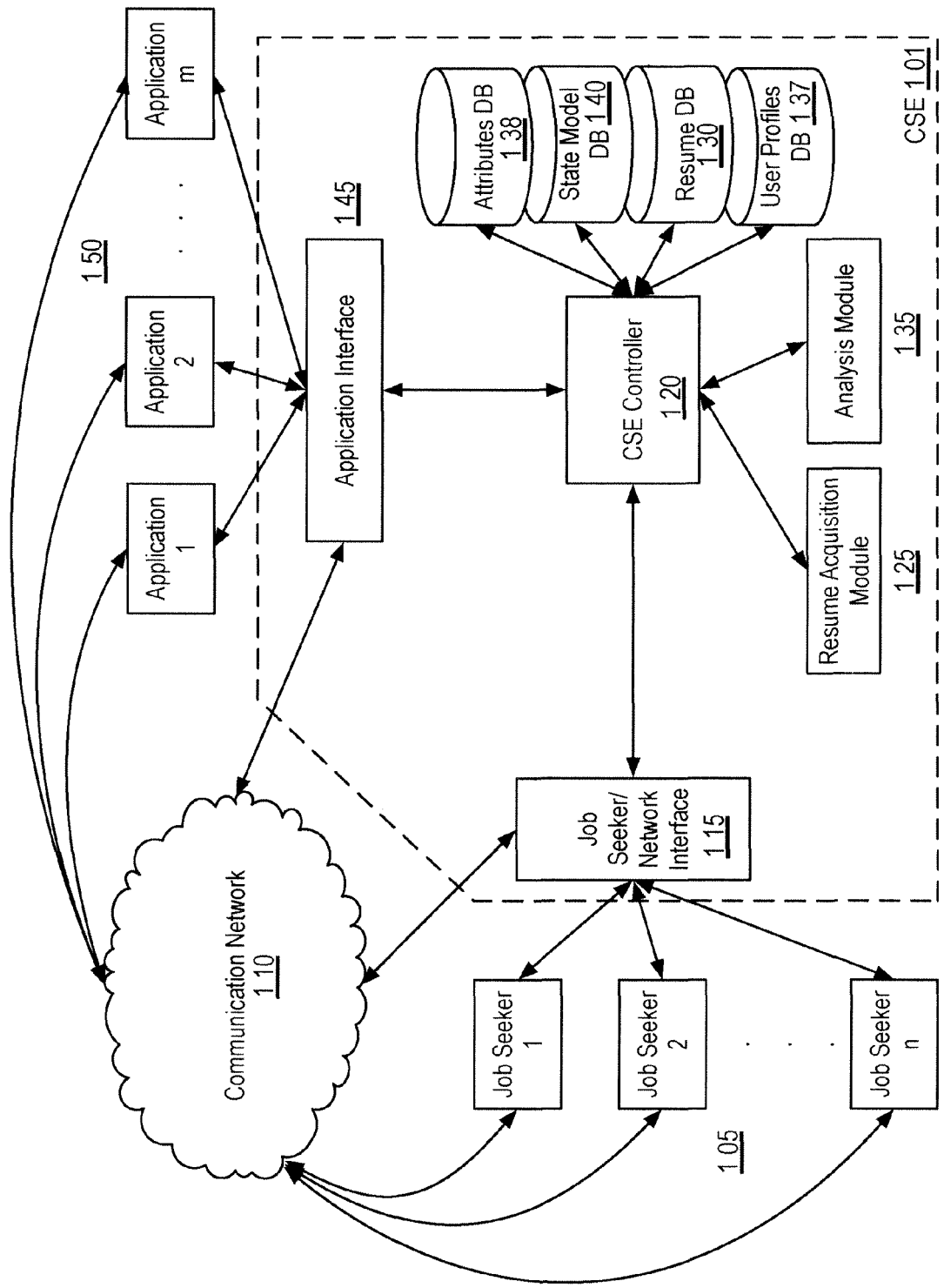
FIG. 1 shows an overview of entities and data flow in one embodiment of career statistical engine ("CSE") operation.

FIG. 1 shows an overview of entities and data flow in one embodiment of CSE operation. The CSE 101 may be configured to allow a plurality of job seekers (Job Seeker 1, Job Seeker 2, . . . , Job Seeker N) 105 to interact with the CSE and/or engage CSE functionality. A job seeker may communicate with the CSE, such as via a communications network 110, and/or directly via a job seeker/network interface 115. The job seeker/network interface 115 may be coupled to a CSE controller 120, which may serve a central role in facilitating CSE functionality and mediating communications and/or data exchanges between CSE modules, databases, and/or the like. The CSE controller 120 may be further coupled to a resume acquisition module 125, configured to receive and process resumes from job seekers 105. In alternative embodiments, the CSE may be configured to receive and/or process one or more of a variety of different experiential sequences, such as educational transcripts, task lists, award histories, military records, and/or the like. The CSE Controller 120 may further be coupled to an analysis module 135, configured to analyze received resumes and to determine statistical relationships between and among experiences, job titles, education levels, accomplishments, and/or the like listed therein. The CSE Controller 120 may further be coupled to a plurality of databases storing data received and/or processed by the CSE. Such databases may include, for example, an attributes database 138, storing attributes data derived from submitted resumes; a state model database 140, storing elements of the state model; a resume database 130, storing received resumes and/or resume-derived information; and a user profiles database 137, storing user accounts, user information, and/or the like. The CSE controller 120 may further be coupled to an application interface 145 configured to process for and/or relay CSE processed data to one or more external applications (Application 1, Application 2, . . . , Application m) 150.

Figure 2:
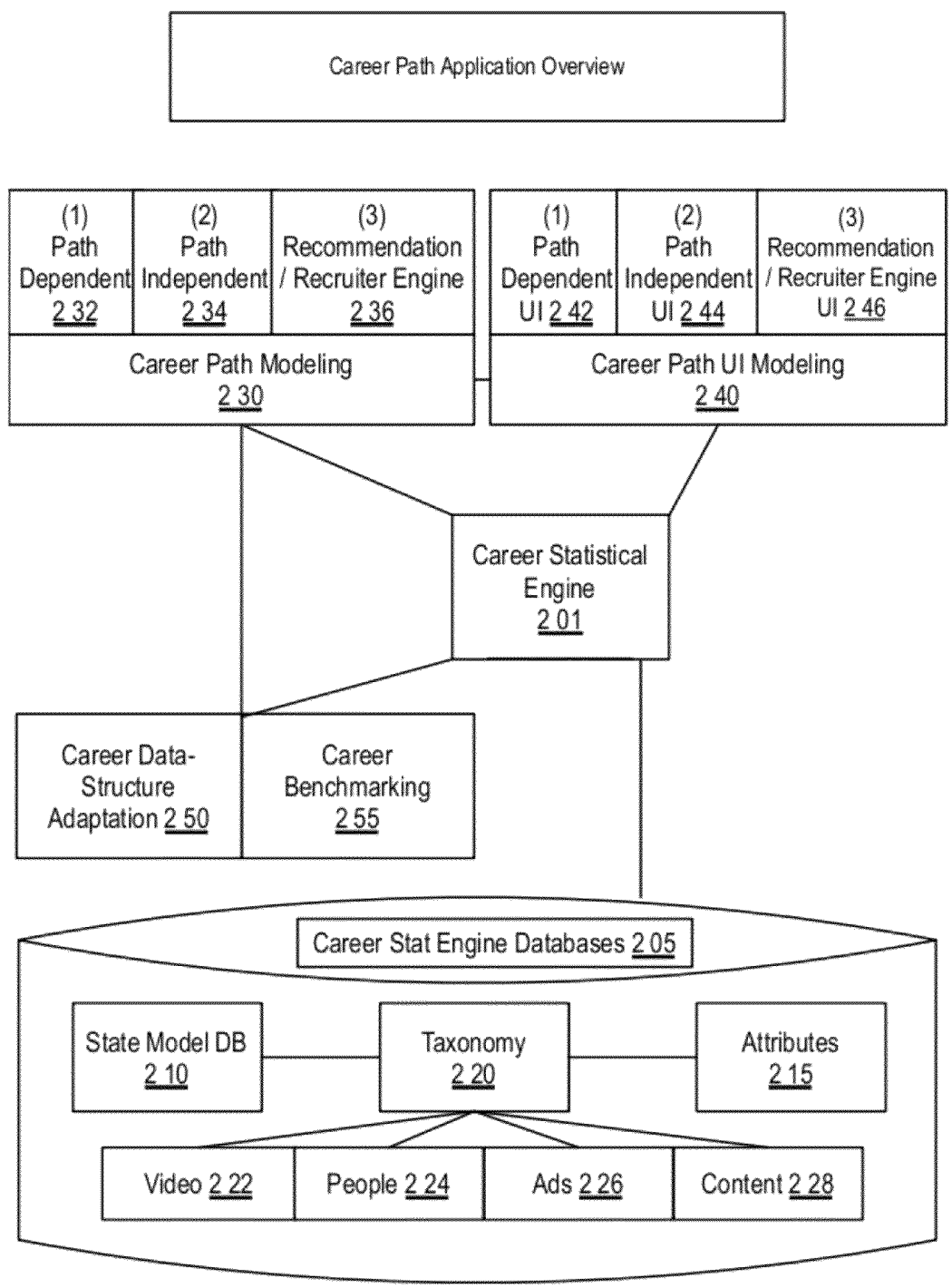
FIG. 2 shows an implementation of application modules and databases communicatively coupled to the CSE in one embodiment of CSE operation.

FIG. 2 shows an implementation of application modules and databases communicatively coupled to the CSE 201 in one embodiment of CSE operation. The illustrated CSE Application overview includes Career Path Modeling 230, as well as Career Path User Interface system 240 features driven data processed, analyzed and coordinated by the underlying CSE 201 and/or associated Databases 205. In various embodiments, Career Path Modeling 230 may be based on path-dependent 232 and/or path independent 234 state model implementations and/or may further couple to a recommendation/recruiter engine 236. Similarly, in various embodiments, Career Path UI Modeling 240 may be based on path-dependent 242 and/or path independent 244 state model implementations and/or may further couple to a recommendation/recruiter engine 246 The CSE 201 may also coordinate Career Data Structure Adaptation 250 and Career Benchmarking 255 features. The CSE manages data associated with various system processes in CSE Databases 205 that include State Model database 210, Taxonomy database 220 and Attribute Database 215 information, as well as the underlying Video 222, People 224, Ads 226, and other content 228 that may be incorporated into various implementations of the system. Further, in some implementations, the CSE Databases also coordinates the relationships/associations between these modules, as well.

Figure 3A:
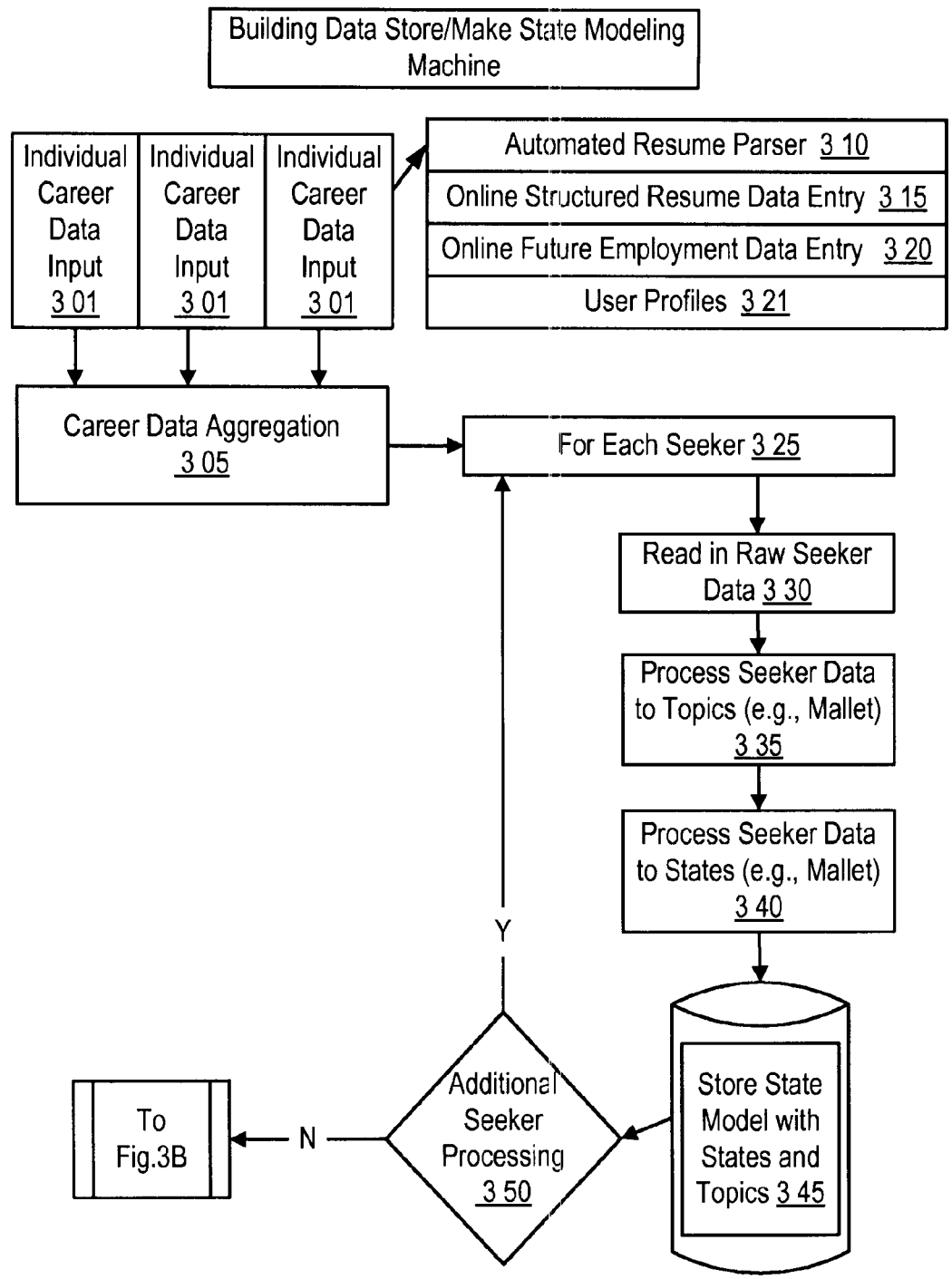
FIG. 3A shows an implementation of combined logic and data flow for acquiring and processing career data inputs in one embodiment of CSE operation.

FIG. 3A shows an implementation of combined logic and data flow for acquiring and processing career data inputs in one embodiment of CSE operational. A plurality of individual career data inputs 301, such as resume data, profile data, and/or the like may be input to a career data aggregation module 305. In one implementation, free-form resume data may be parsed by an automated resume parses 310, such as may be based on resume templates. In another implementation, resume data may be input as structured inputs in an online structured resume data entry module 315, such as a web form interface admitting experiential, educational, and/or the like resume data inputs from users. In another implementation, future or prospective employment information may be entered via an online future employment data entry module 320. In another implementation, user profile information may be entered 321, such as may be received from a user profile database. In one implementation, a seed set of raw seeker data (e.g., of structured resume data) may be processed initially by the CSE to yield an initial state model, topic model, and/or the like. For each job seeker 325, the CSE may read in raw seeker data 330, such as resume data, profile data, and/or the like. Elements of the raw seeker data, such as job titles, start and/or end dates of employment experiences, and/or the like may then be processed to discern a plurality of job state classifications, job states, states, and/or the like 335. In one implementation, statistical analysis of raw seeker job titles and/or other work experience data may be undertaken by a statistical analysis toolkit, such as by the Mallet toolkit available at http://mallet.cs.umass.edu, to discern job states and/or other classifications. Elements of the raw seeker data, such as work experience descriptions, may further be processed to discern a plurality of topics and associated terms and/or phrases 340. For example, in one implementation, job seeker work experience description data may be processed by elements of the Mallet toolkit to discern a plurality of topics comprising common terms and/or phases appearing in those descriptions. Discerned states and/or topics may then be coalesced into a state model, and the state model may be stored in a database 345. A determination may then be made as to whether there is additional seeker processing to undertake 350. If so, then the CSE may return to 325. Otherwise, the CSE may proceed to determining and assigning topic weights to states in the state model, as shown in one implementation in FIG. 3B.

Figure 3B:
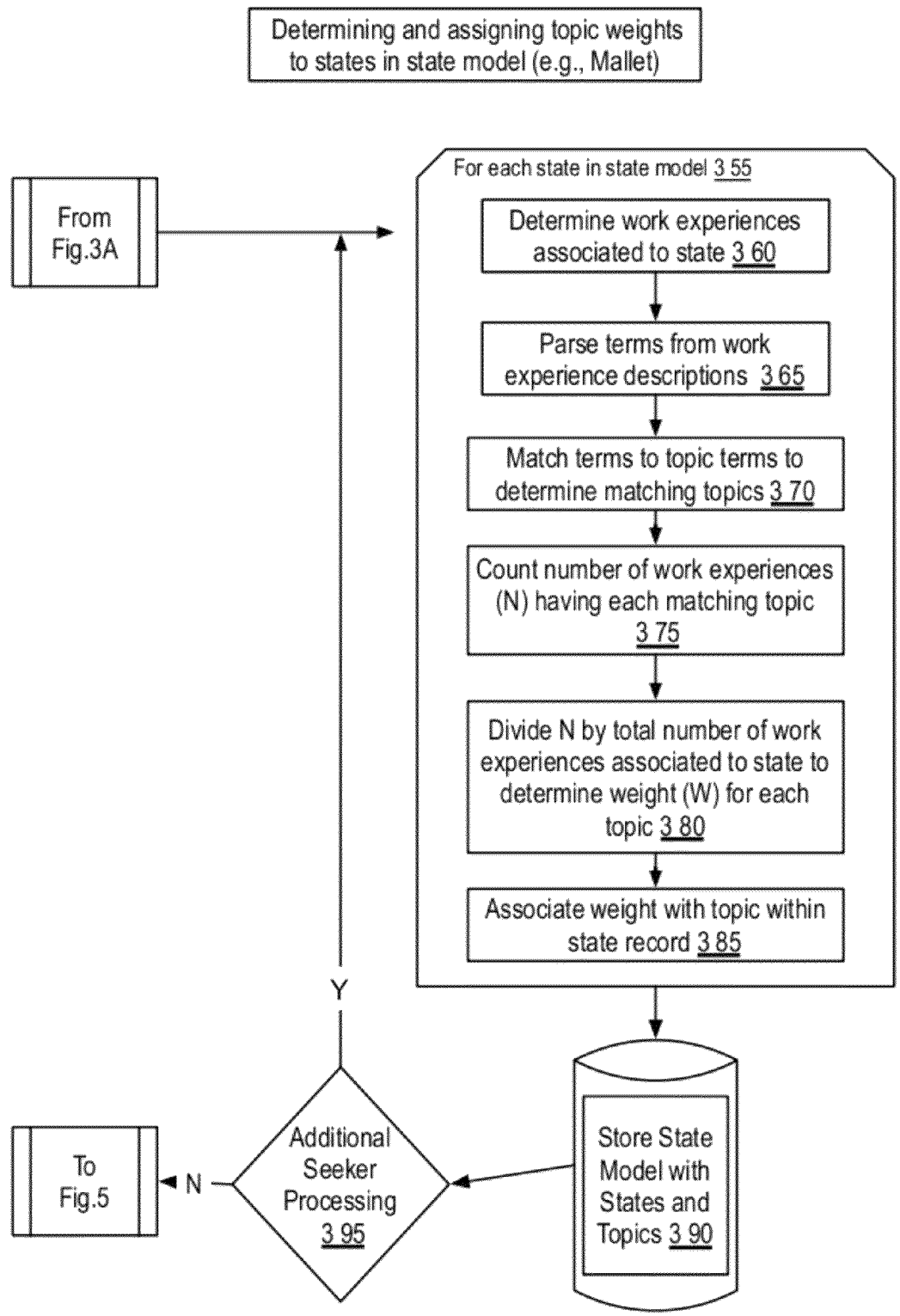
FIG. 3B shows an implementation of combined logic and data flow for processing career data inputs in one embodiment of CSE operation.

FIG. 3B shows an implementation of combined logic and data flow for processing career data inputs, in one embodiment of CSE operation, to determine and assign topic weights to states in a state model. For each state of the plurality of states discerned by the statistical analysis toolkit in FIG. 3A, a weight may be assigned to each topic of the plurality of topics also discerned by the toolkit in FIG. 3A. Weights may, in one implementation, be based on the frequency with which terms associated with topics appear in descriptions for resume work experiences associated with states. For each state in the state model 355, the CSE may determine work experiences, work experience data structures, and/or the like associated to the state 360. In one implementation, such a determination may be made based on information stored in or by the statistical analysis toolkit from FIG. 3A, the information being generated as part of the classification of work experiences and the discernment of states at 335. The CSE may then parse terms from descriptions associated with the work descriptions 365 in order to match those terms against terms associated with topics 370. In this manner, the CSE may determine which work experiences corresponding to a given state also correspond to a given topic or set of topics. The CSE may then count the number of work experiences for a given state that match a given topic 375 and divide by the total number of work experiences associated with the state to determine the frequency, and accordingly the weight, to assign to that given topic in association with that given state 380. The determined weights may then be associated with their corresponding topics within the state record for the given state 385. The CSE may then store the state model with states and topics, including weights assigned to topics in association with each state, in a database 390. A determination may then be made as to whether additional processing of job seeker data is warranted 395. If so, the CSE may return to 355 and update topic weights. Otherwise, the CSE may proceed to building a state data record, such as shown in one implementation in FIG. 5.

Figure 4A:
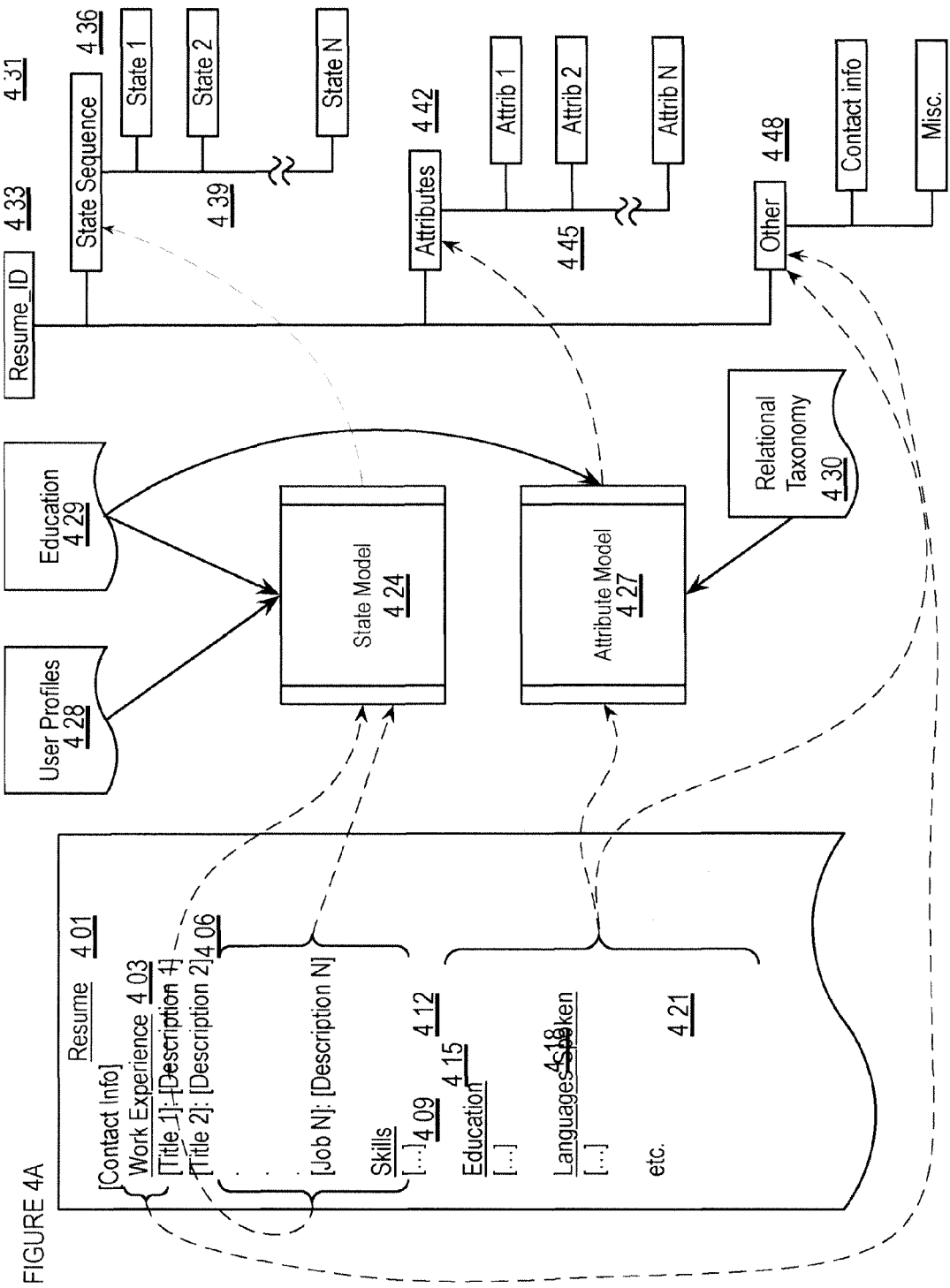
FIG. 4A shows a schematic illustration of resume data record generation in one embodiment of CSE operation.

FIG. 4A shows a schematic illustration of resume data record generation in one embodiment of CSE operation, whereby a submitted resume may be mapped to states, topics, and/or the like using the state model generated according to FIGS. 3A-3B. A submitted resume 401 may contain a variety of information describing experiences, attributes, and/or the like associated with a job seeker. The resume 401 in the illustrated implementation includes user contact information 403 (e.g., postal address, e-mail address, phone numbers, and/or the like), a work experience sequence 406 comprising job titles 409 and description 412, a list of skills 415, a list and/or description of education experiences (e.g., schools attended, degrees received, grades, courses, and/or the like) 418, a section listing and/or describing languages spoken 421, and/or the like. A state model 424 may serve to process resume 401 data into one or more data records 431 configured for analysis and/or processing by CSE modules. In one implementation, the state model 424 may process resume 401 information in conjunction with user profile information 428 and/or education information 429 to generate the one or more data records 431. The state model 424 may, for example, analyze job titles 409 and/or descriptions 412 in order to map them to a pre-set listing of job "states". The work experience listing 406, thus, may be converted into a state sequence 436 comprising a plurality of states 439 associated with the job titles 409 and/or descriptions 412 from the resume 401.

Furthermore, an attributes model 427 may receive and/or process other resume information, such as that external to the work experience listing 406, to generate elements of a data record configured to analysis and/or use by other CSE components. The attribute model 427 may further be configured to consider education 418 and/or relational taxonomy 430 inputs, in addition to the other resume information, in generating those elements. In one implementation, the attribute model may map resume information to elements of a pre-set listing of attributes. Thus, the skills 415, education 418, languages spoken 421, and/or the like extracted from the resume 401 may be converted into an attributes listing 442 comprising a plurality of attributes 445 corresponding to various elements of the resume information. Other resume information may also be included in a resume data record 431, such as may be collected in an "Other" category 448 for subsequent reference and/or use. The resume data record 431 may be associated with a unique resume identifier (ID) 433, based on which the record may be queried and/or otherwise targeted.

FIG. 4B shows a schematic illustration of experience to state conversion in one embodiment of CSE operation, whereby an input resume may be converted and/or otherwise mapped to states, topics, and/or the like using the state model generated according to FIGS. 3A-3B. Experiences listed in a resume may be processed by one or more CSE state models to convert those experiences to at least one of a list of pre-defined states. In some cases, job seekers may use the same or similar job titles and/or descriptions to refer to jobs that may be very different and/or that may correspond to different states within the CSE state model. FIG. 4B provides an illustration of CSE state resolution for similar resume work experience listings. Experience listings at 451 and 460 each comprise the job title "Operations Manager", but have different job descriptions. The CSE state model 454 may include a plurality of states, each having a plurality of corresponding job titles, and the CSE may employ the model to determine which, if any, of the states have titles matching the titles supplied at 451 and/or 460. In one implementation, different states may have common corresponding job titles. To resolve the appropriate state corresponding to each of the work experience listings 451 and 460, the CSE may analyze the listings' job description field for comparison with "topics" associated to each state. The job description in the listing at 451 includes keywords "shipping" and "receiving" that match topics in the state model 454 entry corresponding to the state "Manufacturing Operations Manager" with state number 23418, so the listing 451 is mapped to this unique state 457. The job description in the listing at 460, on the other hand, includes the keywords "personnel" and "schedules", matching topics in the state model 454 entry for the state entitled "Staffing Operations Manager" with state number 52154, so the listing 460 is mapped to this unique state 466. In one embodiment, a state structure may be represented by way of database tables. In another embodiment, a state structure, or limited subset thereof, may be represented as XML information, which may be used for advancement pathing. In one embodiment, the XML structure may take the following form:

The XML form including a title, other analogue job titles and related frequency counts and likelihood percentages, topics, next states and previous states with frequency occurrences, and/or the like.

Job listings with different job titles may also be mapped to the same state by a CSE state model 454. The listing at 469 includes a job title of "Facilities Manager", which matches one of the titles for the state "Manufacturing Operations Manager" (though possibly other states as well) in the CSE state model 454. The listing 469 further includes a job description comprising the keywords "shipping" and "receiving", which match topics associated with the state "Manufacturing Operations Manager", so the listing 469 is mapped to the unique state 475, which is the same as the state at 457 despite the different job title in the original listing.

Figure 4C:
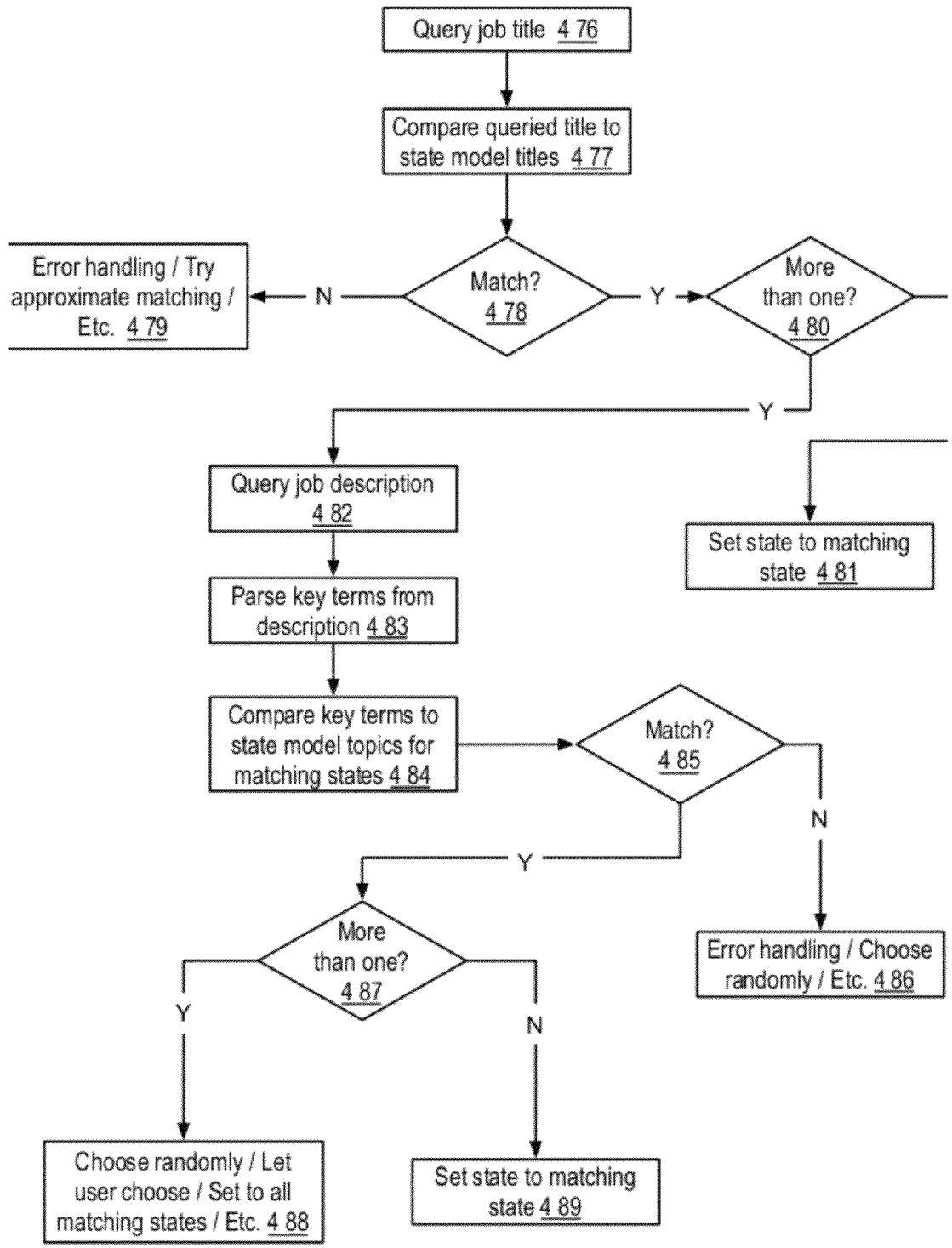
FIG. 4C shows an implementation of logic flow for experience to state conversion in one embodiment of CSE operation.

FIG. 4C shows an implementation of logic flow for experience to state conversion in one embodiment of CSE operation. The logic in FIG. 4C may be applied, for example, to a work experience listing extracted from a resume or curriculum vitae (CV). In alternative implementations, the logic in FIG. 4C could be applied to job listings from other sources, such as career development resources, school and/or corporate websites, and/or the like. A job title may be queried and/or extracted from the listing 476 and compared with a plurality of job titles corresponding to states in the state model 477 in order to determine whether there exist any states having matching job titles 478. If there are no matches, then the

```
<states>
    <state id="0" njobs="3712" ntokens="90708">
        <title>cna, certified nursing assistant, caregiver</title>
        <jobtitles>
            <jobtitle count="260" pct="7.0">cna</jobtitle>
            <jobtitle count="142" pct="3.8">certified nursing assistant</jobtitle>
            <jobtitle count="104" pct="2.8">[no title]</jobtitle>
            <jobtitle count="83" pct="2.2">caregiver</jobtitle>
            <jobtitle count="67" pct="1.8">home health aide</jobtitle>
...
            <jobtitle count="15" pct="0.4">residential counselor</jobtitle>
        </jobtitles>
        <topics>
            <topic id="494" n="32601" words="care residents home daily living patients
personal nursing aide activities " />
            <topic id="696" n="1719" words="patients patient medical insurance appointments
charts doctors doctor procedures care " />
...
            <topic id="205" n="544" words="daily basis needed reports activity log assist
interacted complete schedule " />
        </topics>
        <next>
            <state id="0" pct="10.5" titles="cna, certified nursing assistant, caregiver"
topics="care patients treatment career care unit medical activities children daily" />
            <state id="268" pct="4.6" titles="cna, certified nursing assistant, caregiver"
topics="care cleaning job job assist helped shift duties clean food" />
...
            <state id="45" pct="1.1" titles="medical records clerk, medical
transcriptionist, file clerk" topics="medical records answered phones office answer
office patients data data" />
        </next>
        <prev>
            <state id="999" pct="23.0" titles="[First job]" topics="[First job]" />
            <state id="0" pct="10.2" titles="cna, certified nursing assistant, caregiver"
topics="cna, certified nursing assistant, caregiver" />
...
<state id="243" pct="0.9" titles="administrator, executive director, director of
nursing" topics="administrator, executive director, director of nursing" />
        </prev>
    </state>
    <state id="1" njobs="3570" ntokens="113569">
...
    </state>
<states>
```

CSE may engage an error handling procedure, try approximate matching of the job titles, and/or the like 479. For example, in one implementation, the CSE may perform a search based on a subset of the complete job listing job title to find approximate matches. In another implementation, the CSE may seek states having job titles with subsets matching the job title extracted from the job listing (e.g., a state model job title of "Manufacturing Operations Manager" may be deemed a match for an input job title of "Manufacturing Manager"). In still another implementation, an error message may be returned for the input job title and/or the job title may be set to a null state.

If one or more matches are established at 478, a determination may be made as to whether there are multiple matching states 480. If there is only one matching state, then the CSE may immediately map the input listing to the matching state 481. Otherwise, the CSE may query and/or extract a job description from the input listing 482 and parse key terms from that description 483. Parsing of key terms may be accomplished by a variety of different methods in different implementations and/or embodiments of CSE operation. For example, in one implementation, the CSE may parse all terms from the description having more than a minimum threshold number of characters. In another implementation, the CSE may filter all words in the description that match elements of a listing of common words/phrases and extract the remaining words from the description. The parsed key terms may then be compared at 484 to state model topics corresponding to the matching states determined at 477-478. A determination is made as to whether there exist any matches between the job description terms and the state topics 485 and, if not, then one or more error handling procedures may be undertaken to distinguish between the matching states 486. For example, in one implementation, the CSE may choose a state randomly from the matching job states and map the input listing thereto. In another implementation, the CSE may present a job seeker, system administrator, and/or the like with a message providing a selectable option of the various matching states, to allow for the selection of a desired match.

If a match exists at 485 between description key terms and state topics in the CSE state model, then a determination may be made as to whether there exists more than one matching state 487. In one implementation, this determination may only find that multiple matches exist if the number of key terms matching state topics is the same for more than one state (i.e., if one state has more matching topics than another, then the former may be deemed the unique matching state). If there are not multiple matching states, then the input listing may be matched to the unique matching state 489. If, on the other hand, multiple matches still exist, then the CSE may, in various implementations, undertake any of a variety of different methods of further discerning a unique matching state for the input listing. For example, in one implementation, the CSE may choose randomly between the remaining states. In another implementation, the CSE may provide a list of remaining states in a message to a job seeker, system administrator, and/or the like to permit selection of a desired, unique state. In another implementation, the CSE may map the job listing to all of the multiple matching states.

In one implementation, logic flow similar to that described in FIG. 4C may be employed to map other resume information, such as education experiences, skills, languages spoken, honors and/or awards, travel, and/or the like to one or more attribute states stored in and/or managed by the CSE, a CSE state model, a CSE attribute model, and/or the like.

Figure 4D:
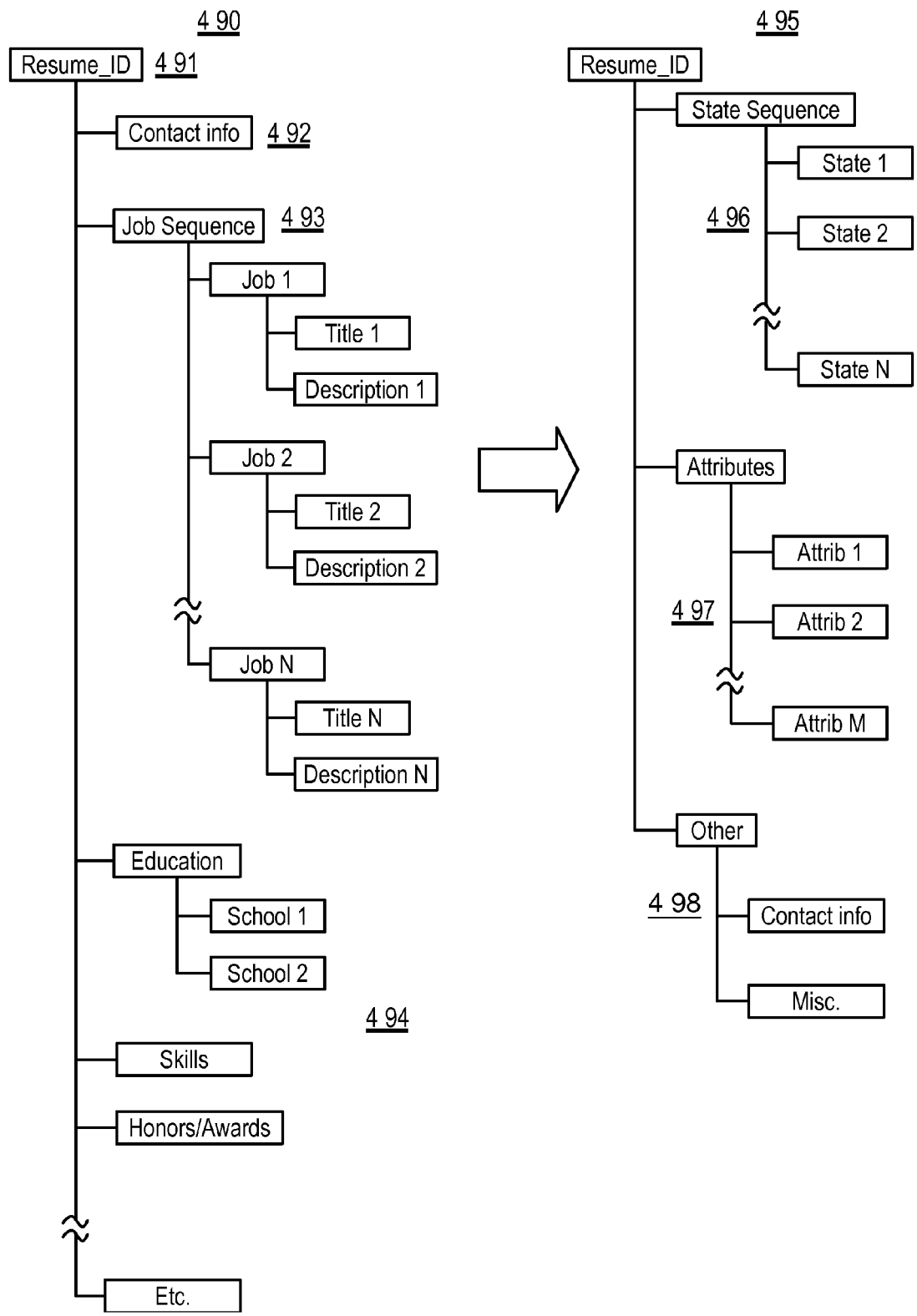
FIG. 4D shows an implementation of a raw resume data record and a state converted resume data record in one embodiment of CSE operation.

FIG. 4D shows an implementation of a raw resume data record and a state converted resume data record in one embodiment of CSE operation. The raw resume data record 490 is indexed by a resume ID 491, and includes a variety of resume data, including contact information 492, a job sequence listing 493, and other information 494 such as education, skills, honors/awards, and/or the like. The corresponding state converted resume data record is shown at 495, and includes a state sequence 496 corresponding to the job sequence 493, as well as a series of attributes 497 that are based on the other resume information. The state converted resume data record also may incorporate other resume data 498.

Figure 5A:
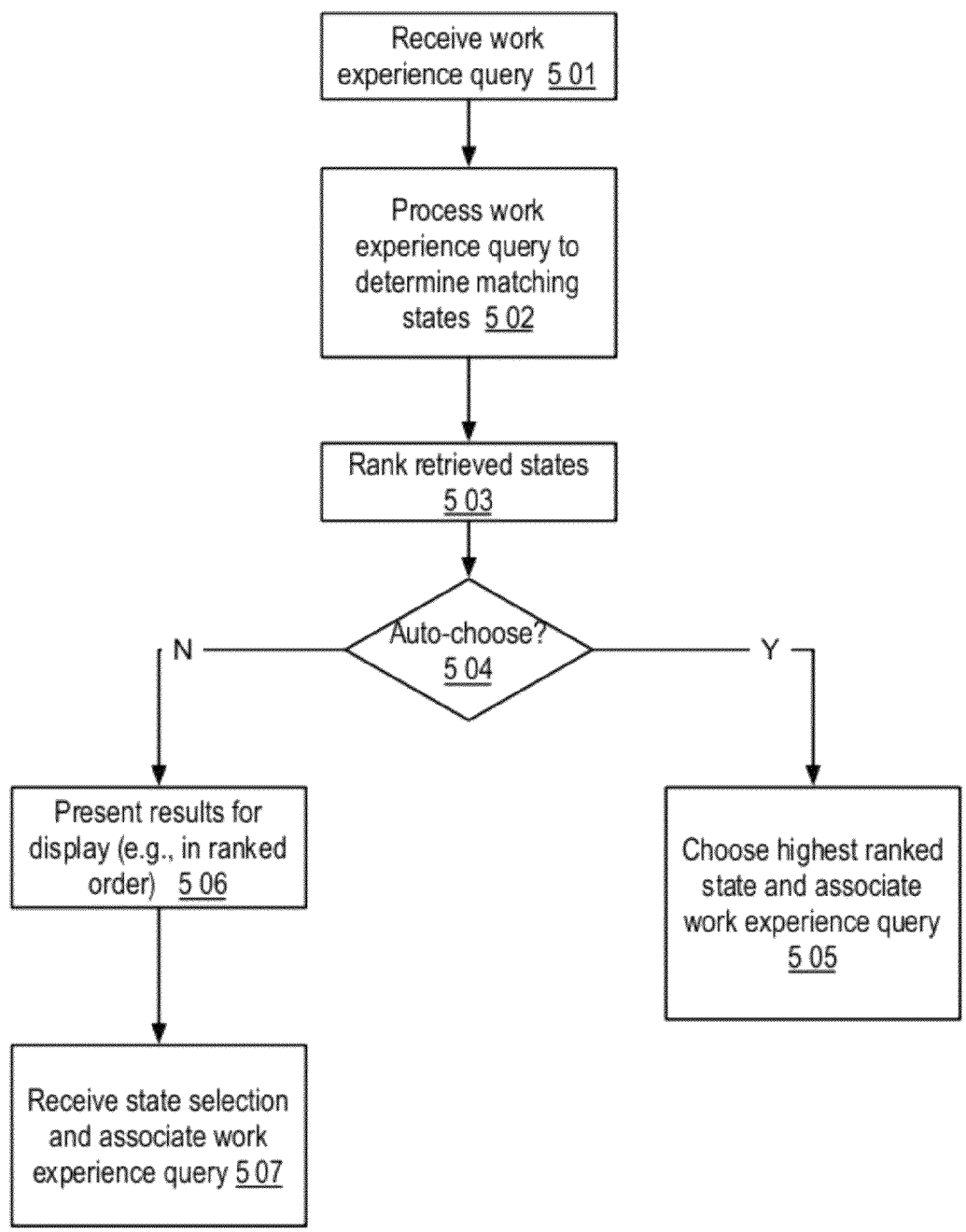
FIG. 5A shows an implementation of a logic flow for determining state selection.

FIG. 5A shows an example implementation of a logic flow for determining state selection. In one embodiment, the CLONER may receive a work experience query 501. The work experience query may be processed by the CLONER to determine potential matching states 502. The retrieved states may then be ranked at 503 (note: ranking schema are also discussed in paragraphs 0088, 0099, and 0143). The CLONER may determine whether or not an auto-choose mechanism is to be engaged 504. If such a mechanism is set up, the CLONER may choose the highest ranked state automatically 505 and associated with the work experience query item. If the CLONER does not choose, the CLONER will present the results, for example, in ranked order 506 (note: ranking schema are also discussed in paragraphs 0088, 0099 and 0143). Once the user makes a selection, the CLONER may receive the state selection and the state selection and associate work experience query item 507.

Figure 5B:
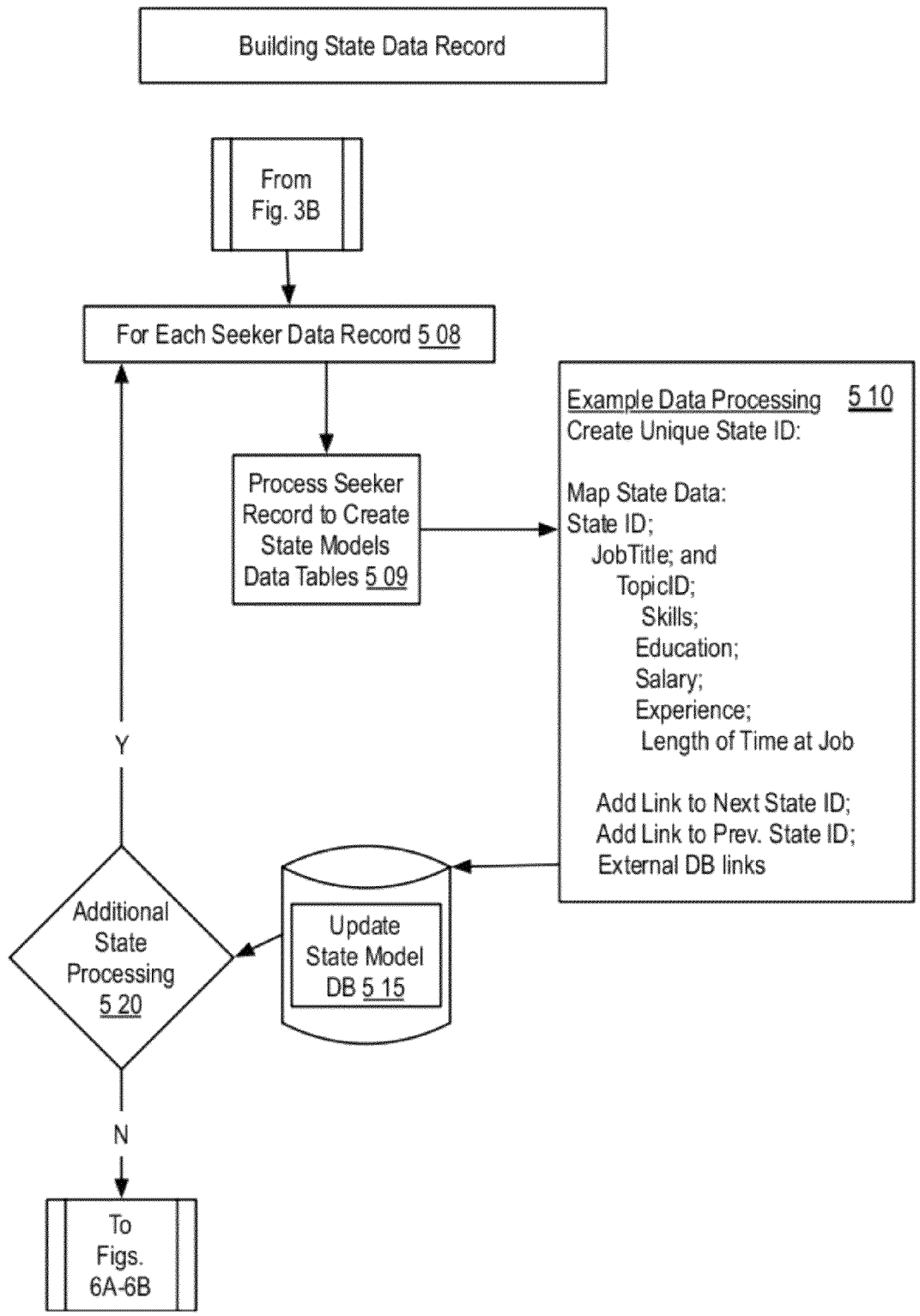
FIG. 5B shows an implementation of combined logic and data flow for building a state data record in one embodiment of CSE operation.

FIG. 5B shows an implementation of combined logic and data flow for building a state data record in one embodiment of CSE operation. For each job seeker data record 508, such as may correspond to resume and/or profile data submitted by the job seeker, the CSE may process the seeker record to create and/or update one or more state models and/or data tables 509. An example of such data processing in one implementation is shown at 510, wherein a unique state ID is created and state data is mapped thereto. Associated with the state ID may be one or more job titles, topics and/or topic IDs, skills, education information, salary information, experience information, length and/or time at a job, and/or the like. The state record may further include links to next state IDs, previous state IDs, and/or external database links, such as to associated videos, people and/or profiles, ads, and/or other content. The state record may be stored in and/or used to update the state model for storage in a state model database 515. A determination may then be made as to whether additional state processing is to be undertaken 520. If so, then the CSE may return to 501 and draw on the next seeker data record. Otherwise, the CSE may move to processing state data to develop the statistical database and/or perform incremental state discovery, such as by the embodiments shown in FIGS. 6A-6B.

Figure 6A:
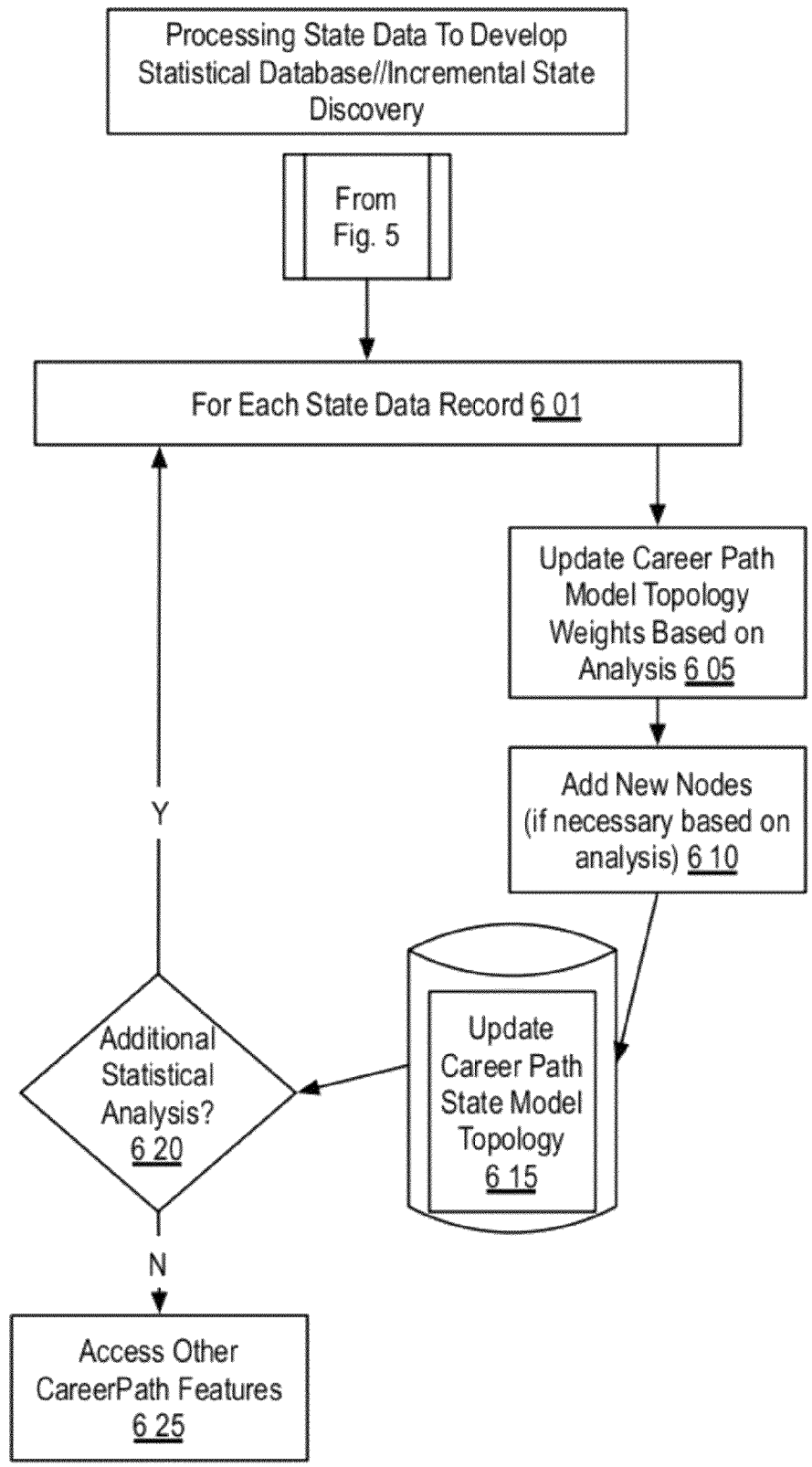
FIG. 6A shows an implementation of combined logic and data flow for processing state data to develop the statistical model in one embodiment of CSE operation.

FIG. 6A shows an implementation of combined logic and data flow for processing state data to develop the statistical model in one embodiment of CSE operation. For each state data record 601, the CSE may update a career path and/or state model topology and/or topology weights based on analysis of the data record 605. In one implementation, a career path and/or state model topology may comprise a plurality of relationships between job states established based on the frequency of occurrence of such relationships in the work experience sections of analyzed resumes. The CSE may also be configured to add new nodes to the career path and/or state model topologies as necessary 610, such as if a newly analyzed resume introduces a relationship between job states that had not been seen in previously analyzed resumes. The updated career path and/or state model topology may be stored in a database 615 and a determination made as to whether additional statistical analysis is required 620. If so, then the CSE returns to 601 and proceeds with additional statistical analysis of the state data record and/or moves to a next state data record. Otherwise, the career path and/or state model topology may be provided for access and/or use by other career path features and/or functions 625.

Figure 6B:
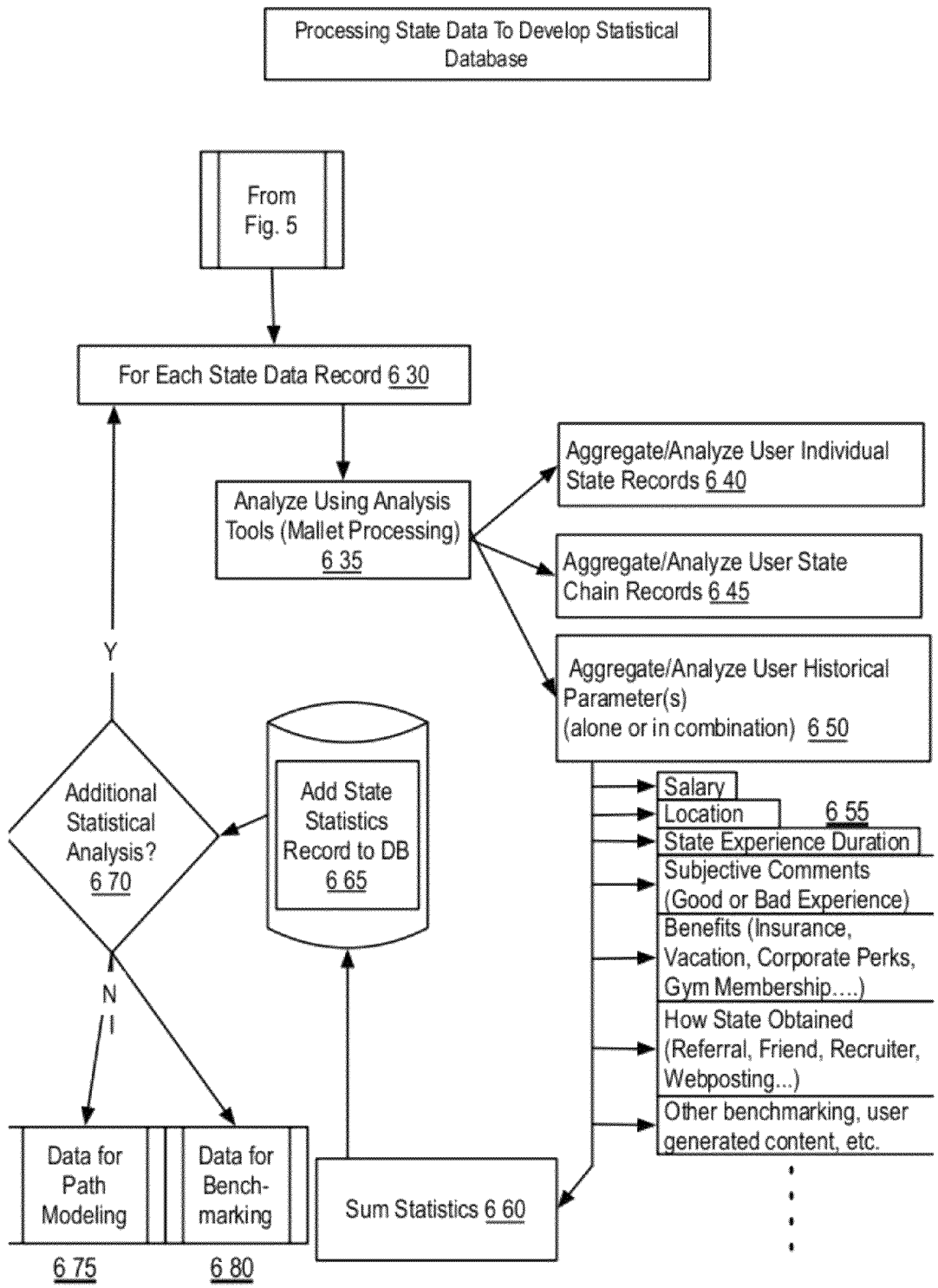
FIG. 6B shows an implementation of combined logic and data flow for processing state data to develop the statistical model in another embodiment of CSE operation.

FIG. 6B shows an implementation of combined logic and data flow for processing state data to develop the statistical model in another embodiment of CSE operation.

For each state data record 630, the CSE may analyze the record using any of a variety of statistical analysis tools. Numerous methods of topic modeling may be employed as discussed in: "Latent Dirichlet Allocation," D. Blei, A. Ng, M. Jordan, "The Journal of Machine Learning Research", 2003. Markov models may also be employed as discussed in: "A tutorial on hidden Markov models and selected applications in speech recognition," L. Rabiner, Proceedings of the IEEE, 1989. In one embodiment, Mallet Processing tools 635 may also be employed, such as may be found at http://mallet.cs.umass.edu. The analysis may include aggregation and/or analysis of user individual state records 640, aggregation and/or analysis of user state chain records 645, and/or aggregation and/or analysis of user historical parameter(s) 650. User historical parameters 655 may, for example, comprise salary, location, state experience duration, subjective experiences associated with job states, benefits, how the job was obtained, other benchmarking and/or user generated content, and/or the like. The statistics associated with the state record may be summed 660 and added to the state statistical records in one or more state models stored in a state model database 665. A determination may be made as to whether additional statistical analysis of state data records is to be undertaken 670. If so, then the CSE may return to 630 to proceed with additional analysis of the state data record and/or to move to the next state data record. Otherwise, the state model may be provided for path modeling 675, benchmarking 680, and/or the like applications.

Figure 7:
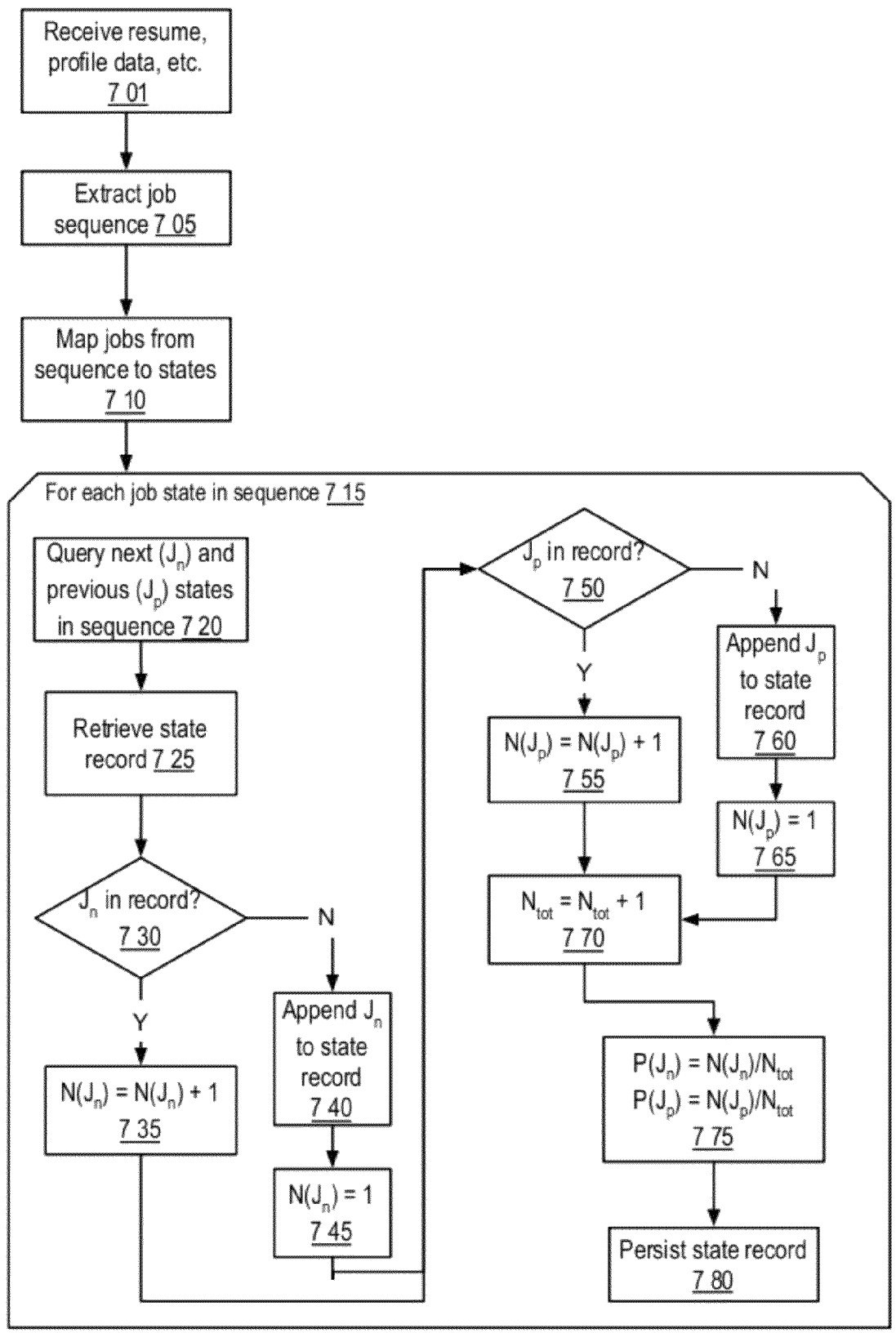
FIG. 7 shows an implementation of logic flow for development of a path-independent statistical model in one embodiment of CSE operation.

FIG. 7 shows an implementation of logic flow for development of a path-independent statistical model in one embodiment of CSE operation. In one embodiment, a path-independent statistical model may comprise a collection of job states, each having corresponding probabilities for most likely next and previous job states, wherein the probabilities depend only on the job state itself and not on any prior history of job states. A resume, profile data, and/or the like may be received at 701, such as from a resume database, and a job and/or other work experience sequence extracted therefrom 705. Jobs from that sequence may be mapped to corresponding states in a CSE state model 710, such as according to the embodiments described in FIGS. 4A-D. Then, for each job state in the sequence 715, the CSE may query a next job state ($J_n$) and a previous job state ($J_p$) in the sequence 720, where a null state may be set to $J_p$ for the first state in the sequence and to $J_n$ for the last state in the sequence. A state record corresponding to the current state under consideration (715) may be retrieved 725, such as from a CSE state model, and a determination may be made as to whether $J_n$ exists in the state record 730. For example, the CSE may seek $J_n$ in a listing of common next job states corresponding to the given job state. If $J_n$ does exist in the record, then a number of occurrences, $N(J_n)$, of $J_n$ as a next state for the state under consideration may be incremented 735. Otherwise, $J_n$ may be appended to the listing of next states for the state under consideration 740 and a value for the number of occurrences of $J_n$ initialized 745.

The CSE may also determine whether $J_p$ exists in the state record, such as in a listing of common previous job states corresponding to the state under consideration 750. If so, then a number of occurrences, $N(J_p)$, of $J_p$ as a previous state for the state under consideration may be incremented 755. Otherwise, $J_p$ may be appended to the listing of previous states for the state under consideration 760 and a value for the number of occurrences of $J_p$ initialized 765. The CSE may then increment a total number, $N_{tot}$, associated with the number of resumes used to update the particular state entry of the path-independent statistical model 770. The CSE may then determine probabilities corresponding to $J_p$ and $J_n$ by dividing $N(J_p)$ and $N(J_n)$ each respectively by $N_{tot}$ 775. These probabilities may, for example, provide an indication to job to seekers of the likelihood of changing to or from a job from another job, based on the accumulated resume records of other job seekers who have held those jobs. The state record with the updated probability values may be persisted at 780, such as by being stored in a database.

Figure 8:
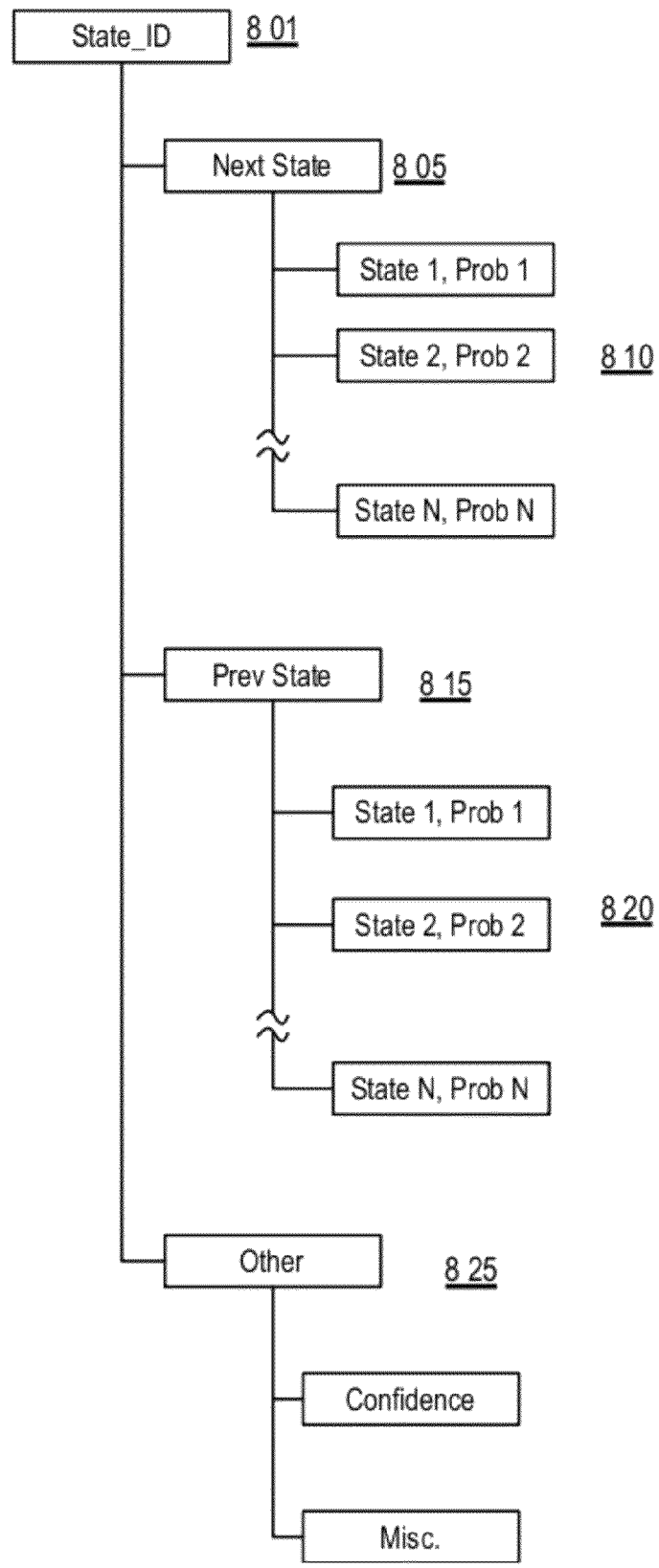
FIG. 8 shows an implementation of a path-independent state model data record in one embodiment of CSE operation.

FIG. 8 shows an implementation of a path-independent state model data record in one embodiment of CSE operation. The data record in FIG. 8 may, for example be generated and/or updated by the logic flow shown in FIG. 7. The data record may, in one implementation, correspond to a unique job state in the CSE state model, indexed by a state ID 801. A listing of next states 805 may include a plurality of states and corresponding probabilities 810, such as may be determined according to the logic in FIG. 7. Similarly, the data record may include a listing of previous states 815 comprising states and corresponding probabilities 820. Additional data associated with the state may be stored in the state record 825, such as but not limited to a total number of resumes analyzed for the state in question, a confidence metric describing confidence in and/or reliability of the probabilities in 810 and/or 820, state job titles, state topics, and/or the like.

Figure 9:
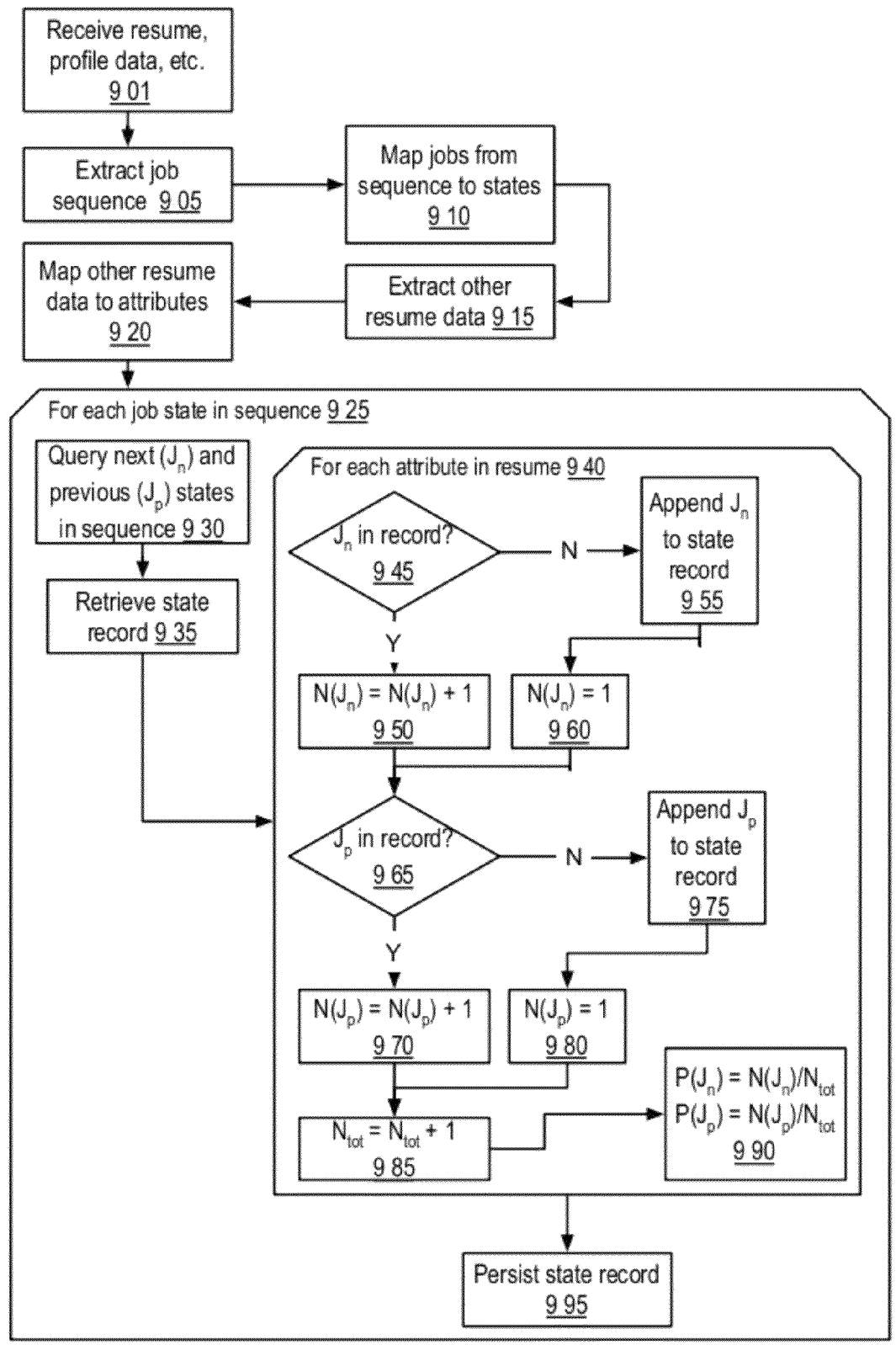
FIG. 9 shows an implementation of logic flow for development of a path-independent statistical model with attributes in one embodiment of CSE operation.

FIG. 9 shows an implementation of logic flow for development of a path-independent statistical model with attributes in one embodiment of CSE operation. In one embodiment, a path-independent statistical model with attributes may comprise a collection of job states, each having corresponding probabilities for most likely next and previous job states, wherein the probabilities depend on the job state itself and on the identity of one or more associated attributes, but not on any prior history of job states. Resume and/or profile data may be received at 901, and a job experience sequence may be extracted therefrom 905. Jobs from the job sequence may then be mapped to CSE state model job states at 910, such as according to the embodiments described in FIGS. 4A-D. The CSE may also extract additional resume data 915, such as but not limited to education levels, schools attended, awards and/or honors, skills, languages spoken, number of years of experience, salary levels, certifications and/or licenses possessed, and/or the like. The additional resume data may be mapped to attribute states in the CSE state and/or attribute model 920, such as in a manner similar to mapping of job sequence listings to job states. Then, for each state in the sequence of job states 925, the CSE may query the next job state ($J_n$) and previous job state ($J_p$) in the sequence 930, with a null state assigned to $J_n$ for the last state of the sequence and to $J_p$ for the first state of the sequence. The CSE may also retrieve the state record for the current state 935.

Then, for each attribute in the resume 940, the CSE may determine whether $J_n$ exists in the state record in correspondence with that attribute 945, such as in a listing of common next job states corresponding to the state and attribute under consideration. If so, then a number of occurrences, $N(J_n)$, of $J_n$ as a next state for the state and attribute under consideration may be incremented 950. Otherwise, $J_n$ may be appended to the state record in association with the particular attribute 955 and a value for the number of occurrences of $J_n$ initialized 960. A determination may then be made as to whether $J_p$ exists in the state record in correspondence with the attribute under consideration 965. If so, then the number of occurrences, $N(J_p)$, of $J_p$ as a previous state for the state and attribute under consideration may be incremented 970. Otherwise, $J_p$ may be appended to the state record in association with the particular attribute 975 and a value for the number of occurrences of $J_p$ initialized 980. A total number of instances may then be incremented 985, and probabilities for $J_n$ and $J_p$, corresponding to the proportion of resumes having the attribute under consideration and those job states respectively before and after the job state under consideration, may be determined as the ratio of each of $N(J_n)$ and $N(J_p)$ with $N_{tot}$ 990. The state record, with updated probability values, may then be persisted at 995, such as by storing the record as part of a CSE state model in a database.

Figure 10:
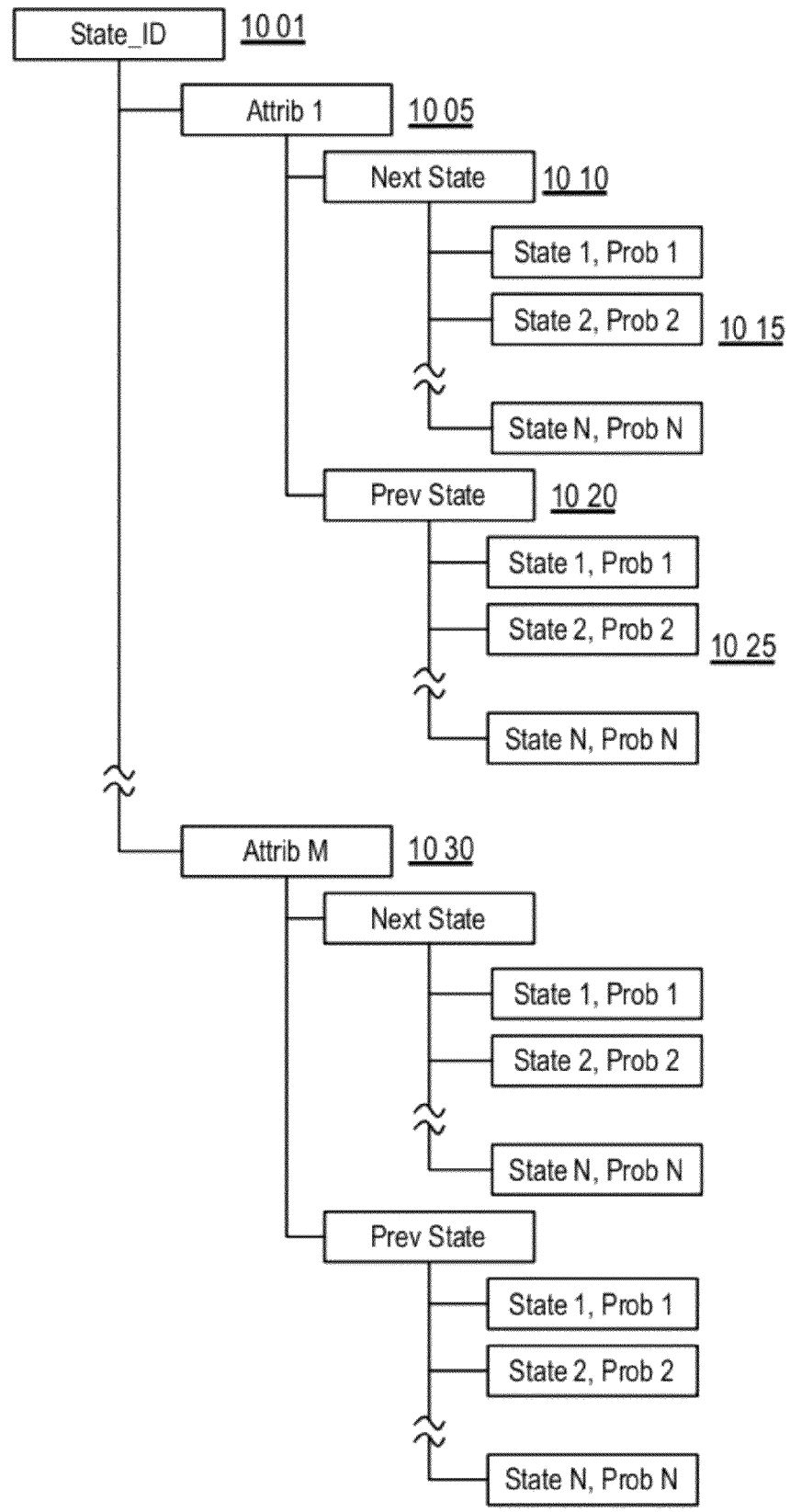
FIG. 10 shows an implementation of a path-independent model with attributes data record in one embodiment of CSE operation.

FIG. 10 shows an implementation of a path-independent model with attributes data record in one embodiment of CSE operation. The data record in FIG. 10 may, in one implementation, be generated by a method similar to that shown in FIG. 9. The record, corresponding to a particular job state, may be identified by a unique state ID 1001, and may further include a plurality of attributes (1005, 1030). Each attribute, in turn, may include listings of next states 1010 and of previous states 1020, states comprising states and associated probabilities (1015, 1025), such as may be determined by the method described in FIG. 9. In one embodiment, a hierarchy of states may be generated by traversal of interconnected state structures.

Figure 11:
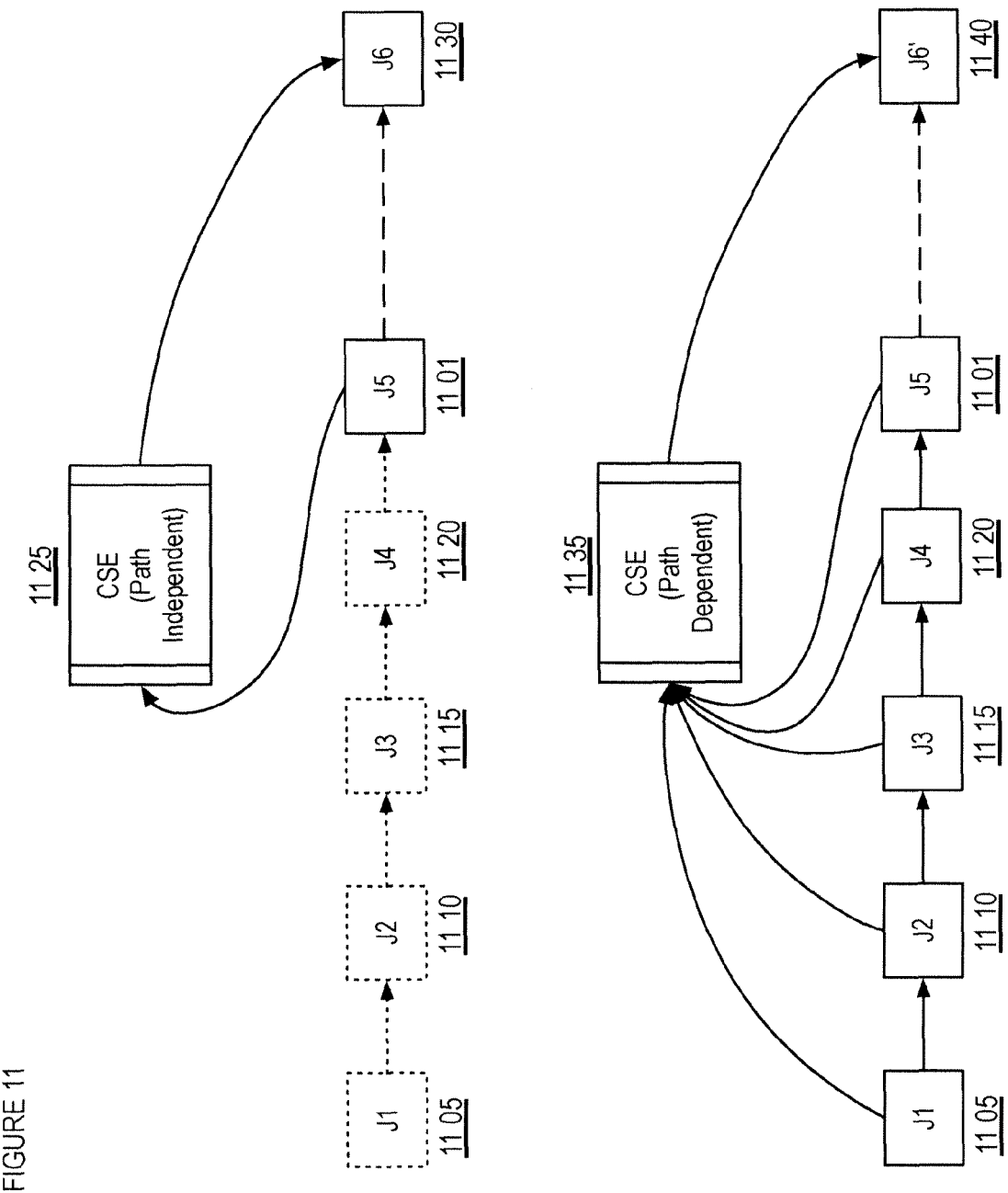
FIG. 11 shows an illustration of career path modeling using path-independent and path-dependent statistical models in one embodiment of CSE operation.

FIG. 11 shows an illustration of career path modeling using path-independent and path-dependent statistical models in one embodiment of CSE operation. The CSE may, in some embodiments, operate to take one or more job inputs and return a job output, wherein the job output comprises a prediction of a most likely next job and/or otherwise statistically noteworthy result based on the inputs. In FIG. 11, a user may provide an experience sequence comprising five jobs (J1 1105, J2, 1110, J3 1115, J4 1120, J5 1101) as inputs to the CSE. In one embodiment, the CSE comprises a path-independent model 1125 that may generate an output job state J6 1130 based only on a single job state (e.g., J5 1101). In an alternative embodiment, the CSE comprises a path-dependent model 1135 that takes multiple jobs as inputs (J1 1105, J2, 1110, J3 1115, J4 1120, J5 1101) to generate and return an output job state J6' 1140. The embodiments described in FIGS. 7-10 are directed to generation of the path-independent CSE state model.

Figure 12:
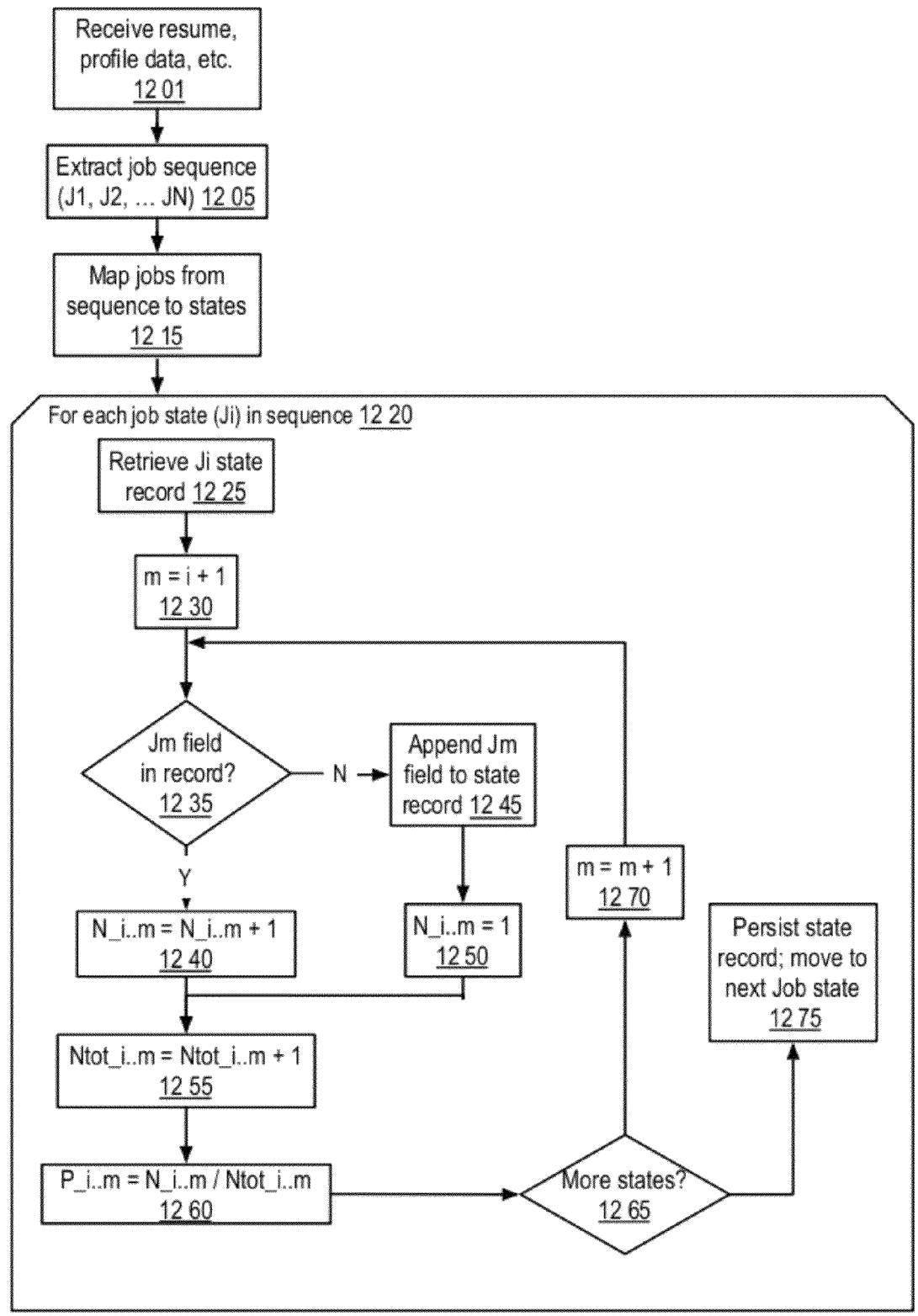
FIG. 12 shows an implementation of logic flow for development of a path-dependent statistical model in one embodiment of CSE operation.

FIG. 12 shows an implementation of logic flow for development of a path-dependent statistical model in one embodiment of CSE operation. In one embodiment, a path-dependent statistical model may comprise a collection of job states, each having corresponding probabilities for most likely next and previous job states, wherein the probabilities depend on the history of jobs leading up to the most recent job state. Though FIG. 12 is directed to an implementation bereft of attribute consideration, it should be recognized that aspects of FIGS. 9-10 could be incorporated to yield an attribute-sensitive, path-dependent state model. The CSE may receive resume data, profile data, and/or the like, such as from a resume database, at 1201, and extract a job sequence comprising a plurality of jobs $(J_1, J_2, \ldots, JN)$ therefrom 1205 which may subsequently be mapped to a sequence of job states. Then, for each state $(J_i)$ in the sequence 1220, the CSE may retrieve a state record corresponding to state $J_i$ 1225 and set an indexing variable, m, equal to i+1 1230. A determination may then be made as to whether a field corresponding to the state $J_m$ exists in the $J_i$ state record 1235. If so, then a number of occurrences, $N_{i \ldots m}$ of that sequence of job states $(J_i$ to $J_m)$, is incremented 1240. Otherwise, the $J_m$ field is appended to the state record 1245, and the value of a number of occurrences corresponding to the job sequence is initialized 1250. A total number, $Ntot_{i \ldots m}$, of instances (e.g., the number of resumes analyzed) may then be incremented 1255, and a probability for the sequence determined by dividing the number of occurrences of the job sequence by the total number of instances 1260 may be calculated. A determination may then be made as to whether there are more states to analyze in the job sequence 1265. If so, the indexing variable m is incremented 1270, and the CSE returns to 1235. Otherwise, when all states in the sequence are exhausted, the $J_i$ state record is persisted, and the CSE moves to the next job state at 1220 (e.g., by incrementing i) 1275.

To further illustrate the embodiment described in FIG. 12, the following example may be considered. A resume may include a work experience history comprising a sequence of three jobs: J1, J2 and J3. The logic in FIG. 12 would first update a CSE state model based on the job sequence J1 to J2, specifically updating the probability associated with J2 in a J1 state record. Next, the CSE state model would update a probability associated with J2 to J3 in the J1 state record. Then, the CSE state model would retrieve the J2 state model and update a probability associated with J3 therein. In this manner, the CSE state model will contain information pertaining to probabilities of all the sequences and sub-sequences of the work experience listings in the resumes that it analyzes (in this exemplary case, those sequences and sub-sequences are: J1, J2; J1, J2, J3; and J2, J3).

Figure 13:
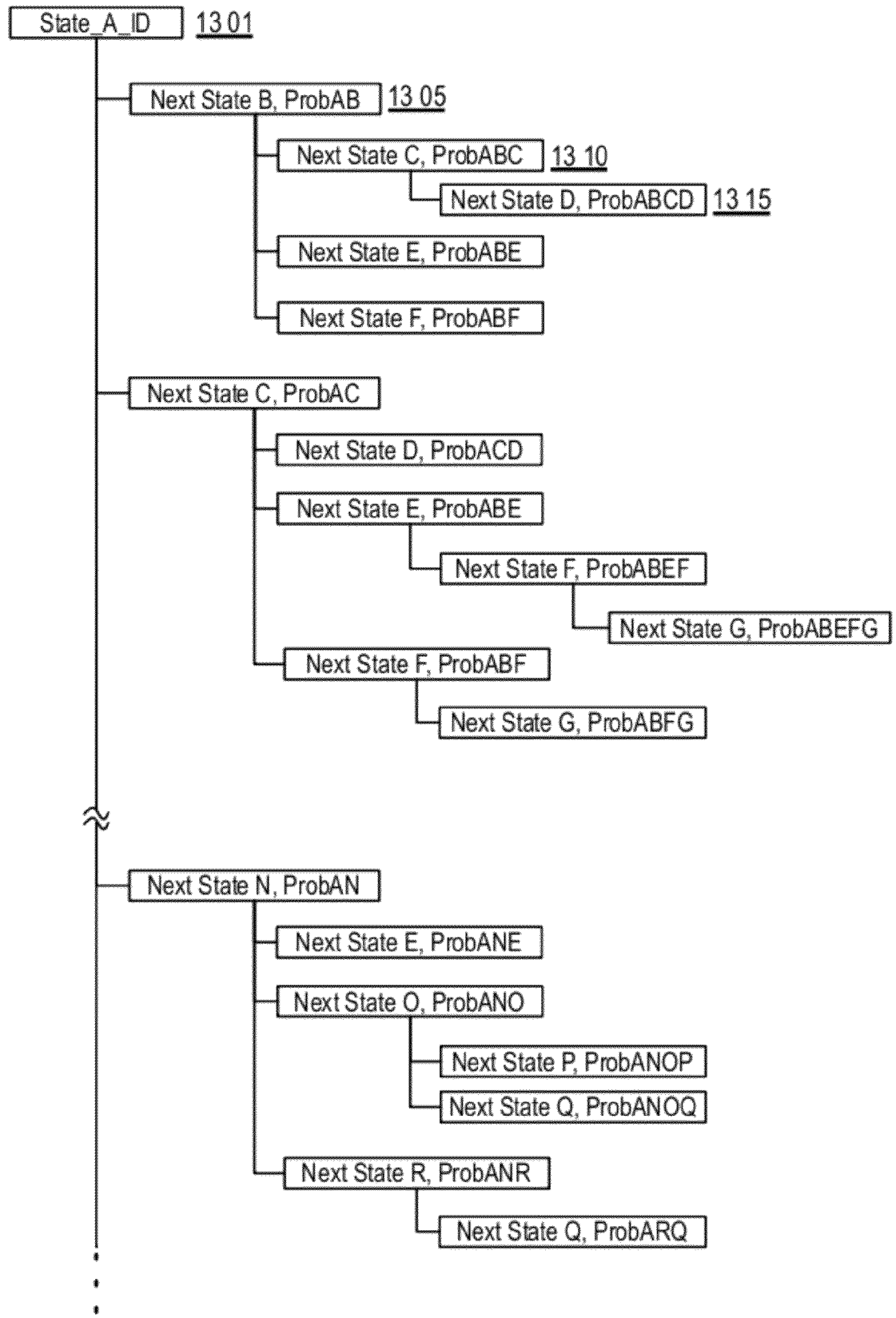
FIG. 13 shows an implementation of a path-dependent statistical model data record in one embodiment of CSE operation.

FIG. 13 shows an implementation of a path-dependent statistical model data record in one embodiment of CSE operation. The state data record shown in FIG. 13 may, in one implementation, be generated by a logic flow similar to that shown in FIG. 12. The state, here labeled A, to which the data record corresponds may be identified by a state record identifier 1301. The state record may further include a second tier of "next job" states, each characterized by at least a state identifier and a probability 1305. For example, in FIG. 13, a next state is labeled B and has a probability labeled AB corresponding to the proportion of resumes analyzed wherein an individual having job A moved to job B. Under each of the second tier states, there may further exist third tier states 1310, fourth tier states 1315, etc., each including at least a state identifier and a probability associated with the sequence leading to the current state from each state in the higher tiers. For example, in FIG. 13, the state labeled D at the fourth tier shown at 1315 is associated with a probability labeled ABCD that characterizes the proportion of resumes wherein an individual had the sequence of jobs A, B, C and D.

Figure 14A:
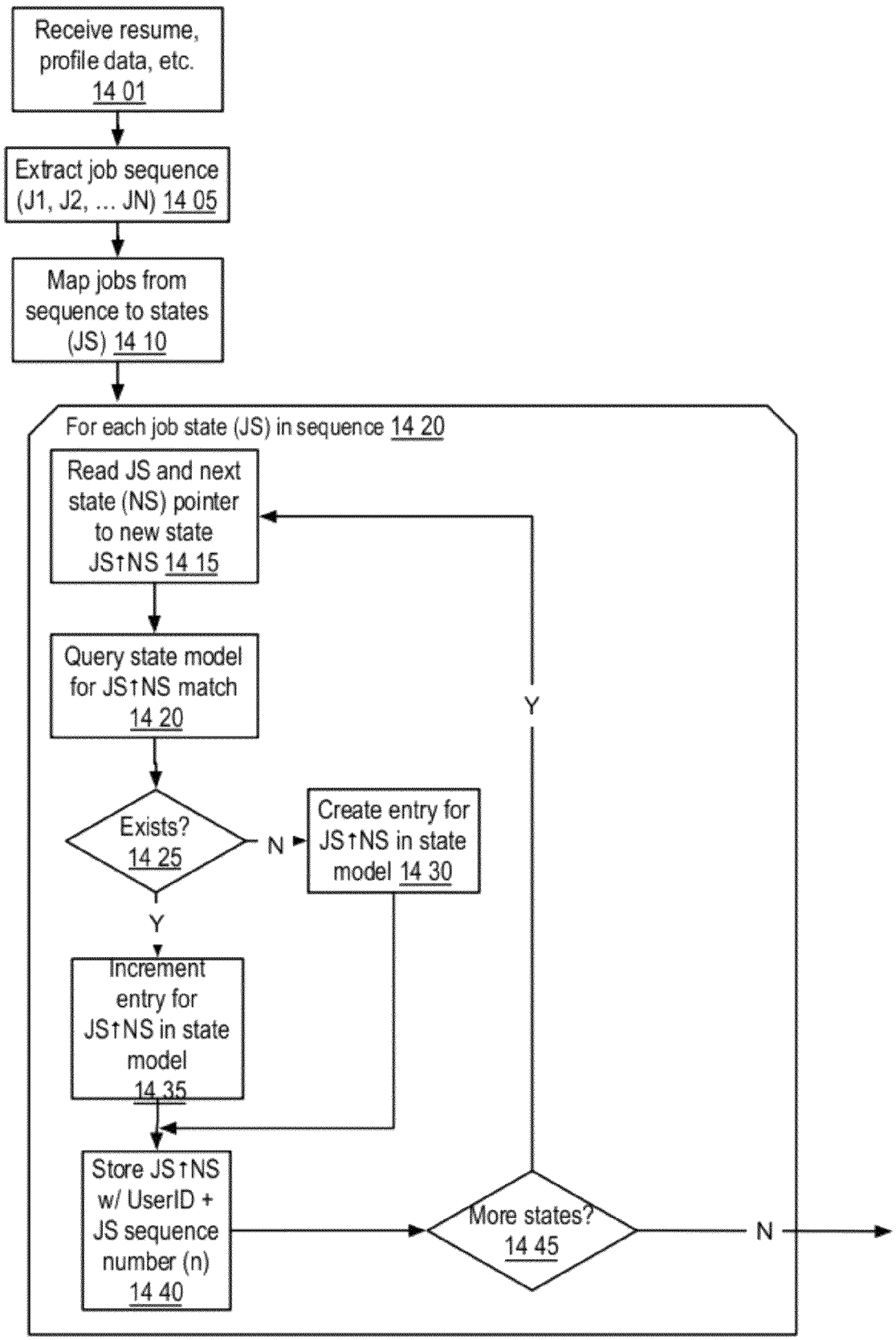
FIGS. 14A-B show an implementation of logic flow for development and of a path-dependent statistical model in another embodiment of CSE operation.
Figure 14B:
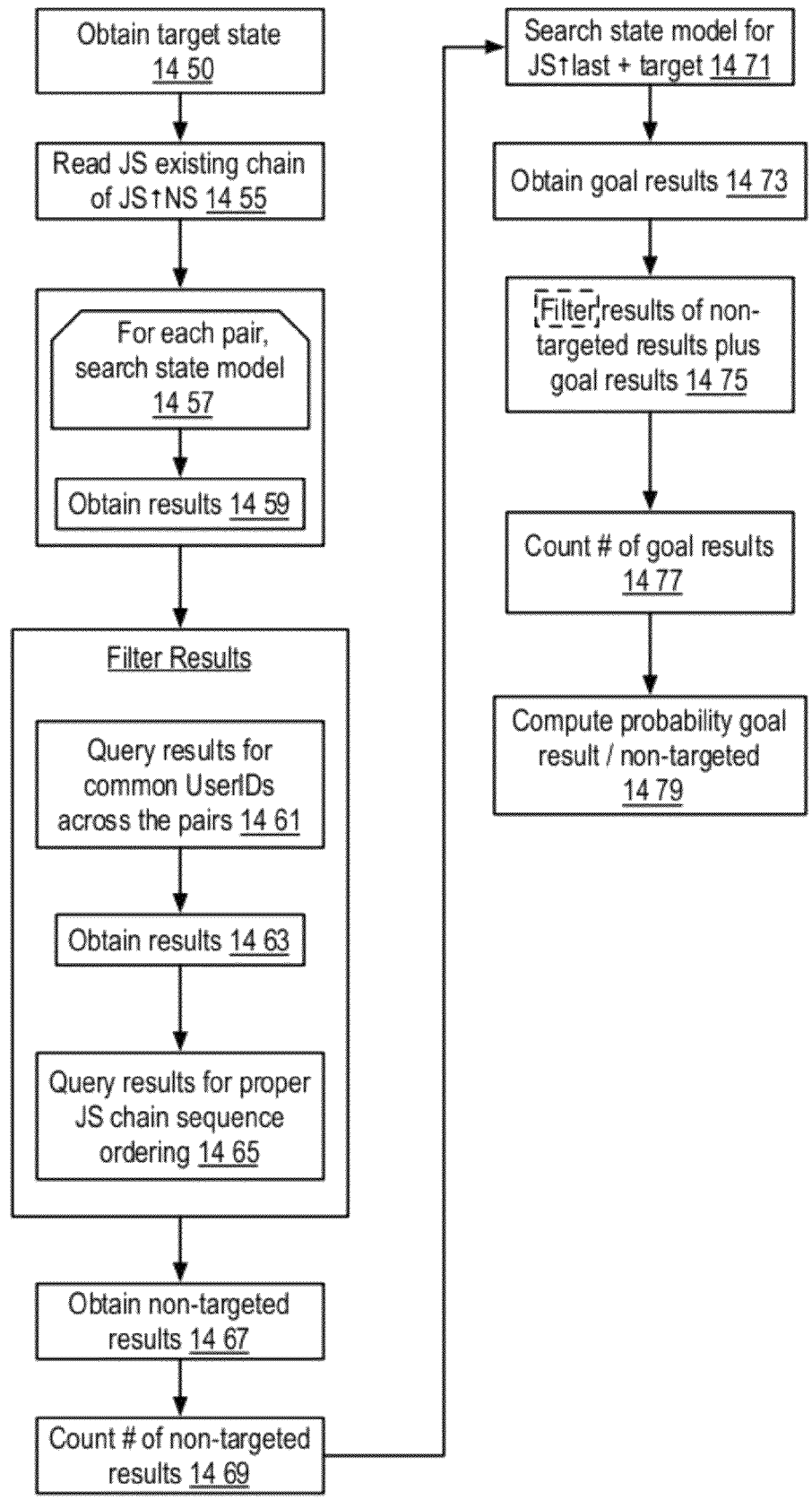

FIGS. 14A-B show an implementation of logic flow for development and of a path-dependent statistical model in another embodiment of CSE operation. Models similar to that shown in FIGS. 14A-B may, in some implementations, include a two-stage method, the first comprising a setup stage wherein the model is established as a collection of job state couplets (FIG. 14A), and the second comprising an application of the model to a specific job sequence and/or target job state to yield a target job state probability (FIG. 14B). Resume data, profile data, and/or the like is received at 1401 and a job sequence (J1, J2, ..., JN) is extracted 1405. The job sequence may then be converted into corresponding job states (JS) 1410, such as according to the embodiments described in FIGS. 4A-D. Then, for each JS in the sequence 1420, the CSE may read the JS and the next state (NS) in the sequence to establish a couplet comprising a pointer between JS and NS 1415. The state model may then be queried 1420 to determine whether a match exists to the JS/NS couplet 1425. If not, then an entry may be created in the state model corresponding to the couplet 1430 or, if so, then the number of instances for that couplet's may be incremented 1435. The couplet entry may be stored 1440 in association with a user ID, resume ID, and/or other identifier associated with the resume from 1401, as well as with a JS sequence number (n), associated with the position of JS in the job sequence from 1405. A determination may then be made as to whether additional states exist in the sequence 1445 and, if so, the CSE may return to 1415 to analyze the next sequence state.

FIG. 14B illustrates an implementation of logic flow for application of the state model to obtain a probability associated with a given target job state given a sequence of past job states, in one embodiment of CSE operation. The target job state is obtained at 1450, and the sequence of past job states, comprising a plurality of couplets of job state and next state, is entered 1455. Then, for each couplet or pair, the state model may be searched 1457 to obtain matching pairs 1459. The CSE may then apply a filter to extract desired and/or relevant matches. For example, the CSE may query the CSE 1461 to obtain results 1463 out of the matching pairs from 1459 that have common associated UserIDs across pairs. For example, the CSE may have found pairs (A, B) and (B, C) at 1457-1459, corresponding to jobs A, B and C. To establish that the sequence A to B to C exists for any specific users, the CSE could then seek common user IDs existing in both the (A, B) and (B, C) records.

The CSE may also want to ensure that the sequence exists in the proper order. For example, if a common user ID exists in the (A, B) and (B, C) records, this does not necessarily imply that a user has the specific job sequence A to B to C in their resume and/or profile data. The user may, instead, have a sequence such as B to C to A to B. The CSE may, therefore, query results for proper JS chain sequence ordering 1465, such as may be based on the JS sequence number (n) stored at 1440.

The CSE may thus obtain 1467 and count 1469 the non-targeted results, that is the single-resume job sequence matches to the JS existing chain from 1455, but not including the target state from 1450. The CSE may then search the state model 1471 to obtain "goal results" 1473 comprising couplets of the last state in the JS existing chain with the target state. A filter process similar to that shown at 1461-1465 may then be applied to the sequence comprising the non-targeted results plus the goal results 1475. The number of filtered goal results are counted 1477 and the ratio of the number of goal results to the number of targeted results may be computed 1479, stored, and/or the like. This ratio may be interpreted as the proportion of analyzed resumes having the sequence of jobs corresponding to the JS existing chain from 1455 leading into the target job state from 1450.

Cloner

Figure 15:
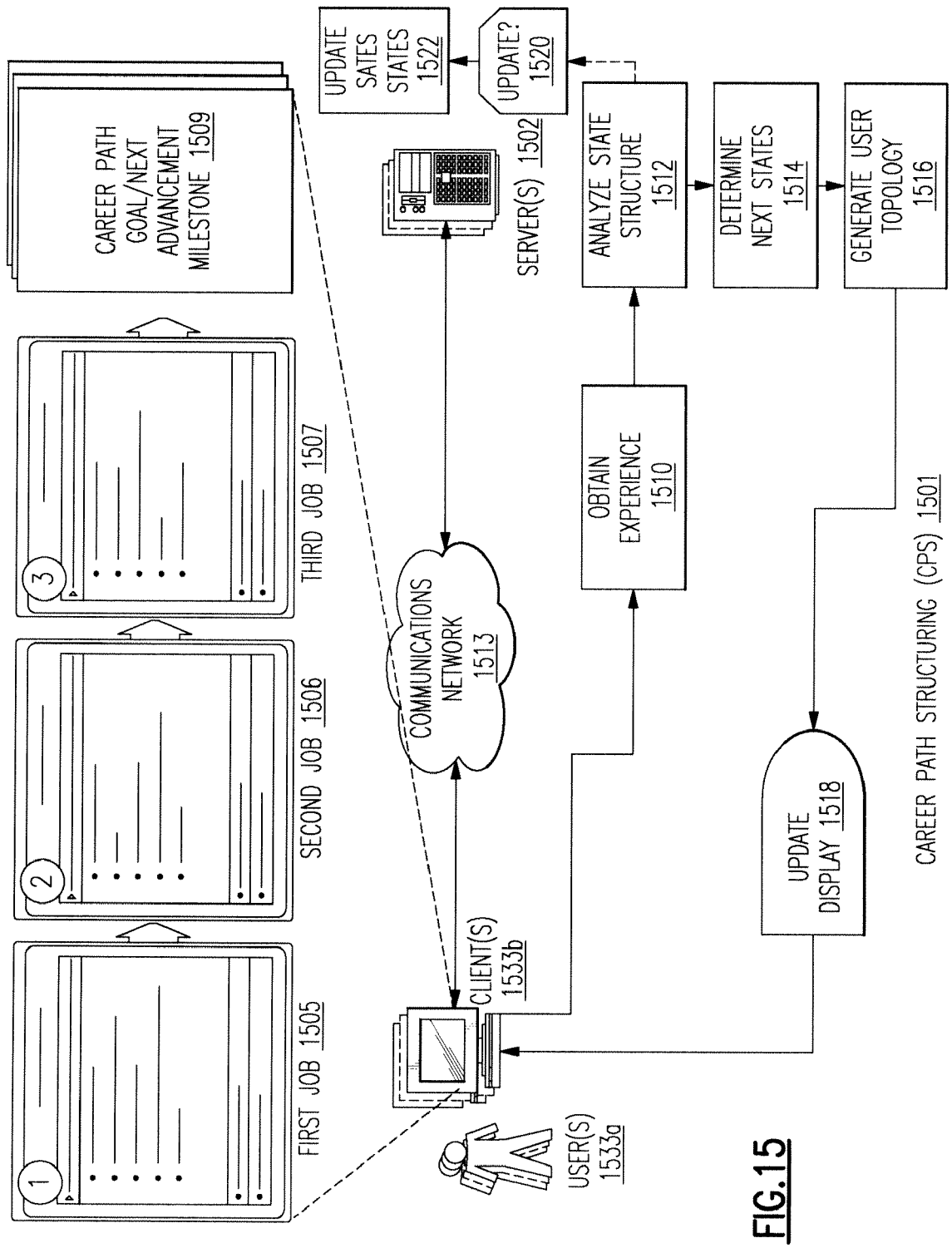
FIG. 15 is of a mixed block, data and logic flow diagram illustrating embodiments of the APPARATUSES, METHODS AND SYSTEMS FOR ADVANCEMENT PATH CANDIDATE CLONING (hereinafter "CLONER")

FIG. 15 is of a mixed block, data and logic flow diagram illustrating embodiments of APPARATUSES, METHODS AND SYSTEMS FOR ADVANCEMENT PATH CANDIDATE CLONING (hereinafter "CLONER"). From a high level, the CLONER 1501 allows users (e.g., advancement "seekers") 1533*a* to interact with CLONER servers 1502 through interfaces on their client(s) 1533*b* across a communications network 1513. Although the following discussion will frequently use examples of seekers wishing to advance their careers, it should be noted, that such seekers may similarly use the CLONER to advance their educational achievement, their financial goals, and/or the like. To that end, seekers 1533*a* may provide 1533*b* relevant (e.g., job) experiences they have had leading up to their current desire to seek advancement beyond their past and current experiences 1505, 1506, 1507 (hereinafter "experience information") to the CLONER. Similarly, seekers 1533*a* may provide 1533*b* targeted advancement milestones, objectives and/or goals (hereinafter "advancement information" or "target information") to the CLONER. In turn, the CLONER 1501 may obtain that advancement experience information 1510 and use that information 1502 to provide the seeker with next states in their advancement goals 1509.

Upon obtaining the user advancement experience information 1510, the CLONER may analyze the experience information (e.g., and perhaps other information associated with the user found in the user's profile) against a state structure 1512. By analyzing the advancement seeker's experiences and goals against a statistical state structure, the CLONER may determine what next states 1514 may form the advancement seeker's next advancement milestone(s) and/or paths to their desired milestones and/or advancement goals 1509. It should be noted that in one embodiment, the state structure may take the form of generated by the CSE. In one embodiment, the state structure is stored in CLONER state structure database table(s); as such, the state structure may be queried with advancement experience information, advancement information, experience information, state identifier (e.g., state_ID), proximate state identifier (e.g., next state_ID), topics/terms, topic_ID, and/or the like. When queried, the state structure may return state records (i.e., states) that best match the query select commands, and those states may themselves further refer to other proximate states; where the proximate sates are related advancement states (hereinafter "adjacent state," "advancement state," "next state," "proximate state," "related state," and/or the like) that may include likelihoods of moving from the state to the related advancement state. Upon determining what next states may form the advancement path and/or milestone for the seeker 1514, the CLONER may generate a user path topology showing the user their advancement path. This topology may be used to update the seeker's client 1533*b* display 1518 with an interactive (e.g., career) advancement path.

Figure 16:
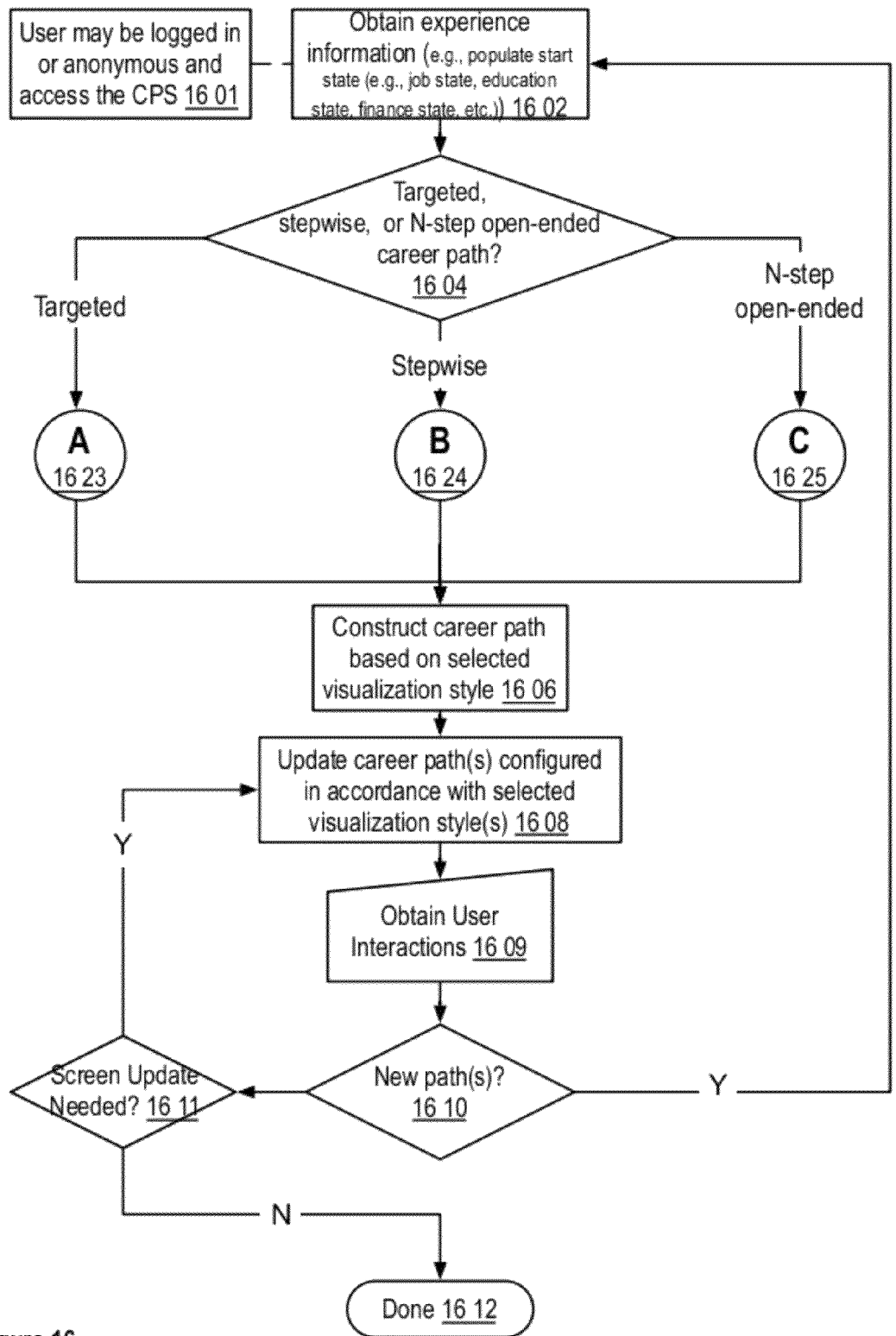
FIG. 16 is of a logic flow diagram illustrating embodiments of the CLONER.

FIG. 16 is of a logic flow diagram illustrating embodiments of the CLONER. A user need not be, but may be, logged in to an existing account to the CLONER to make use of its advancement pathing abilities 1601. In either case the user will engage the CLONER (for example, in a web embodiment of the CLONER); a user may engage the CLONER by navigating their web browser to an address referencing the CLONER's information server, which will act as an interface/gateway between the seeker and CLONER. It should be noted that a web interface is one of many interface and/or mechanisms by which the CLONER may be deployed and/or implemented; for example, in alternative embodiments the CLONER may be a stand alone application, a server messaging system that accepts inputs and provides outputs to disparate clients, etc. In accessing the CLONER 1601, the seeker may start to provide experience advancement information. The experience advancement information may include both desired advancement milestones and/or goals (although this is not required) and experience information, which includes experience the seeker already has. The experience information may be provided by way of submission of structured information via a web form, parsing submitted resume's (e.g., via attachment and/or uploading of a resume file), aggregating experience information in a profile over time, allowing the user to select a pre-existing state matching their own (e.g., letting them find a job/title/occupation matching their current occupation) in graph topology representing an hierarchical interconnected state structure (e.g., see 2405 of FIG. 24), and/or the like. In one example embodiment, the user may submit current work experience via web form, which may include: the dates of employment, the employer's name (e.g., employing company), seeker title/position, descriptive resume information about their employment, and/or the like 1602. In another embodiment, the seeker may submit experience information beyond their instant post that includes: previous positions, their educational background, and/or the like 1602. In addition, the seeker may similarly provide their advancement information. For example, the seeker may provide that they currently have the title of Retail Administrator, without more, and see what are the next most likely career path opportunities from that role, without having any explicit advancement goal. However, should the seeker also provide a milestone and/or goal, e.g., Manager of a retail chain, then the CLONER will construct paths and experiential states that show the seeker's the different routes by which the seeker may advance to their desired milestone/goal. It should be noted that build/find path facilities that are described are not exclusive mechanisms for building paths, and browsing through the topology is also supported as will be detailed in further figures.

Figure 18:
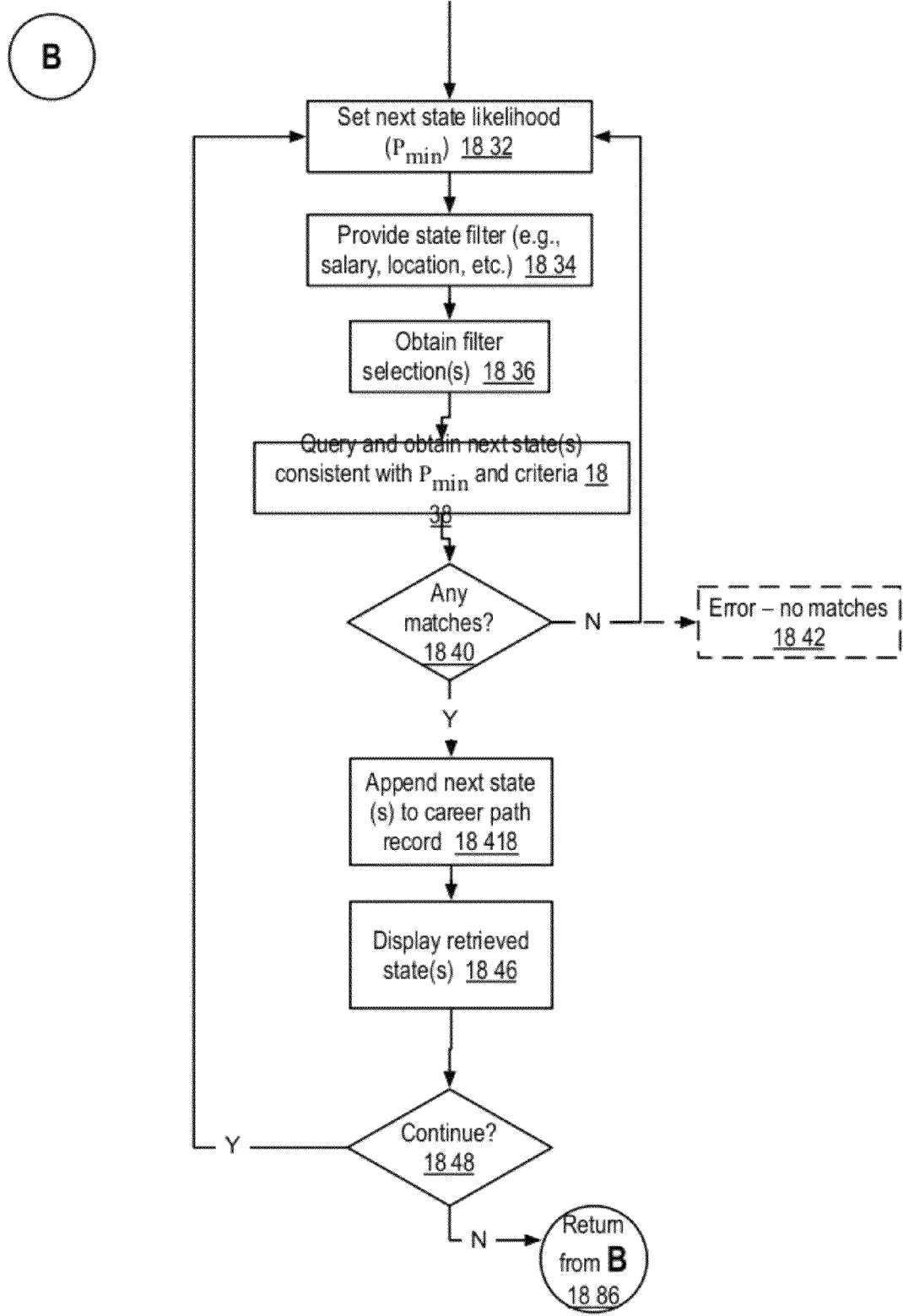
FIG. 18 is of a logic flow diagram illustrating iteration-wise path-independent path construction embodiments of the CLONER.
Figure 19:
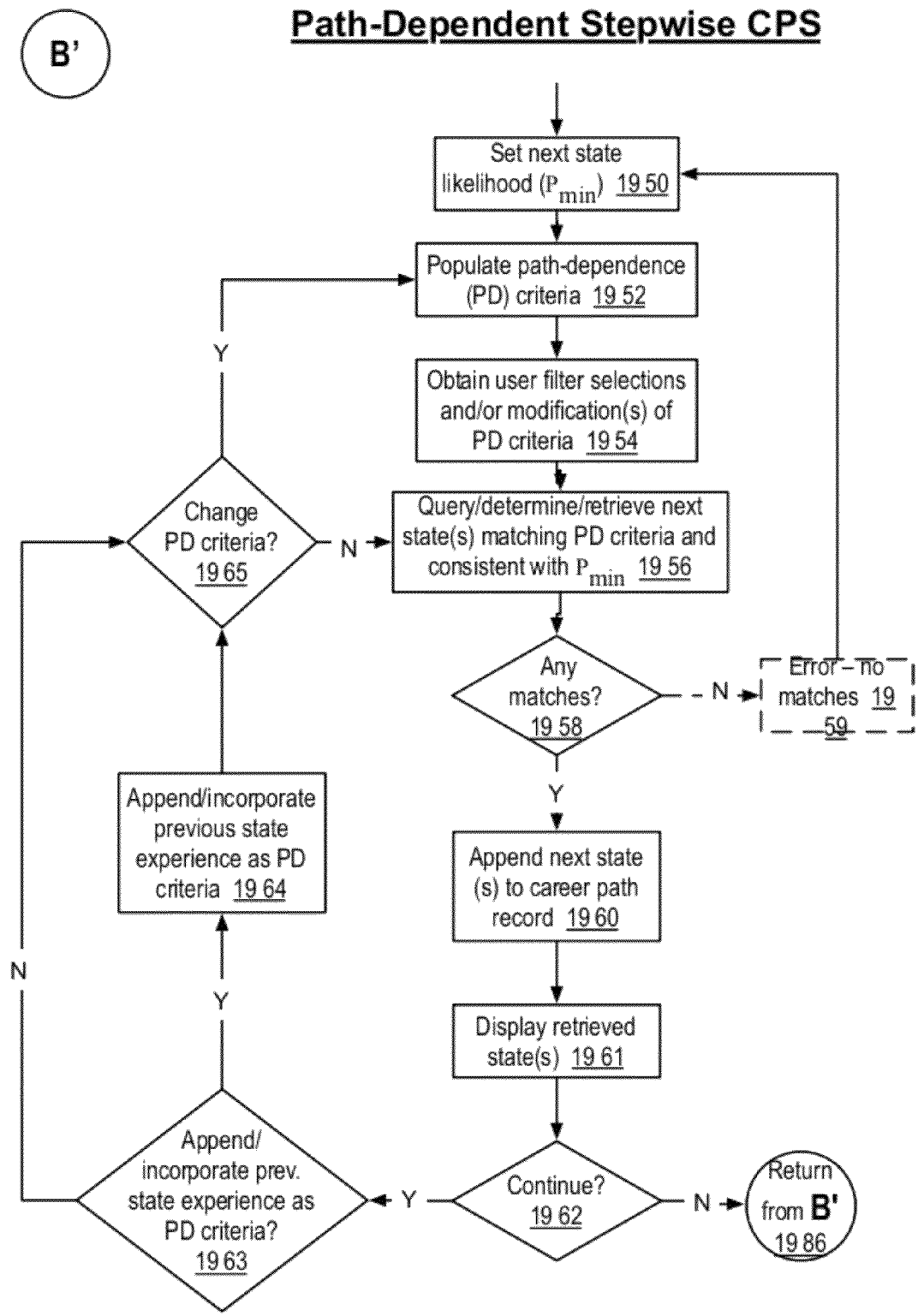
FIG. 19 is of a logic flow diagram illustrating iteration-wise path-dependent path construction embodiments of the CLONER.

Depending on the information supplied by the seeker and the seeker's desire to see advancement path variations, the CLONER may provide at least three different types of advancement path analysis 1604: targeted paths 1623 (see FIG. 17 for examples), iteration-wise paths 1624 (see FIG. 18 for examples), and N-part open-ended paths 1625 (see FIG. 19 for examples). Upon obtaining selections from a seeker for one of the types of analysis 1604, or upon making a determination that the seeker provided advancement experience information best suitable for only one of the types of analysis 1604, and upon performing the respective analysis 1623, 1624, 1625, the CLONER will construct an advancement path based on the seeker's advancement experience information and present it based on a selected visualization style 1606. The visual style may be selected by the seeker from a set of visualization template styles, or selected by the CLONER and/or administrator.

Upon applying the visualization style to the determined advancement path 1606, this visualization of the advancement path is provided to the client for display 1608. It should be noted that, e.g., career, advancement paths may be stored and shared as between users. In one embodiment, regardless of how the path is determined. The seeker may then interact with the visualized path and the CLONER may obtain the user interactions 1609. The CLONER may then determine if any of the user interactions provided new experience information, advancement information, or modifications to the constructed path such that new paths need to be generated If the interactions are such that require providing more information 1610 then the seeker is allowed to again provide more advancement experience information or otherwise modify factors affecting the generated path 1602. Otherwise 1610, the CLONER will determine if the user interactions 1609 require that the display is updated 1611. If the user modified or provided inputs, indicia and/or otherwise operated on path objects or values that require that the path visualization and/or screen is updated, the data obtained from the user interactions 1609 is then used by the CLONER to effect updates the career path display 1608. Otherwise, the CLONER may conclude 1612 and/or wait for further interactions.

Path-Independent Targeted CLONER

Figure 17:
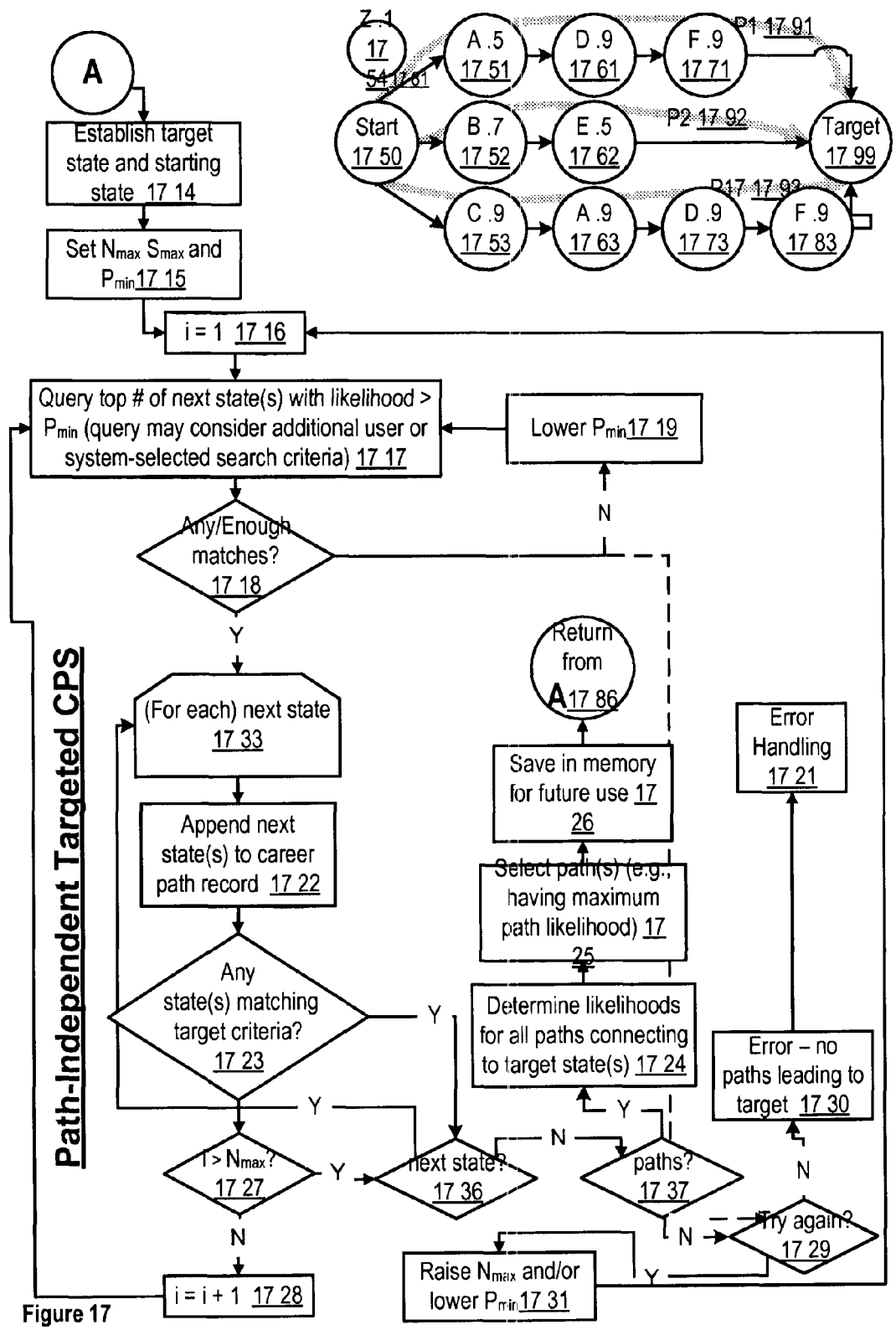
FIG. 17 is of a logic flow diagram illustrating path-independent (i.e., targeted) path construction embodiments of the CLONER.

FIG. 17 is of a logic flow diagram illustrating path-independent (i.e., targeted) path construction embodiments for the CLONER. It should be noted that FIGS. 18, 19, 20 and 21 offer mechanisms that may supplement, alter, and/or otherwise provide embodiments alternative to FIG. 17. Upon obtaining seeker experience advancement information 1602 and determining that a targeted independent advancement path is desired 1604 of FIG. 16, the CLONER will use advancement experience information to establish a start state and a target state 1714.

In one embodiment, the seeker experience advancement information may be provided by the seeker by way of a web form as shown in FIGS. 24, 25, 26. The web form may be served by an information server, and the web form fields may serve as a vessel into which the seeker may provide structure information, attach a resume, specify advancement experience information, or otherwise provide both experience information and specify the desired advancement milestone and/or goal. In one embodiment, this information is submitted to the CLONER and is stored as field entries in the CLONER database table for the seeker, e.g., in a seeker profile record. In another embodiment, this information is provided in XML message format such as the following:

```
<Advancement Experience Information ID = "experience12345">
    <Experience Information>
        <Job 1>
            <Title 1> Assistant to the Management Consultant </Title 1>
            <Start_Date> 03/14/89 </Start_Date>
            <End_Date> 5/15/03 </End_Date>
            <DescriptionTerms>
                <Term1> training </Term1>
                <Term2> process </Term2>
                <Term3> development </Term3>
                <Term4> costs </Term4>
                <Term5> coffee </Term5>
            </DescriptionTerms>
        </Job 1>
        <Job 2>
            <Title 1> Assistant Management Consultant </Title 1>
            <Start_Date> 05/16/03 </Start_Date>
            <End_Date> 6/15/09 </End_Date>
            <DescriptionTerms>
                <Term1> training </Term1>
                <Term2> process </Term2>
                <Term3> development </Term3>
                <Term4> costs </Term4>
            </DescriptionTerms>
        </Job 2>
        <Job 3> ... </Job 3>
    </Experience Information>
    <Advancement Information>
        <DescriptionTerms>
            <Term1> Executive </Term1>
            <Term2> Consultant </Term2>
        </DescriptionTerms>
    </Advancement Information>
    <Filter Information>
        <DescriptionTerms>
            <Filter1> Salary > $100,000 </Filter1>
            <Filter2> Region Zipcode [e.g., 10112] < 25 miles </Filter2>
            <Filter3> Degree < Masters </Filter3>
            <Filter4> Growth > 20% </Filter4>
            <Filter5> Relocation Expenses = TRUE </Filter5>
            <Filter6> Expected Next Year Occupation Demand Level >
                20,000 jobs
</Filter6>
            <Filter7> Signing Bonus > $10,000 </Filter7>
            <Filter8> Annual Technology Stipend > $5,000 </Filter8>
            <Filter9> Annual Health Insurance Stipend > $25,000 </Filter9>
            <Filter10> Regular Travel = False </Filter10>
            <Filter11> Salary Level > [Top] 10% [in field] </Filter11>
        </DescriptionTerms>
</ Advancement Experience Information ID >
```

Turning for a moment to FIGS. 24 and 25, the Figures show alternative example embodiments of how start states and target states may be selected. In another embodiment, the seeker may navigate a state structure topology such as may be seen in 2405 of FIG. 24. This may be achieved by clicking on advancement topics 2409 that will zoom in to show various advancement states 2412, which the user may specify as being start state, intermediate state, and end state 2414 of FIG. 10. In yet another embodiment, the seeker may enter a topic, career choice, title or other information indicative of a desired state 2424 in a field, which will be submitted as a query to the state structure; the state structure in return will return states that most closely match the supplied search term 2426, which the user in turn may select 2426 and which may be displayed, zoomed in on, and further manipulated in a topology display area 2427 of FIG. 24. In yet another embodiment, the user may similarly supply terms to identify both a start state and target state 2524, 2526, 2528, which will form the basis of a path between start state and target state 2533 of FIG. 25; in this embodiment, the CLONER similarly identify potential matching states for each of the supplied terms 2528 and constructed various paths that match the results form those terms 2537 of FIG. 25. The seeker may then select form the list of paths 2537 and the path topology display area 2539 will be updated to reflect the selected path 2539 of FIG. 11. So for example, the seeker may specify their current position an Assistant Administrator in a retail hardware store and that they have a goal of becoming a Regional Manager of a chain of hardware stores. In such an embodiment, the CLONER may use the provided seeker advancement information as a basis with which to query the state structure to identify the current advancement state, and the target advancement state. For example, for the starting state, the CLONER may use the most current job information, e.g., the employer name, the title, and description describing the current job, and query the state structure for states that most closely match current job information; for example, a select command may be performed on the state structure for stats that most closely match all the supplied terms, and use the highest ranking match as the selected current state. Similarly, the target job information may be used to find a target state.

Turning back to FIG. 17, upon establishing a start state and a target state 1714, the CLONER prepares to search for paths connecting the start and target states 1715, 316.

It should be noted that no target state need be selected, and in such an instance, the CLONER will use the start state to query the state structure for potential states that may be of interest to a seeker with no particular target as will be discussed later in FIGS. 18-20 regarding iteration-wise implementations. Such iteration-wise implementations allow a seeker to gauge and possibly forge their own pathways after being presented with the various likelihoods of those adjacent and potential advancement states.

Continuing with the description of a targeted implementation, it should be noted that while the CLONER may make use of a start and target state, specification of intermediate states are also contemplated. However, it should be noted that intermediate paths may be constructed by pair-wise re-processing of paths as discussed in FIG. 17; for example, if a seeker initially chooses a start state of Janitor and target state of CEO, the CLONER may construct a path of Janitor state->Manager state->CEO. However, seekers may themselves change and/or specify an intermediate state of Regional Administrator. This intermediate state of Regional Administrator may be used by the CLONER as a target state with Janitor state being the starting state; from which a first path may be constructed as between the two states, e.g., Janitor state->Facilities Administrator state->Regional Administrator state. In turn, the CLONER will then use the target Regional Administrator state as a starting state and CEO as target state to construct a second path, e.g., Regional Administrator state->Regional Manager state->CEO state. Thereafter, the CLONER may join the first resulting path together with the second resulting path, as the intermediate Regional Administrator state is the same for both paths, and result in a new seeker directed path, e.g., Janitor state->Facilities Administrator state->Regional Administrator state->Regional Manager state->CEO state. A practically limitless number of pair-wise re-processing operations may be employed as a seeker seeks out and selects intermediate states for a path.

In preparing to search for connecting paths as between a start state and target state, the CLONER may use specified minimum likelihood thresholds, $P_{min}$, and a maximum number of path state nodes $N_{max}$ 1715. In one embodiment, an administrator sets these values. In an alternative embodiment, a seeker may be presented with a user interface where they are allowed to specify these values; such an embodiment allows the seeker to tighten and/or loosen search constraints that will allow them to explore more "what if" advancement (e.g., career) advancement path scenarios. The CLONER may then establish an iteration counter, "i", and initially set it to equal "1" 1716. Using the start state, the CLONER may query the state structure for the next most likely states 1717. In an alternative path-dependent embodiment, the CLONER may use the seeker's provided experience information, i.e., the entire state path, as a starting point and query the state structure for next most likely states following the seeker's last experience state (more information about path-dependant traversal may be seen in FIGS. 19 and 21).

As the state structure maintains the likelihood of moving from any one state to another state, the CLONER may query for the top most likely next states having likelihoods greater than the specified minimum probability $P_{min}$. For example, if a $P_{min}$ is set to be 50% probability, i.e., 0.5, and the start state 1750 has the following partial list of related next states: state A with P=0.5 1751, state B with P=0.7 1752, state C with P=0.9, and state Z with P=0.1 1754; then of next states A, B, C and Z, only states A, B, and C have likelihoods above the $P_{min}$ threshold, and as such, only those states will be provided to the CLONER 1717. In an alternative embodiment, instead of specifying a likelihood threshold, $P_{min}$ instead may specify the minimum number of results for the state structure to return (e.g., $P_{min}$ may be set to 10, such that the top 10 next states are returned, regardless of likelihood/probability). The CLONER may then determine if any and/or enough matches resulted 1718 from the query 1717. If there are not enough (or any) matches that result 1718, then the CLONER may decrease the $P_{min}$ threshold by a specified amount (e.g., from 0.5 to 0.25, from 10 to 5, etc.); alternatively, the CLONER (or a seeker) may want to try again 1729 by loosening constraints 1731, or otherwise an error may be generated 1730 and provided to the CLONER error handling component 1721.

If there are matching 1718 next states (e.g., A 1751, B 1752, C 1753) proximate to the start state 1750, then the CLONER may pursue the following logic, in turn, as to each of the matched next states (i.e., whereby each of the next states (e.g., A 1751, B 1752, C 1753) will form the basis for alternative advancement paths (e.g., Path 1, 1791, Path 2, 1792, Path 3 1793, respectively) 1733.

Upon identifying matching next states 1717, 1718, the CLONER may append 1781 a next state (e.g., A 1751) 1722 to the start state. Upon appending a next state to the start state 1722, the CLONER will then determine if appended next state (e.g., A 1751) matches any of the target state (e.g., 1799) criteria 1723. In one embodiment this may be achieved by determining if the next state has the same state_ID as the target state. In an alternative embodiment, the state structure provides the state record of the target state to the CLONER, and the CLONER uses terms from the target state as query terms to match to the state record of the next state; when enough term commonality exists, the CLONER may establish that the next state is equivalent to, and/or close enough to the target state to be considered a match.

If the appended next state 1722 does not match the target state 1723, then the CLONER will continue to seek out additional intermediate 1727 state path nodes (e.g., D 1761 and F 1771) until it reaches the target state (e.g., 1799). In so doing, the CLONER will determine if the current state node path length "i" has exceeded the maximum specified state node path length $N_{max}$ 1727. If not 1727, the current state node path length "i" is incremented by one 1728. Thereafter the last appended state (e.g., A 1751) will become the basis for which the query logic 1717 may recur (i.e., the appended state effectively becomes the starting state from which proximate nodes may be found by querying the state structure as has already been discussed 1717) For example, in this way next state A 1751 becomes appended to the start state 1750, and then the appended 1722 state A 1751 becomes a starting point for querying 1717, where the state structure, may in turn, identify a state node proximate to the appended state, e.g., state D 1761; in this manner state D 1761 becomes the next state to state A 1751. By this recurrence 1722, 1727, 1728, 1717, the CLONER grows the current path (e.g., Path 1 1791).

If the current state node path length "i" has exceeded the maximum specified state path length, $N_{max}$ 1727, then the CLONER may check to see if there is another next state for which a path may be determined 1736. For example, if the maximum allowable state path length is set to $N_{max}=2$, and the CLONER has iterated 1728, 1717 to reach state F 1771 along Path 1 1791, then the current state path length (i.e., totaling 3 for each of states A 1751, D 1761, and F 1771) would exceed the specified $N_{max}$; in such a scenario where $N_{max}$ has been exceeded 1727, if the CLONER determines there are additional states next to the start state 1736 (e.g., B 1752, C 1753), then the CLONER will pursue and build, in turn, a path stretching from each of the remaining next states (e.g., Path 2 1792 from next state B 1752, and Path 3 1793 from next state C 1753). If there is no next state 1736 (e.g., each of stats A 1751, B 1752, and C 1753 have been appended to the start state 1750), the CLONER may then move on to determine if any paths have been constructed that reached the target state 1737. If no paths reaching the target have been constructed 1737, then the CLONER (e.g., and/or the seeker) may wish to try again 1729 by loosening some of its constraints 1731. In one embodiment, the maximum state path length $N_{max}$ may be increased, or minimum likelihoods $P_{min}$ may be lowered 1731 and the CLONER may once again attempt to find an advancement path 1716. If there is no attempt to try again 1729, the CLONER may generate an error 1730 that may be passed to a CLONER error handling component 1721, which in one embodiment may report that no paths leading to a target have been found.

However, if paths have been constructed 1737, then the CLONER may determine the likelihoods of traversing each of the resulting paths 1724. For example, if we have a start state 1750 and a target state of 1799, the CLONER may have found three states next to the start state with a sufficient $P_{min}$ (e.g., over 0.5); e.g., next states including: state A with P=0.5 1751, B with P=0.7 1752, and state C with P=0.9 1753. Continuing this example, if the CLONER continues to search for states proximate to each next state (as has already been discussed), it may result three different state paths: Path 1 1791, Path 2 1792, and Path 3 1793, all arriving at the target state 1799. Each of the paths may have a probability or likelihood of being reached from the start state 1750; in one embodiment, the likelihood may be calculated as the product of the likelihood of reaching each of the states along the path. For example, the Path 1 1791 calculation would be $P_A*P_D*P_F$, (i.e., 0.5*0.9*0.9=0.405). Similarly, for Path 2 1792, the calculation would be $P_B*P_E$ (i.e., 0.7*0.5=0.35). Similarly, for Path 3 1793, the calculation would be $P_C*P_A*P_D*P_F$, (i.e., 0.9*0.9*0.9*0.9=0.6561).

As such, the CLONER may determine the likelihoods for each of the paths connecting to the target state(s) 1724. Upon determining the path likelihoods 1724, the CLONER may then select path(s) in a number of manners 1725. In the example three paths 1791, 1792, 1793, the most likely path is Path 3 having a likelihood of 0.6561, the next most likely path is Path 1 having a likelihood of 0.405, and the least likely path is Path 2 having a likelihood of 0.35. In one embodiment, the CLONER may select the path having the greatest likelihood, e.g., Path 3 1791. In another embodiment, a threshold may be specified, such that the CLONER will provide/present only the top paths over the threshold (e.g., if we used $P_{min}$ as the threshold and set it to 0.5, only Path 3 would be selected with its likelihood of 0.6561 exceeding that threshold). In another embodiment, all paths are presented to the user (e.g., in ranked order) so that the seeker may explore each of the paths. Upon selecting 1725 determined paths 1724, the CLONER may store the paths in memory, and/or otherwise return 1786 the resulting paths 1726 for further use by the CLONER, e.g., provide the resulting paths for visualization to the seeker 1606, 1611 of FIG. 16.

Path-Independent Iteration-wise CLONER

FIG. 18 is of a logic flow diagram illustrating iteration-wise path-independent path construction embodiments for the CLONER. Upon obtaining seeker experience advancement information 1602 and determining that a iteration-wise independent advancement path is desired 1604 of FIG. 16, the CLONER may use experience information to establish a start state and identify suitable subsequent states for advancement consideration 1832.

As has already been discussed in FIG. 17, in one embodiment, the seeker experience information may be provided by the seeker by way of a web form as shown in FIGS. 24, 25, 26. Unlike in the targeted embodiments discussed in FIG. 17 where a seeker may supply both a start state and target state 2528 of FIG. 25, a iteration-wise approach allows a seeker to identify a starting state in any number of ways as has already been discussed in FIG. 3 (e.g., identifying a category 2409, and zooming into a related state 2412, and making selections 2414 of FIG. 24 to add a selected state to a path 2541, 2546 of FIG. 11; typing in a search term 2424 to find matching states from a state structure 2426 of FIG. 24, and selecting those matching states to act as a starting state for a path; and/or the like).

In preparing to search for states proximate to a starting state, the CLONER may obtain a starting state (e.g., from experience information, from selection/indication obtained form a seeker via a user interface, and/or the like) and use a specified minimum likelihood thresholds for considering proximate states $P_{min}$ 1832, as has already been discussed above. Upon obtaining a start state and a minimum likelihood 1832, a seeker may also provide state filter information In one embodiment, state filter information may comprise: salary requirements, geographic region and/or location requirements, education requirements, relocation expense requirements, minimum occupational growth rates, expected demand levels for a state, and/or the like. This information may be supplied to the web interfaces discussed in FIGS. 24, 25, 26 and used as has already been discussed in FIG. 3. For example, additional criteria 2548 may be specified and supplied into text fields 2549. In one embodiment, these attributes may stored in an attributes database table, that table may have a state_ID field that makes those attributes associated with a particular state; as such the attributes may selected by a state, and may be used as criteria for filtering. Although in one embodiment, when selecting a state 2550 will show additional information associated with that state 2559, in an alternative embodiment, upon indicating that filtering should be used 2548, a user is able to place filtering criteria into fields 2549 of FIG. 25 that will be made part of the query to the state structure, which may have an associated attributes database, and such filtering criteria will be used to filter out unwanted states. These filter criteria may be part of the XML query structure as has already been described in FIG. 3. Upon obtaining a start state and minimum threshold 1832 and filter information 1836, a query is provided to the state structure and any associated attribute database 1838. The CLONER then obtains states next states proximate to the starting state having a minimum likelihood threshold and whose associated attribute information also satisfies the requirements of the supplied filter selections 1838. In another embodiment, a threshold may be based upon minimum likelihood and maximum number of results. If there are no matches 1840, the seeker may adjust the starting point and minimum thresholds and attempt to identify next states again In another embodiment, an error may be generated indicating no matches 1842. If there are matching states 1840, in one embodiment, those matching states 1840 may be appended to the starting state and made a part of the advancement path 1844. Those matching next states 1840 may then be displayed 1846. It should be noted that when making a selection of a state 2550, and supplying any filter criteria 2559, the CLONER may obtain matching 1840 states that may be tenuously appended as potential next states 2560 of FIG. 25. Seekers may make such appending more permanent by indicting they would like to add a state to a path they are constructing 2546, 2543 of FIG. 25, which may result in the updating and/or modification of the path depiction that is displayed 1846. Upon updating the display 1846, the CLONER may allow a seeker to continue on from the last selected/added state and iterate and continue to build a desired path further 1832; otherwise operations may return to FIG. 16 1686. It should be noted in one embodiment, this path-dependent iteration-wise mechanism may be use to select intermediate states in the targeted path-dependant mechanism described in FIG. 17.

Path-Dependent Iteration-wise CLONER

FIG. 19 is of a logic flow diagram illustrating iteration-wise path-dependent path construction embodiments for the CLONER. This is an alternative path-dependant embodiment of FIG. 22. Upon obtaining seeker experience advancement information 1602 and determining that a iteration-wise independent advancement path is desired 1604 of FIG. 16, the CLONER may use experience information to establish a start state and identify suitable subsequent states for advancement consideration 1832.

As has already been discussed in FIGS. 17 and 18, in one embodiment, the seeker experience information may be provided by the seeker by way of a web interfaces as shown in FIGS. 24, 25, 26. Unlike in the targeted embodiments discussed in FIG. 17 where a seeker may supply both a start state and target state 2528 of FIG. 25, a iteration-wise approach allows a seeker to identify a starting state in any number of ways as has already been discussed in FIG. 17. In an alternative embodiment, the CLONER take into account all the seeker's experience information. While in FIG. 18, examples were provided where a single experience state was provided and/or otherwise selected by the seeker, however, in this path-dependant embodiment, a seeker's full experience information may used as a basis of path discovery. Some seekers may have no experience history or a single entry, and in such instances, this path-dependant embodiment will look much like that path-independent embodiment. In one embodiment, a seeker may supply this experience information into structured web forms, which may be stored as structured data in a seeker profile associated with the seeker (e.g., a seeker may enter their resume job experiences into a web form). In an alternative embodiment, a seeker may provide their resume, which in turn may be parsed into structured data, the resulting structured data serving as experience information.

In preparing to search for states proximate to a path-dependent starting state, the CLONER may use a specified minimum likelihood threshold for considering a state proximate to the latest state in their experience information $P_{min}$ 195o. In one embodiment, a seeker may supply experience information, which will serve as path-dependant ("PD") criteria 1952, which as described in FIG. 17 (for example a state structure as may be represented, in one embodiment, by way of the XML structure), may include a temporal sequence and description of advancement progression (e.g., jobs 1, jobs 2, etc.). The CLONER may determine a state for each of these advancement progression entries and crate a path describing the seeker's past state path progression and use that path as a basis to search the state structure (e.g., as has been described above the last progression entry (e.g., the latest job held by a seeker) may be used as a basis from which the seeker will further build out their advancement (e.g., career) path. In one embodiment, the state structure may return state, which may be used by the CLONER as state advancement experience information. For example, the job entries (e.g., Job 1, Job 2, etc.) from the structured (e.g., XML) advancement experience information in FIG. 17 may be supplied to the state structure, which in turn may return equivalent job states. Instead of using the FIG. 17 advancement experience information, a state version of that information may be used by the CLONER, for example:

```
<State Advancement Experience Information ID = "experience12345">
    <Experience Information>
        <State ID 1> 111111 </State ID 1>
        <State ID 2> 222222 </State ID 2>
        <State ID 3> 333333 </State ID 3>
    </Experience Information>
    <Advancement Information>
        <DescriptionTerms>
            <Term1> Executive </Term1>
            <Term2> Consultant </Term2>
        </DescriptionTerms>
    </Advancement Information>
    <Filter Information>
        <DescriptionTerms>
            <Filter1> Salary > $100,000 </Filter1>
            <Filter2> Region Zipcode [e.g., 10112] < 25 miles </Filter2>
            <Filter3> Degree < Masters </Filter3>
            <Filter4> Growth > 20% </Filter4>
            <Filter5> Relocation Expenses = TRUE </Filter5>
            <Filter6> Expected Next Year Occupation Demand Level >
            20,000 jobs
</Filter6>
            <Filter7> Signing Bonus > $10,000 </Filter7>
            <Filter8> Annual Technology Stipend > $5,000 </Filter8>
```

```
<Filter9> Annual Health Insurance Stipend > $25,000 </Filter9>
<Filter10> Regular Travel = False </Filter10>
<Filter11> Salary Level > [Top] 10% [in field] </Filter11>
  </DescriptionTerms>
</State Advancement Experience Information ID >
```

In the above state version of advancement experience, the state structure provided state equivalents of the job entries in the FIG. 17 experience information, and this state experience information may be supplied to the state structure as a path comprising State ID 1, State ID 2, and State ID 3 representing Job 1, Job 2 and Job 3 from the XML description in FIG. 17. Results from querying the state structure with an existing state progression path will provide the CLONER and use the latest advancement progression entry as a starting point; e.g., from the above state advancement experience information, State ID 3 would be the state from which a further advancement path would be build by the CLONER, i.e., State ID 3 would be the path-dependant start state to which additional path advancement states would be appended 1952.

Upon populating the CLONER with path-dependant criteria (e.g., with experience advancement experience information, state advancement experience information, and/or the like) 1952 and obtaining a minimum likelihood threshold 1950, a seeker may also provide state filter information 1954, which may be used to modify the path-dependent criteria 1954 (as has already been discussed in FIG. 18). In one embodiment, state filter information may comprise: salary requirements, geographic region and/or location requirements, education requirements, relocation expense requirements, minimum occupational growth rates, expected demand levels for a state, and/or the like. These filter criteria may be part of the XML query structure as has already been described in FIG. 17.

Upon obtaining a minimum threshold 1950, populating the CLONER with path-dependant criteria 1952 and filter information 1954, a query may be provided to the state structure and any associated attribute database 1956. For example, the state advancement experience information (or subset thereof) may be provided to the state structure as a query. Upon obtaining query results from the state structure, the CLONER may determine which of the returned states to use that satisfy the filter selections 1954 and minimum thresholds specified and retrieve the state records (and any associated attributes) related to the determined state(s) 1956. The CLONER may then determine if any state results match 1958; if not, the seeker may adjust the parameters of the search by starting over 1950, or alternatively an error is generated 1959.

If there are matching states 1958, in one embodiment, those matching states 1958 may be appended to the path-dependant starting state and made a part of the advancement path 1960. Those matching next states 1958 may then be displayed 1961. It should be noted that when making a selection of a state 2550, and supplying any filter criteria 2559, the CLONER may obtain matching 1958 states that may be visually appended as potential next states 2560 of FIG. 25, providing highlighting to show potential path connections. Seekers may make such appending appear more permanent 1963 by indicting they would like to add a state to a path they are constructing 2546, 2543 of FIG. 25, which may result in the updating and/or modification of the associations between states and generation of a path depiction that is displayed 1961. Upon updating the display 1961, the CLONER may allow a seeker to continue 1962 on from the last selected/added state 1960. If no continuation is desired or needed, operations may return to FIG. 16 1986. Otherwise, if continuation is desired 1962, the CLONER may allow a user to update their previous experience information 1963, 1964. If a user wishes to append or add states representing past experience (e.g., if the seeker did not initially supply all of their experience information as path dependent criteria 1952) 1964 and specifies such, the CLONER will allow them to append such experience states as path-dependence criteria 1952. In one non-limiting example, a seeker may build up 2546, 2543 of FIG. 25 states representing their experiences in this manner. Alternatively, the seeker may not wish to append experience states 1963, yet the CLONER may determine if any changes to any of the path-dependence criteria was affected by the seeker (e.g., a seeker may have changed an originally supplied experience state to another, the other perhaps showing a promotion in their most current work employment) 1965. If no changes to path-dependant criteria were determined 1965, the CLONER may continue to iterate and build a path based on the last appended state 1960, 1956. However, if there has been a change in the path dependant criteria 1965, this changed criteria will form the basis of iterated path dependent criteria 1952.

Path-Independent N-Part Open-Ended CLONER

Figure 20:
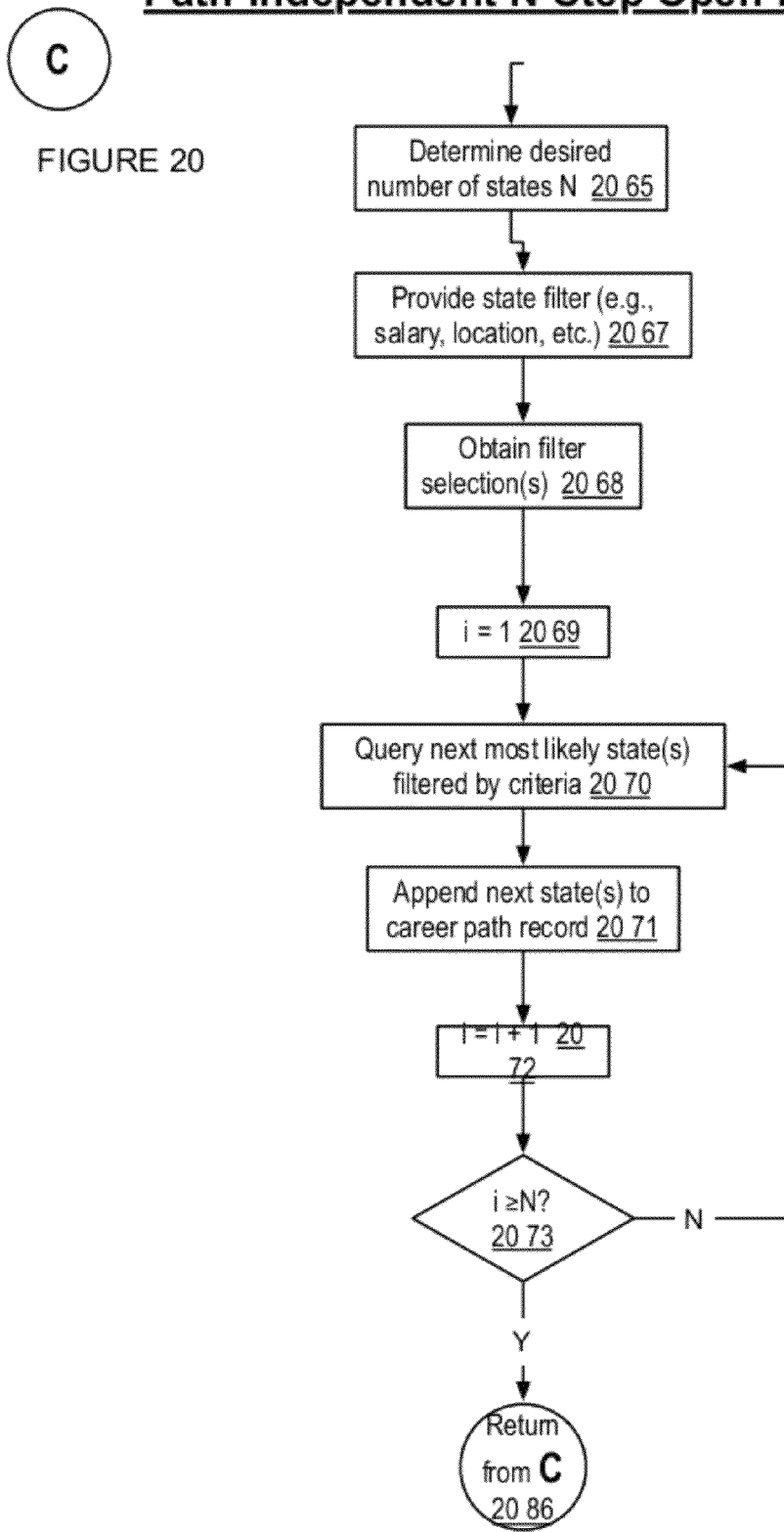
FIG. 20 is of a logic flow diagram illustrating N-part path-independent path construction embodiments of the CLONER.

FIG. 20 is of a logic flow diagram illustrating N-part path-independent path construction embodiments for the CLONER. This is an alternative path-independent open-ended embodiment of FIG. 18. Upon obtaining seeker experience advancement information 202 and determining that a iteration-wise independent advancement path is desired 204 of FIG. 2, the CLONER may use experience information to establish a start state and identify suitable subsequent states for advancement consideration 2065.

As has already been discussed in FIGS. 17, 18 and 19, in one embodiment, the seeker experience information may be provided by the seeker by way of a web form as shown in FIGS. 24, 25, 26. Unlike in the iteration-wise embodiments discussed in FIG. 4, an open-ended approach allows a seeker to identify a starting state in any number of ways as has already been discussed in FIG. 17; it also allows the seeker to specify desired path length N. As such, the CLONER, an administrator, another system, or the seeker may specify the desired number of states to comprise an advancement path, that length being "N" 2065.

Figure 30:
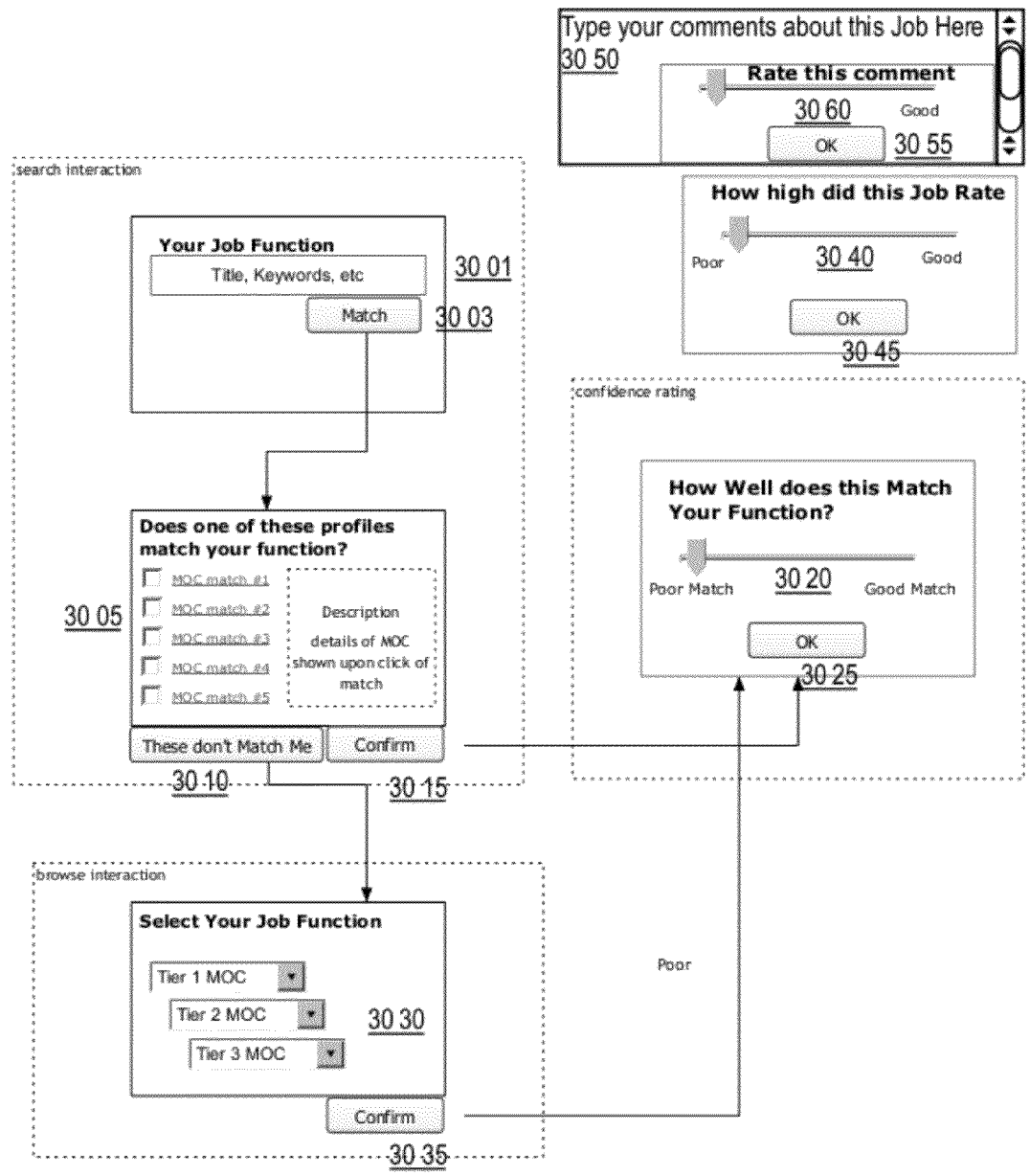
FIG. 30 is a block diagram illustrating feedback interactions with a CLONER.

In preparing to search for states proximate to a starting state, the CLONER may obtain a starting state (e.g., from experience information, from selection/indication obtained form a seeker via a user interface, and/or the like) and use the specified path length limit N, as has already been discussed above. Upon obtaining a start state and limit 2065, a seeker may also provide state filter information 2067. In one embodiment, state filter information may comprise: salary requirements, geographic region and/or location requirements, education requirements, relocation expense requirements, minimum occupational growth rates, expected demand levels for a state, and/or the like. This information may be supplied to the web interface discussed in FIGS. 24, 25, 26 and used as has already been discussed in FIG. 17. For example, additional criteria 2548 may be specified and supplied into text fields 2549. Although in one embodiment, when selecting a state 2550 will show additional information associated with that state 2559, in an alternative embodiment, upon indicating that filtering should be used 2548, a user is able to place filtering criteria into fields 2549 of FIG. 25 that will be made part of the query to the state structure, which may have an associated attributes database, and such filtering criteria will be used to filter out unwanted states. In another embodiment, browsing an associated hierarchy through nested pop-up menus 3030 of FIG. 30 or traversal and selection of nodes in a topography 2422, 2427 of FIG. 24 provide another mechanism for identifying states and building paths. These filter criteria may be part of the XML query structure as has already been described in FIG. 17. Upon obtaining a path limit and filter information 2068, the CLONER may set the current path length "i" to equal "1" 2069. The CLONER may then provide a query to the state structure and any associated attribute database 2070, including filter criteria, as has already been discussed. The CLONER then obtains states next states proximate to the starting state having a minimum likelihood threshold and whose associated attribute information also satisfies the requirements of the supplied filter selections, and may append those next states to the current advancement path 2071. I an alternative embodiment, a seeker may traverse by categorical hierarchy selections as show in 3035 of FIG. 30, whereby a seeker can iteratively make state selections by identifying states through hierarchical selections. Thereafter, the CLONER may increment the path length counter "i" by one 2071 to track the growth of the path length resulting from the appending 2070. If the maximum path length N has not been reached 2073, the CLONER may iterate and similarly conduct queries on the appended next states, to extend the path 2070. If the path length has been reached 2073, operations may return to FIG. 16 2086.

Path-Independent N-Part Open-Ended CLONER

Figure 21:
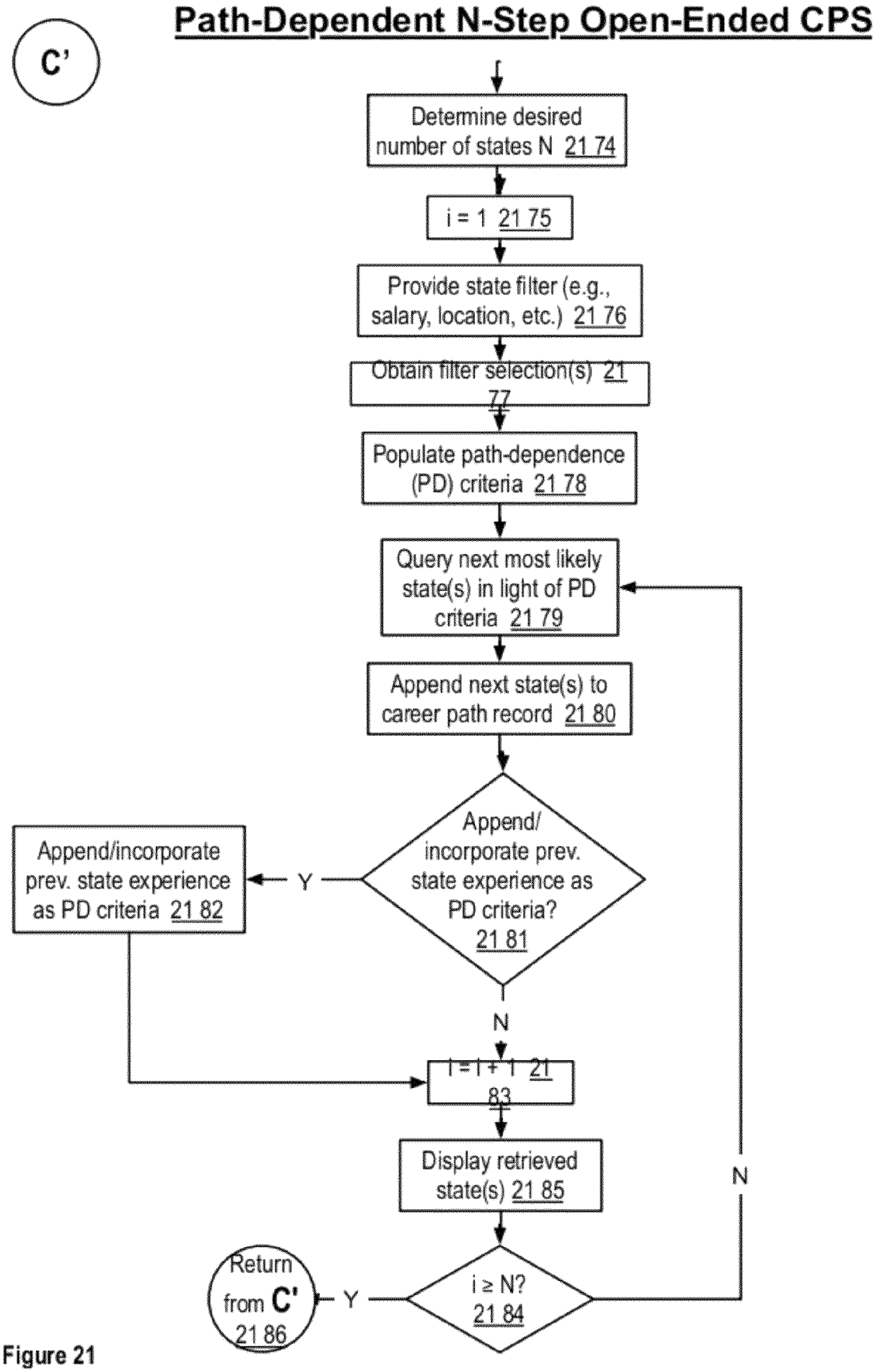
FIG. 21 is of a logic flow diagram illustrating N-part path-dependent path construction embodiments of the CLONER.

FIG. 21 is of a logic flow diagram illustrating N-part path-dependent path construction embodiments for the CLONER. This is an alternative path-dependent open-ended embodiment of FIG. 19. Upon obtaining seeker experience advancement information 1602 and determining that an iteration-wise independent advancement path is desired 1604 of FIG. 16, the CLONER may use experience information to establish a start state and identify suitable subsequent states for advancement consideration 2174.

As has already been discussed in FIGS. 17, 18, 19 and 20, in one embodiment, the seeker experience information may be provided by the seeker by way of a web form as shown in FIGS. 24, 25, 26. Unlike in the iteration-wise embodiments discussed in FIG. 19, an open-ended approach allows a seeker to identify a starting state in any number of ways as has already been discussed in FIG. 17; it also allows the seeker to specify desired path length N. As such, the CLONER, an administrator, another system, or the seeker may specify the desired number of states to comprise an advancement path, that length being "N" 2174. While in FIG. 20, examples were provided where a single experience state was provided and/or otherwise selected by the seeker, however, in this path-dependant embodiment, a seeker's full experience information may used as a basis of path discovery. Some seekers may have no experience history or a single entry, and in such instances, this path-dependant embodiment will look much like that path-independent embodiment. In one embodiment, a seeker may supply this experience information into web structured web forms, which may be stored as structured data in a seeker profile associated with the seeker (e.g., a seeker may enter their resume job experiences into a web form). In an alternative embodiment, a seeker may provide their resume, which in turn may be parsed into structured data, the resulting structured data serving as experience information.

In preparing to search for states proximate to a path-dependent starting state, the CLONER may discern a path-dependent starting state as has already been discussed in FIG. 5, and use the specified path length limit N 2174, as has already been discussed above. Upon obtaining a path limit N, the CLONER may set the current path length "i" to equal "1" 2175. A seeker may then provide state filter information 2176, which may be used to obtain resulting states matching the filter criteria 2177. In one embodiment, state filter information may comprise: salary requirements, geographic region and/or location requirements, education requirements, relocation expense requirements, minimum occupational growth rates, expected demand levels for a state, and/or the like. This information may be supplied to the web forms discussed in FIGS. 24, 25, 26 and used as has already been discussed in FIG. 17. For example, additional criteria 2548 may be specified and supplied into text fields 2549. Although in one embodiment, when selecting a state 2550 will show additional information associated with that state 2559, in an alternative embodiment, upon indicating that filtering should be used 2548, a user is able to place filtering criteria into fields 2549 of FIG. 25 that will be made part of the query to the state structure, which may have an associated attributes database, and such filtering criteria will be used to filter out unwanted states. These filter criteria may be part of the XML query structure as has already been described in FIG. 17. Upon obtaining a path limit 2174 and filter information 2176 and obtaining the filtered states 2177, a seeker may supply experience information, which will serve as path-dependant criteria 2178 as has already been described in 1952 of FIG. 19, and in FIG. 17. The CLONER will then return states matching the aforementioned criteria and may then create associations between states that appear to append those matching next states the path-dependant starting state, which are thereby made a part of the associated states representing the advancement path 2180.

Seekers may make such appending 2180 more permanent by indicting 2181 they would like to add a state to a path they are constructing 2546, 2543 of FIG. 25. As such, the CLONER may allow a user to update their previous experience information 2181, 2182. If a user wishes to append or add states representing past experience (e.g., if the seeker did not initially supply all of their experience information as path dependent 2178) 2182 and specifies such, the CLONER will allow them to append such experience states as path-dependence criteria 2182. In one non-limiting example, a seeker may build up 2546, 2543 of FIG. 25 states representing their experiences in this manner. Alternatively, the seeker may not wish to append experience states 2181, and then the CLONER may increment the path length by one 2183 to indicate that the current path has grown by one. Upon incrementing the current state, it may result in the updating and/or modification of the path depiction that is displayed 2185. Upon updating the display 2185, the CLONER may determine if the maximum path length N is less than the current path length i; if the current length of "i" is longer, then operations may return 2186 to FIG. 16 1986. Otherwise 2184, the CLONER may continue to grow to set lengths N by iterating 2179.

Path Gap Analysis

Figure 22:
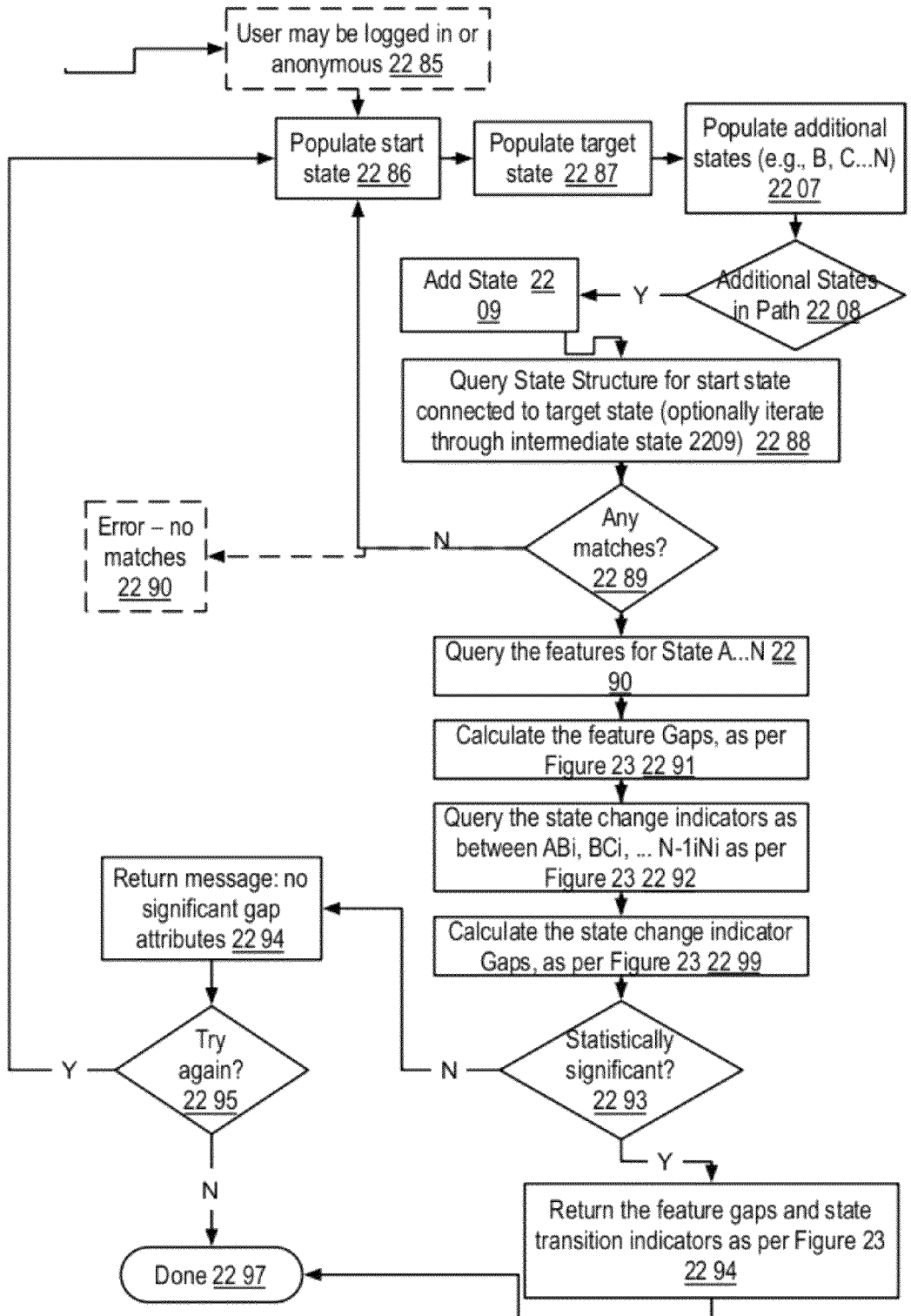
FIGS. 22 and 23 are of a logic flow diagram illustrating gap analysis embodiments of the CLONER.

FIG. 22 is of a logic flow diagram illustrating gap analysis embodiments for the CLONER. In one embodiment, a seeker may access the CLONER (e.g., either anonymously, be logged into the system, and/or the like) 2285. In so doing, the seeker may provide the CLONER with a start state 2286 and target state 2287, as has already been discussed in FIG. 21. The CLONER may also populate additional states (e.g., B, C . . . N) in an embodiment that allows for multi-segment gap analysis. As such, the CLONER will determine if it needs to analyze across multiple pat states 2208, and if so, it will add those states for analysis and subsequent iteration 2209, otherwise 2208, the CLONER will continue by initiating querying 2288. The CLONER may use the start and target states as a basis to query the target state structure to discern states proximate to the target state 2288. In an alternative embodiment, the CLONER may supply an intermediate target state; this may be achieved by first specifying a start state and an intermediate target state and generating a path therebetween as already discussed; thereafter another path is generated as between the intermediate target state being supplied as a starting state and specifying a final target state, and once again determining a path therebetween; the two paths being connected. If the CLONER does not obtain any matches 2289, the seeker will be afforded an opportunity to restart 2286, and/or alternatively an error message may be generated 2290. If the CLONER does identify matches 2289, then the CLONER may query the feature attributes and transition values as stored in an attributes table occurring in time between the start and next state (e.g., as between A and B, then B and C, and N−1 and N; N being the target state) 2290; when there are only two states, there is just a start state and target state. For example, the CLONER may query an attributes database with attributes associated with states from the state structure (e.g., as in the advancement taxonomy), wherein the attributes maintain information differences in salary as between different individuals having the same employment state. As such, the CLONER examines the attributes database record entries associated with each state and determine the common gap attributes; in another embodiment, an administrator specifies which attribute types have the most common gap attributes. Thereafter, the CLONER may calculate the feature gaps 2291 as discussed in greater detail in FIG. 23. Similarly to the previous query for features 2290, the CLONER may query for state change indicators as between states (e.g., as between ABi, BCi . . . N−1Ni) 2292. Similarly to the feature gap calculation, the CLONER may calculate the state change indicators 2299 as discussed in greater detail in FIG. 23. In one embodiment, the CLONER may determine if these calculated gaps are statistically significant 2293 (e.g., by determining comparing it the value exceeds a common standard deviation for the gap type). If these are statistically significant, then the CLONER may return these gap feature attributes and transition indicators (e.g., as discussed in greater detail in FIG. 23), which may be provided to the seekers (e.g., to see how their salary compares to others living in the same region and having the same vocational post) 2296; in one embodiment, this gap analysis may be employed by CLONER for benchmarking. If there is no statistical significance 2293, then an error message may be returned, noting that no significant gap attributes exist 2294 and the CLONER will allow a user to try 2295 and recurse 2286 if the seeker so whishes 2295, otherwise gap analysis operations cease. In one embodiment, such gap analysis may be instantiated when user selects additional options 2647, 2666 of FIG. 26 after having selected start and target states.

Figure 23:
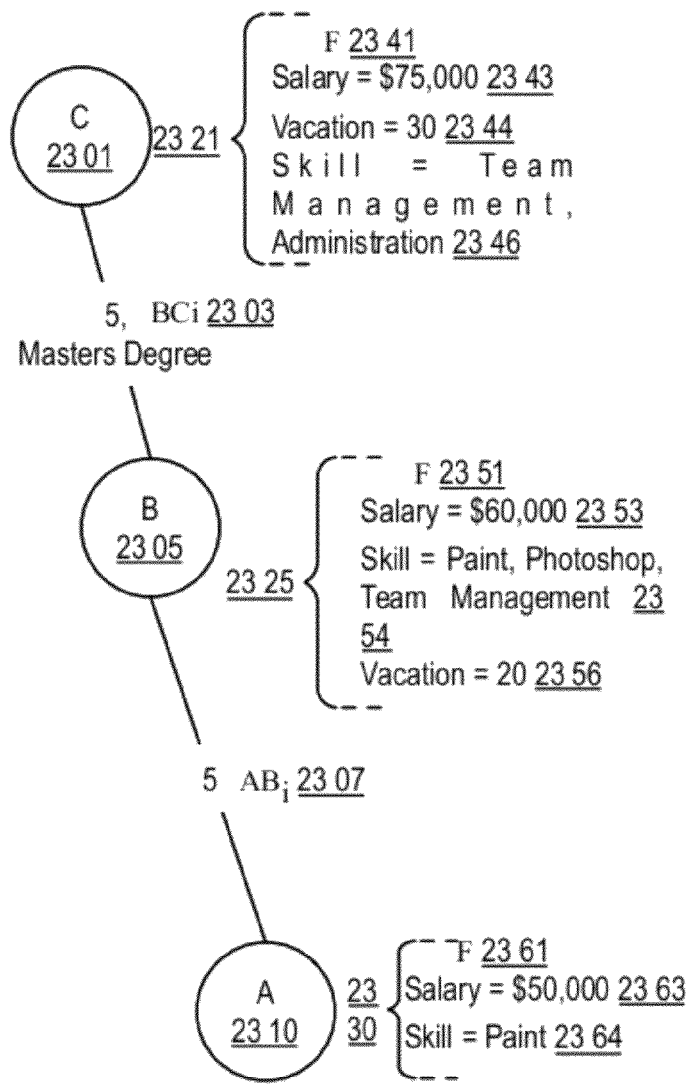
Figure 24A:
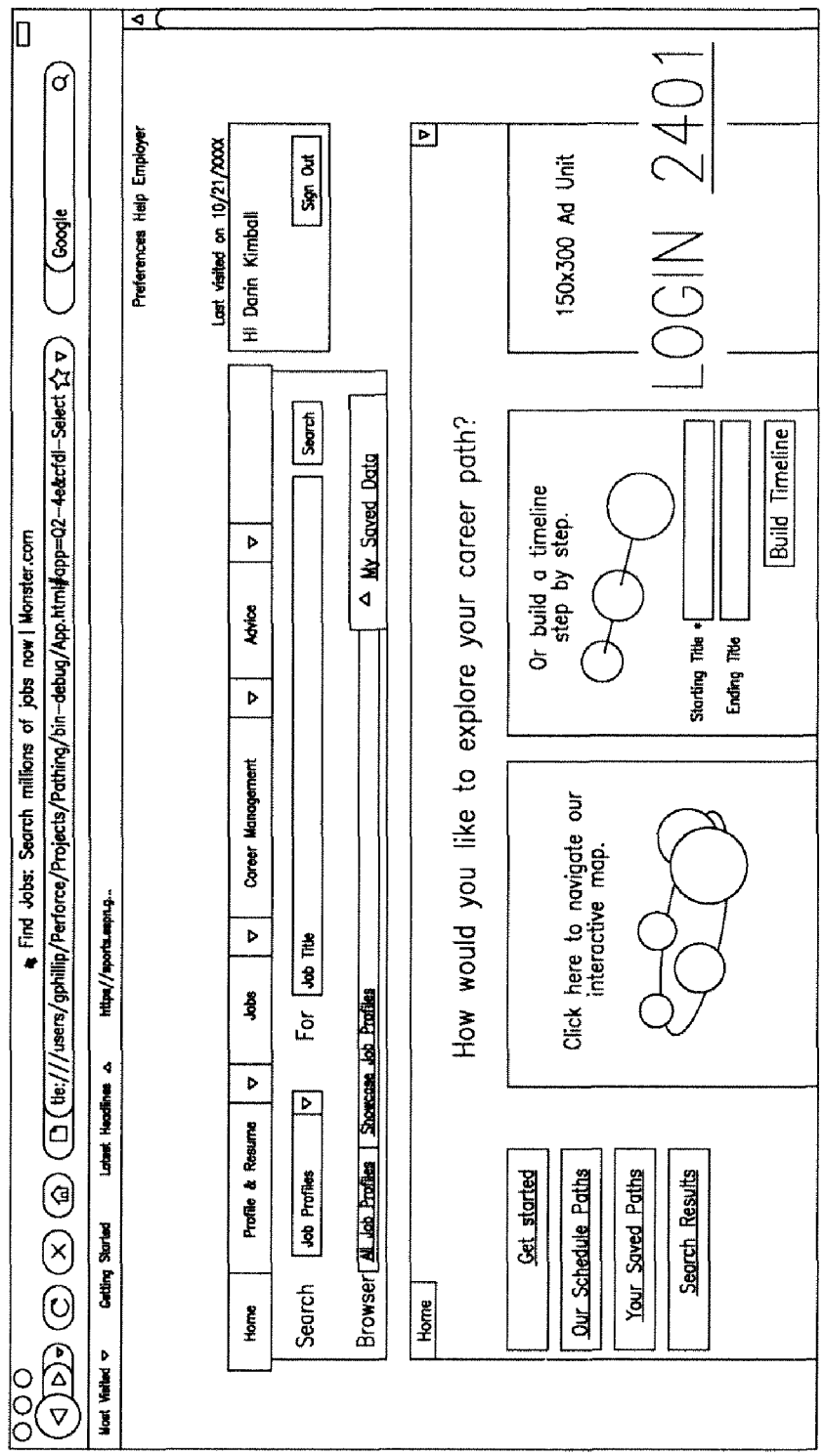
Figure 24B:
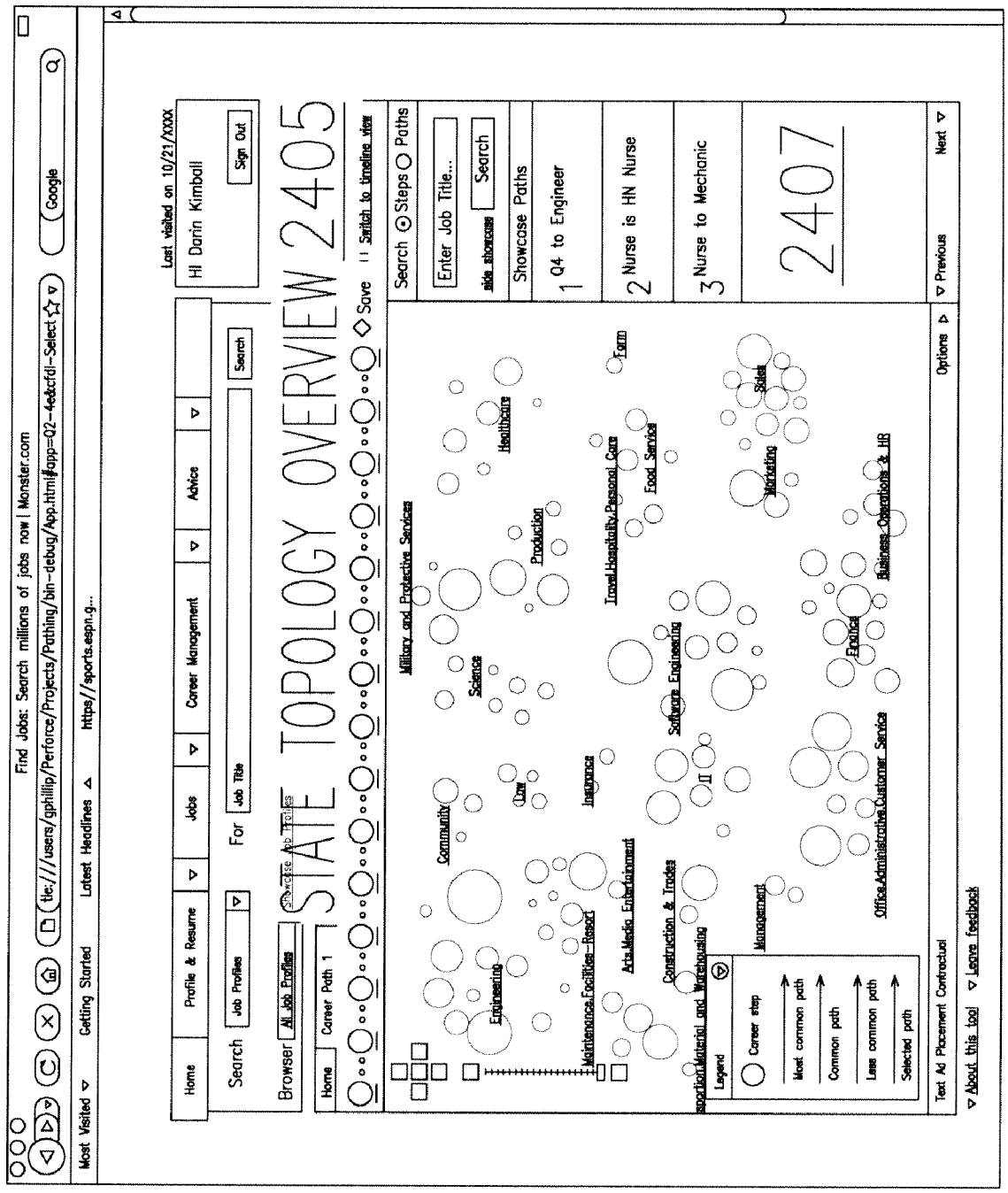
Figure 24C:
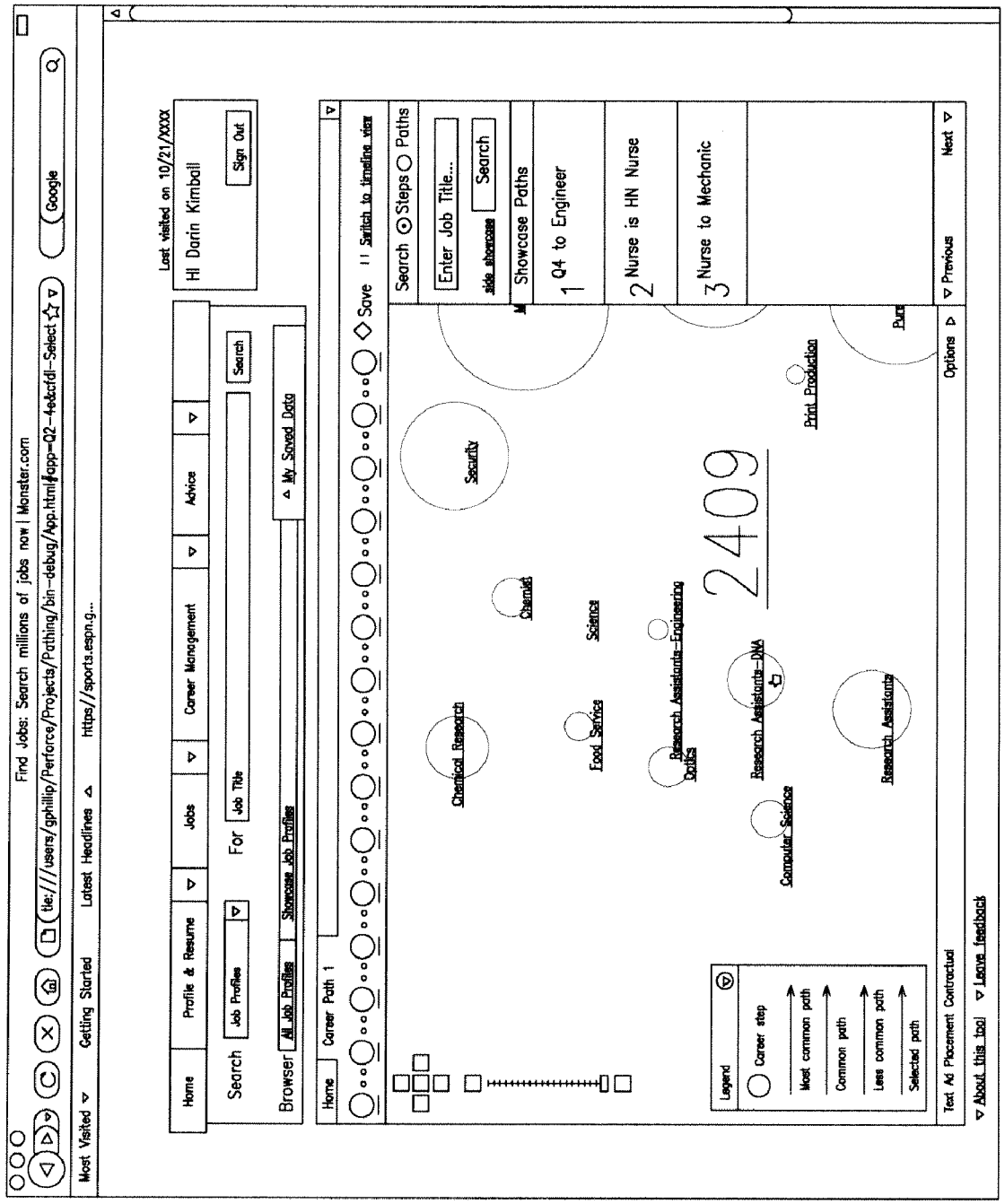
Figure 24D:
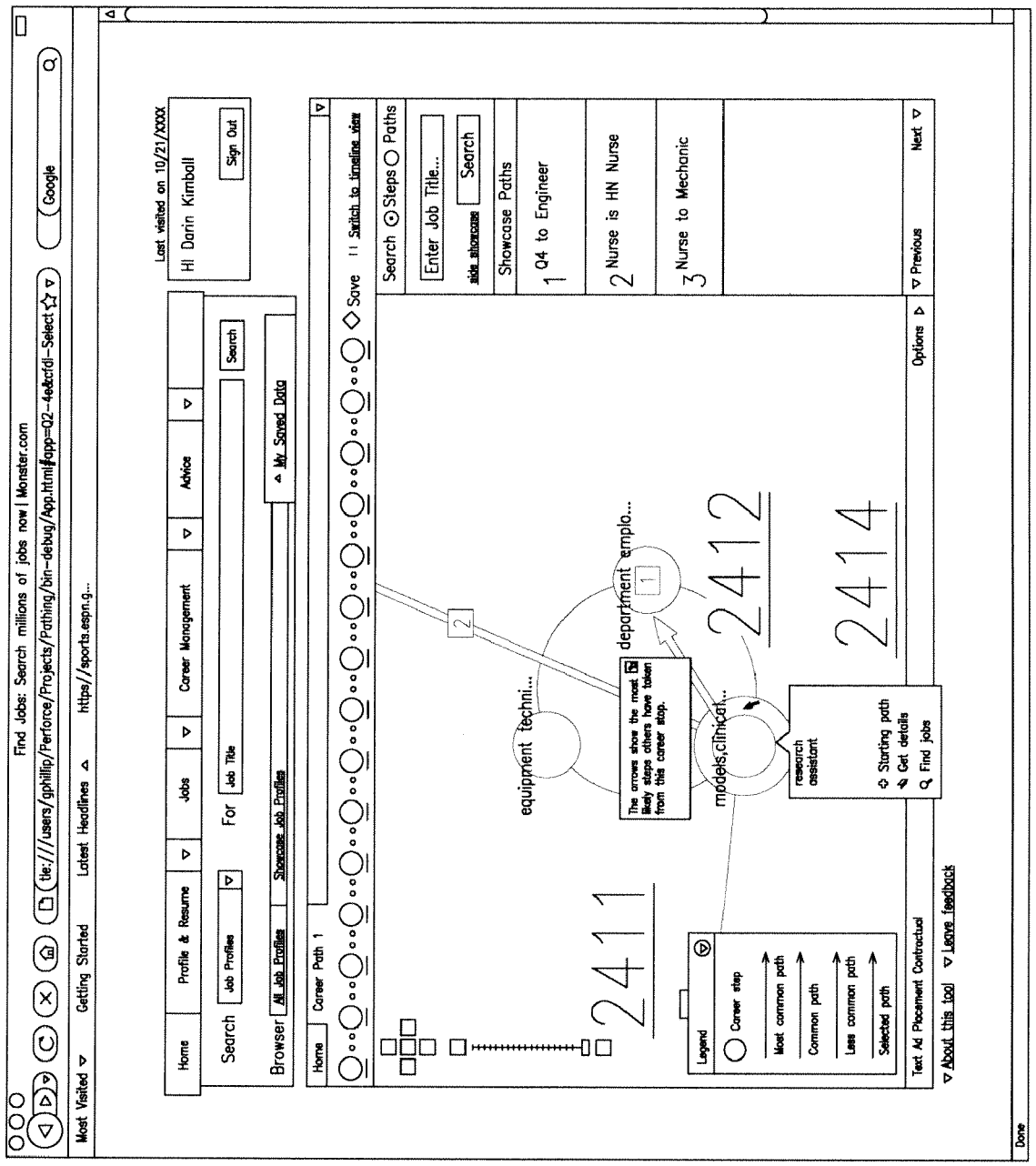
Figure 24E:
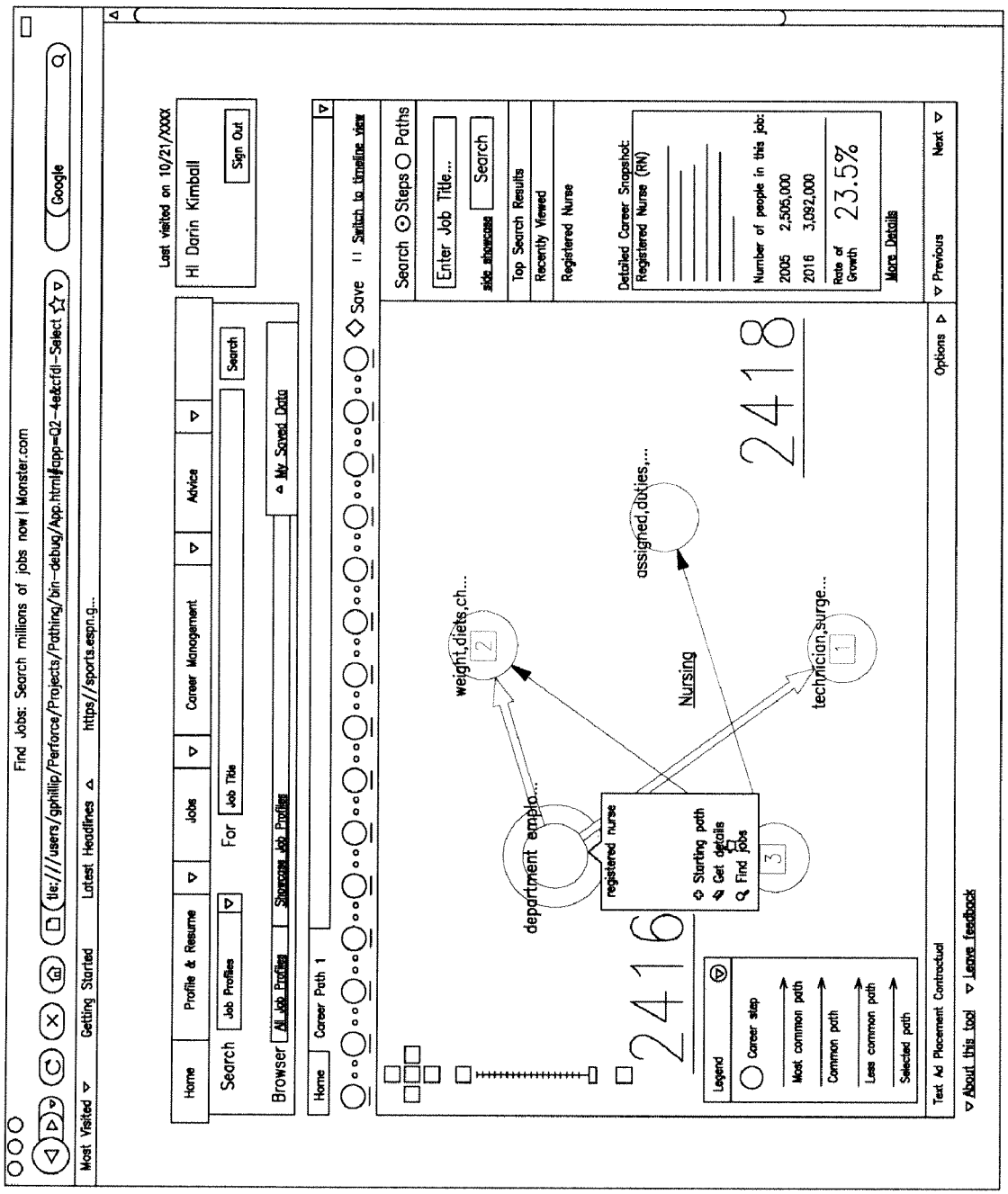
Figure 24F:
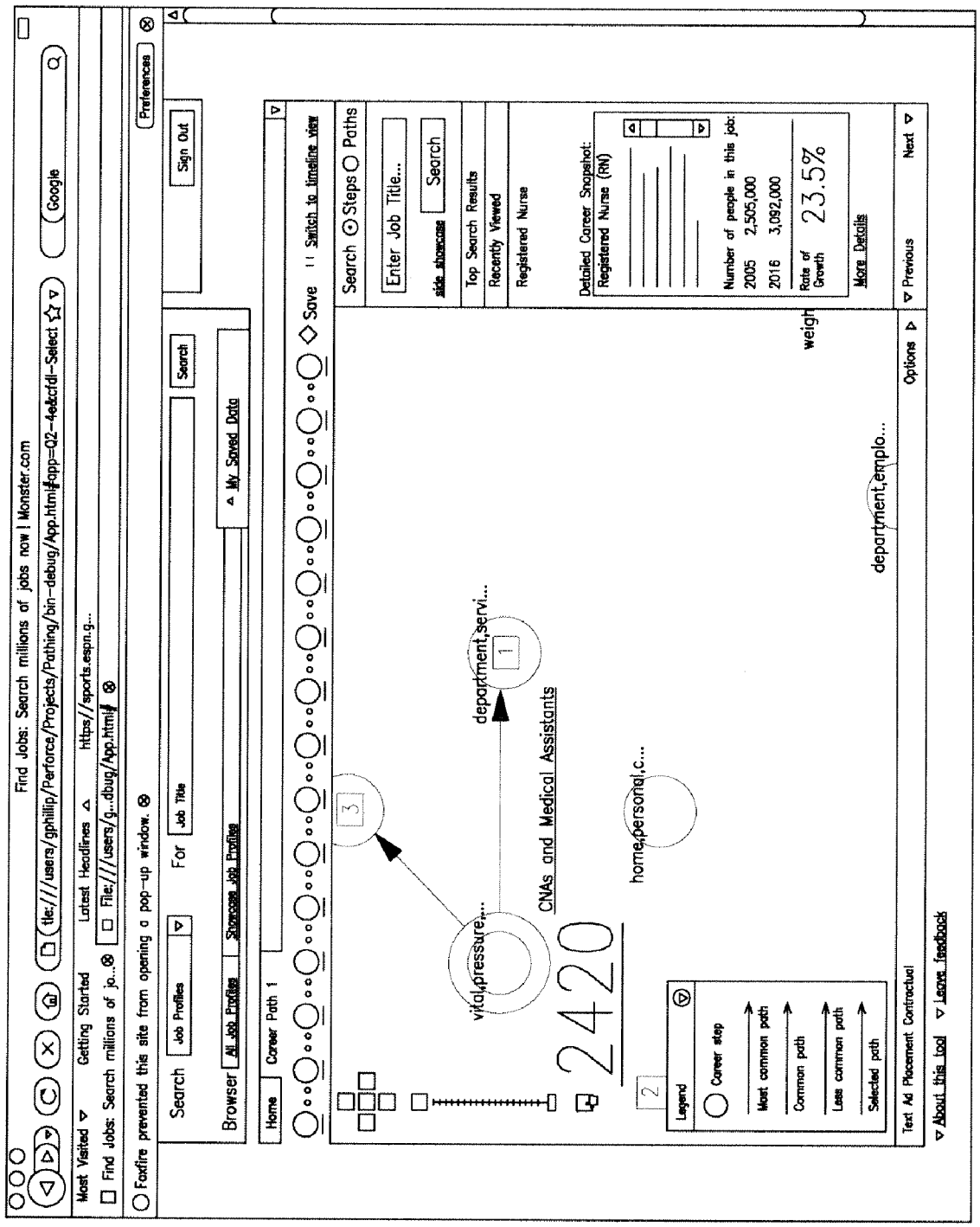
Figure 24G:
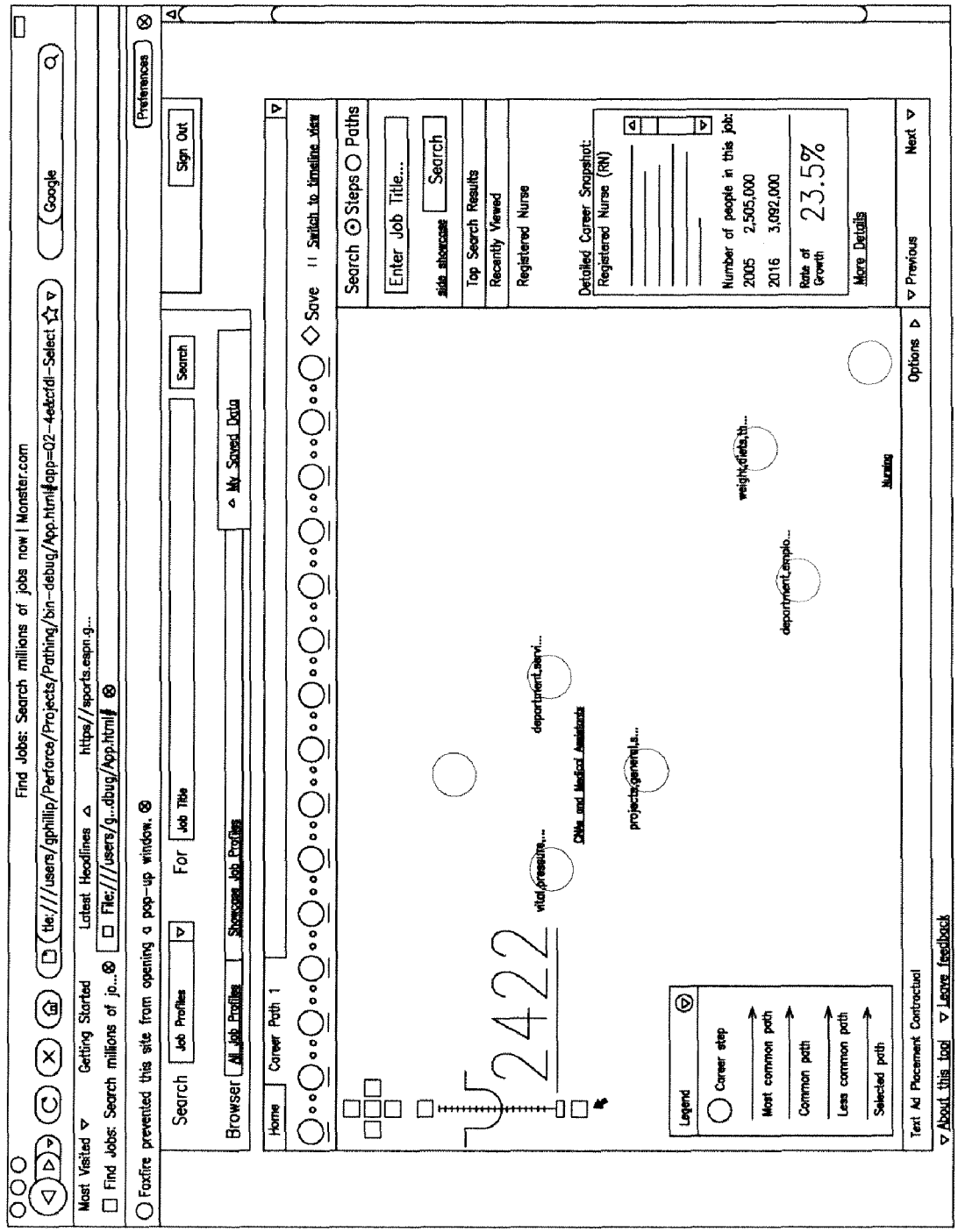
Figure 24H:
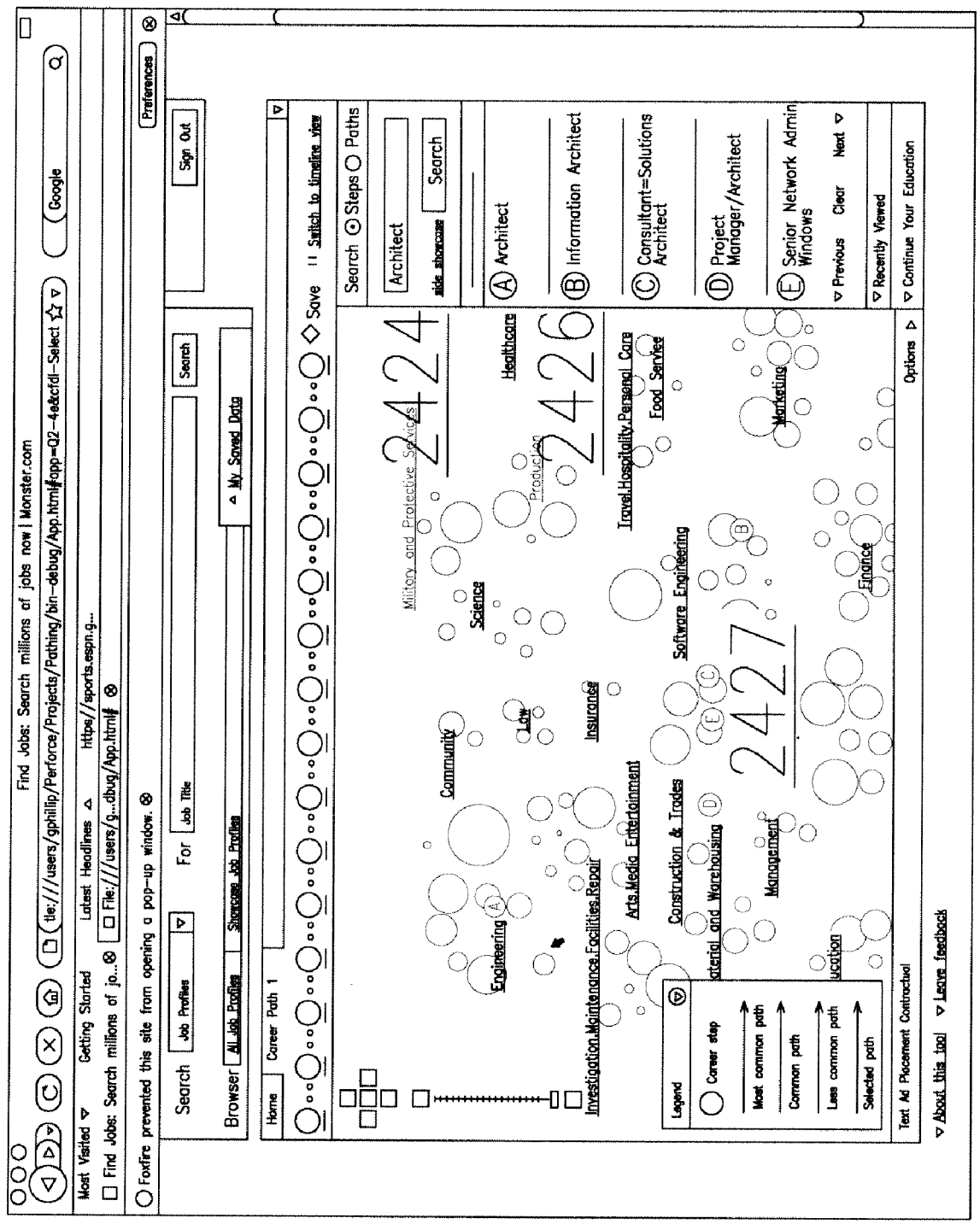
Figure 25A:
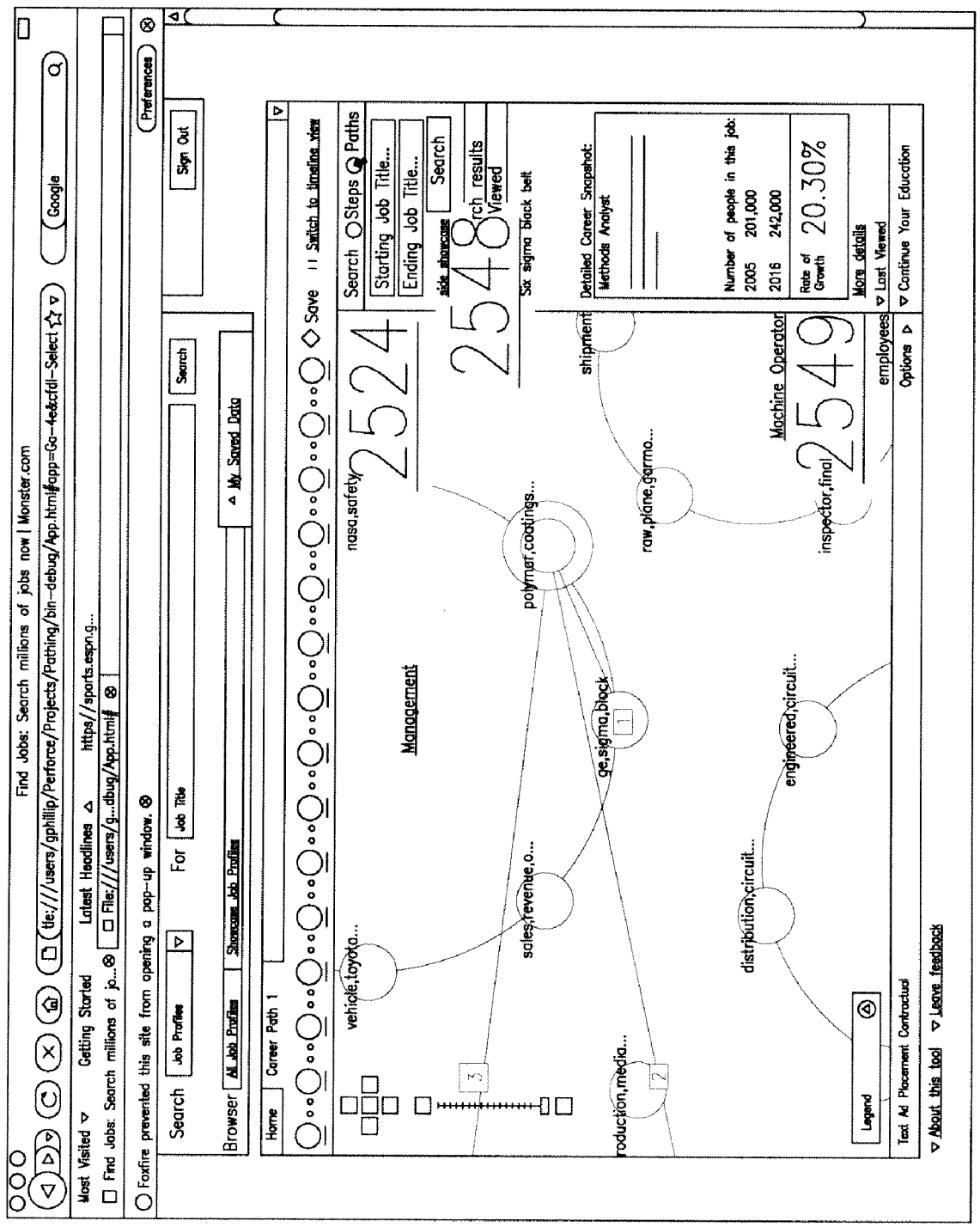
Figure 25B:
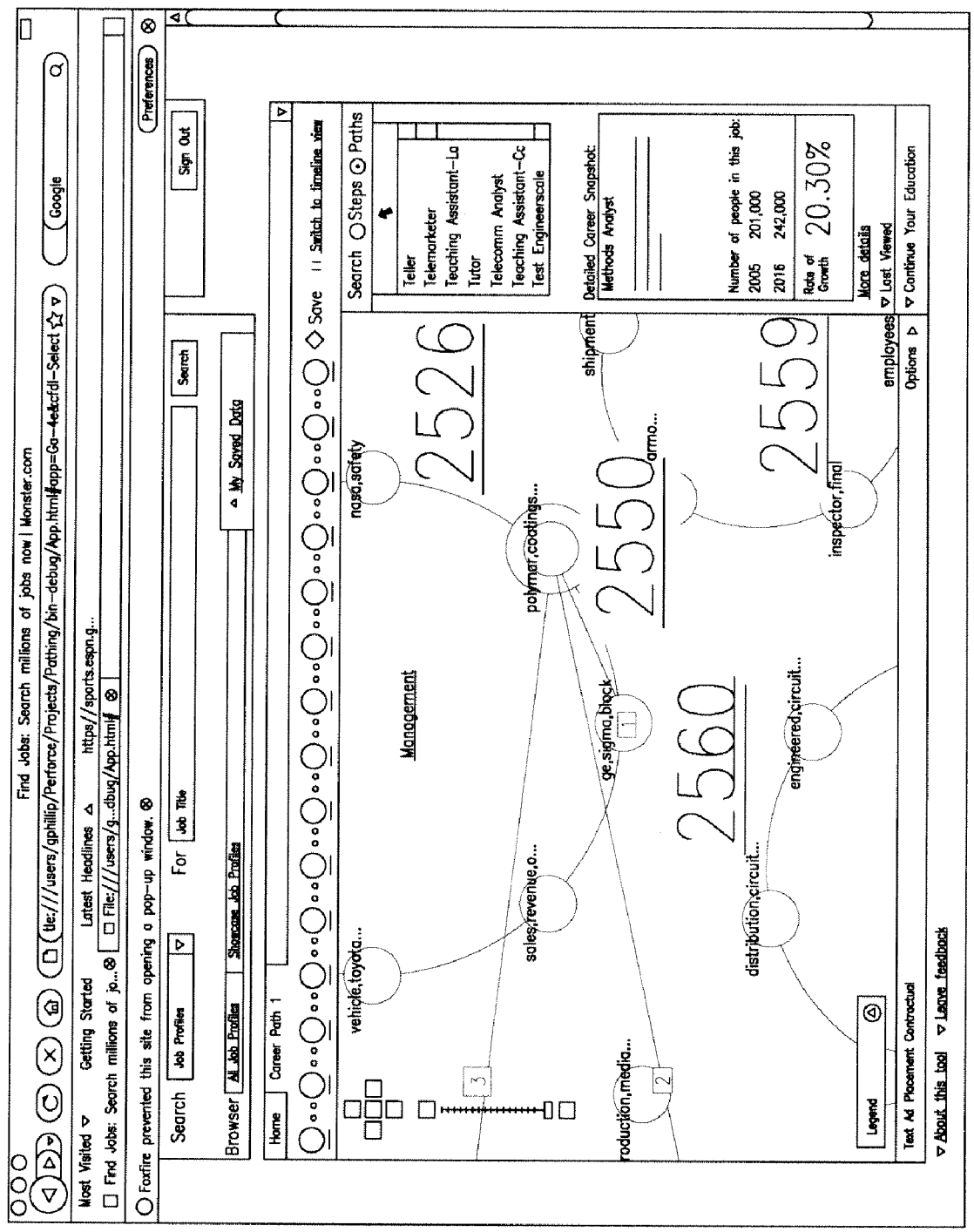
Figure 25C:
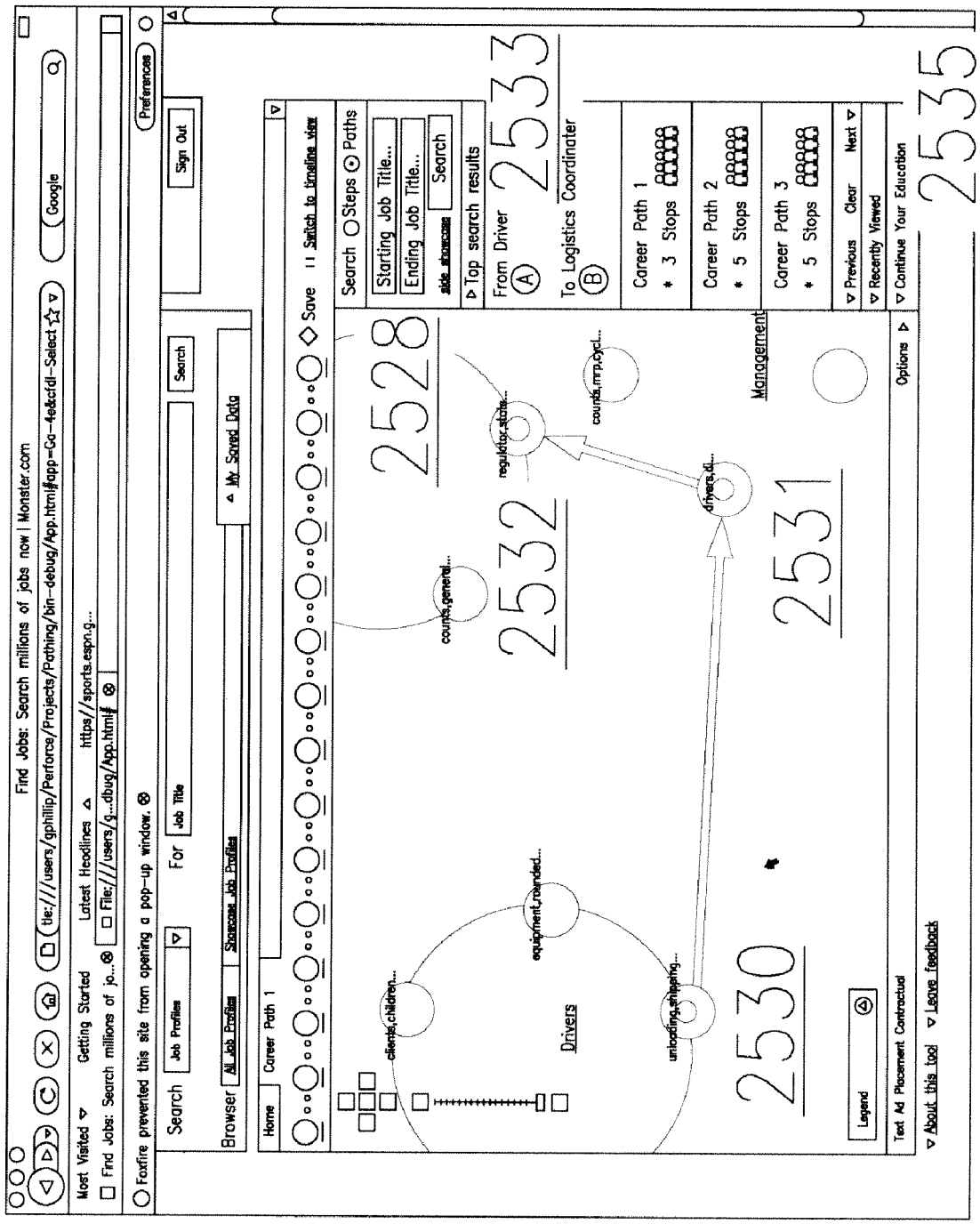
Figure 25D:
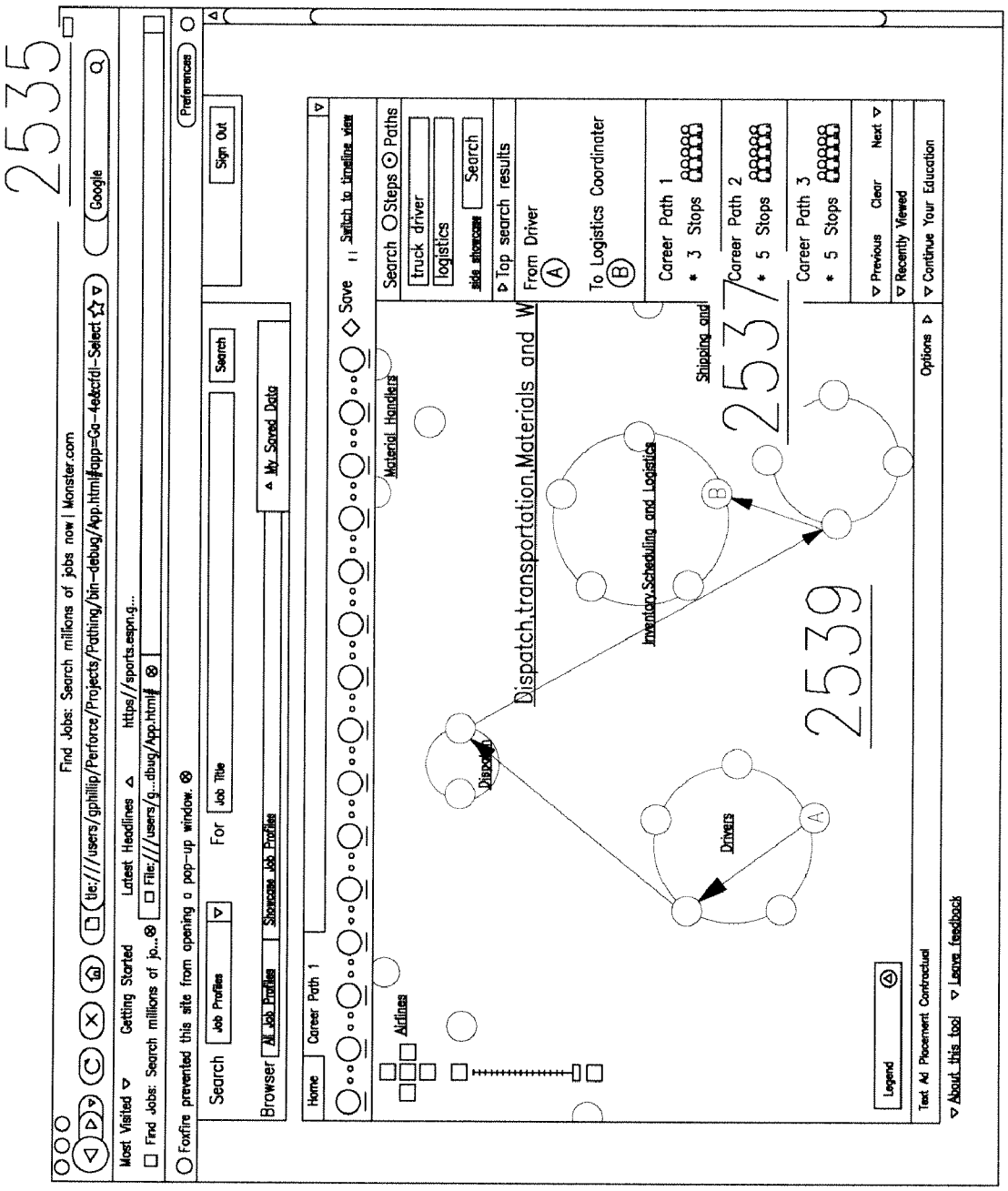
Figure 25E:
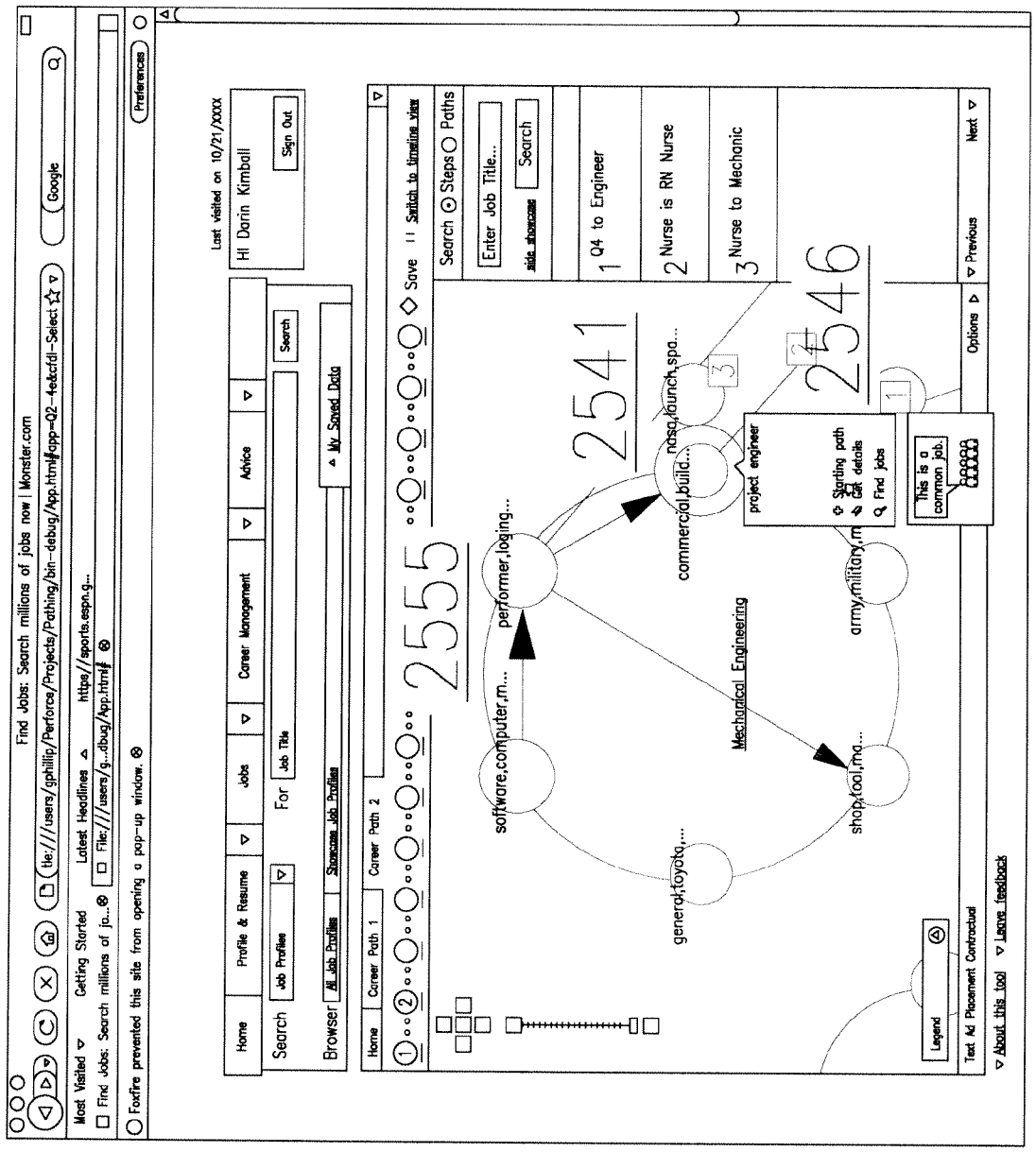
Figure 25F:
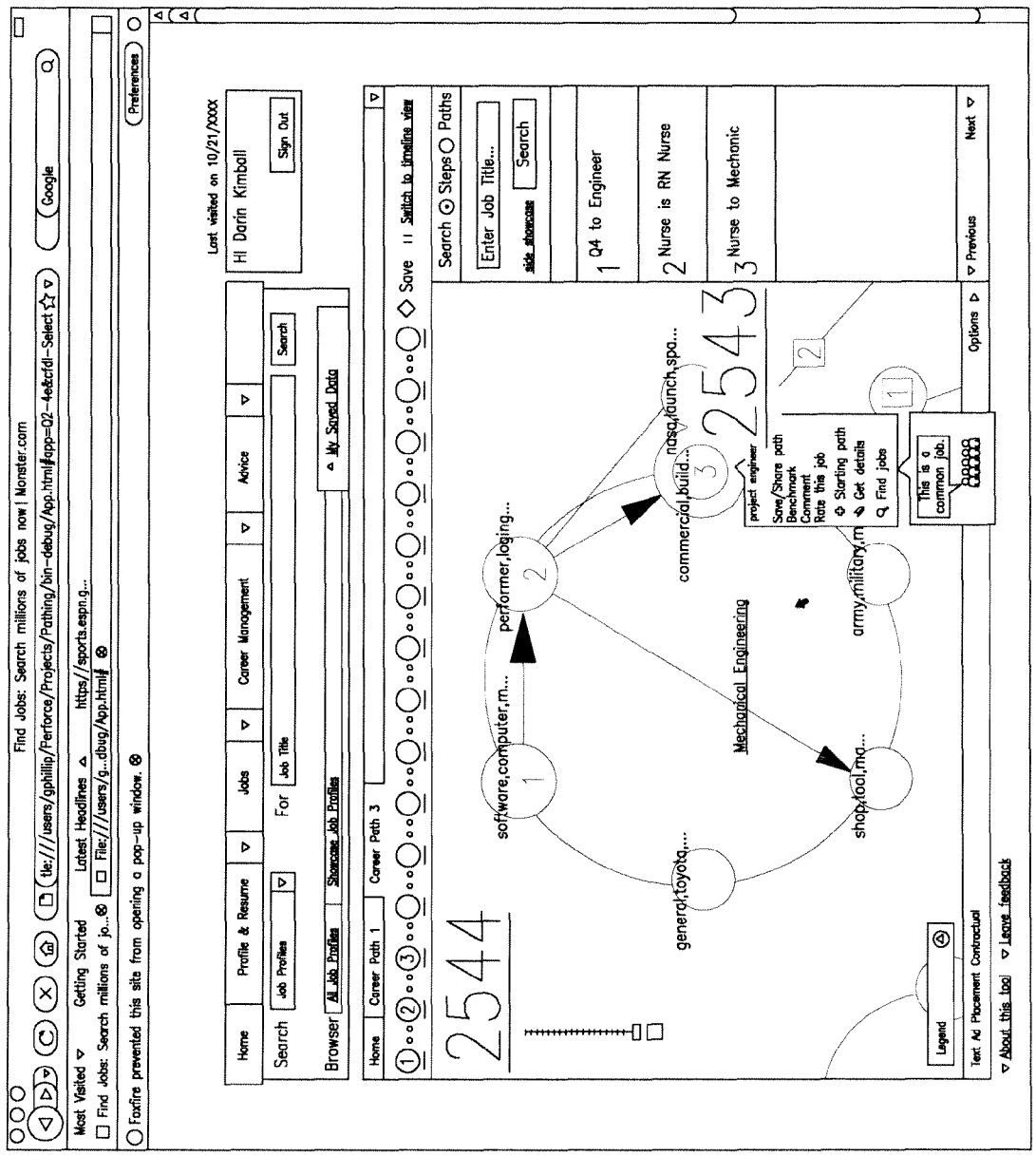
Figure 26A:
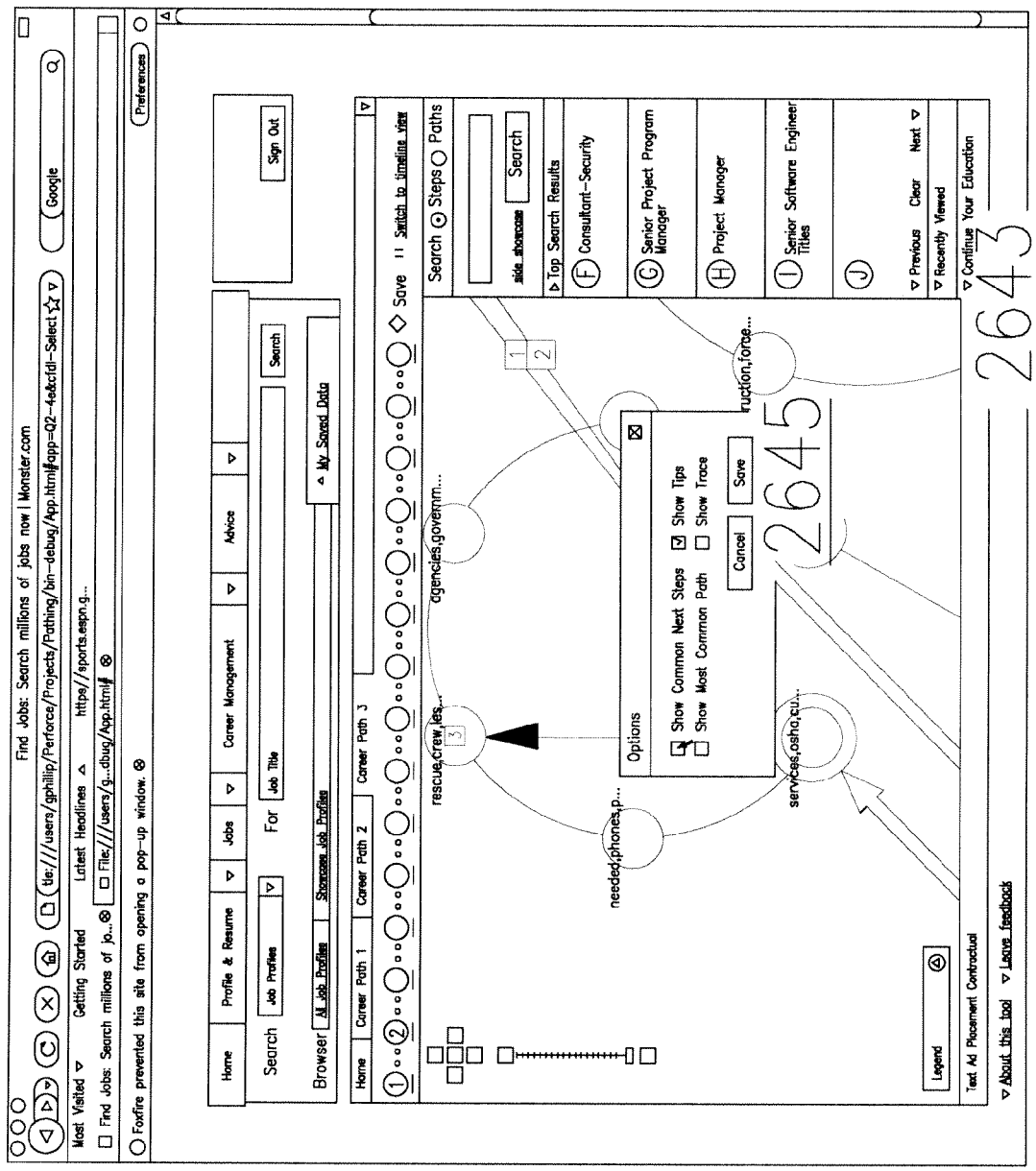
Figure 26B:
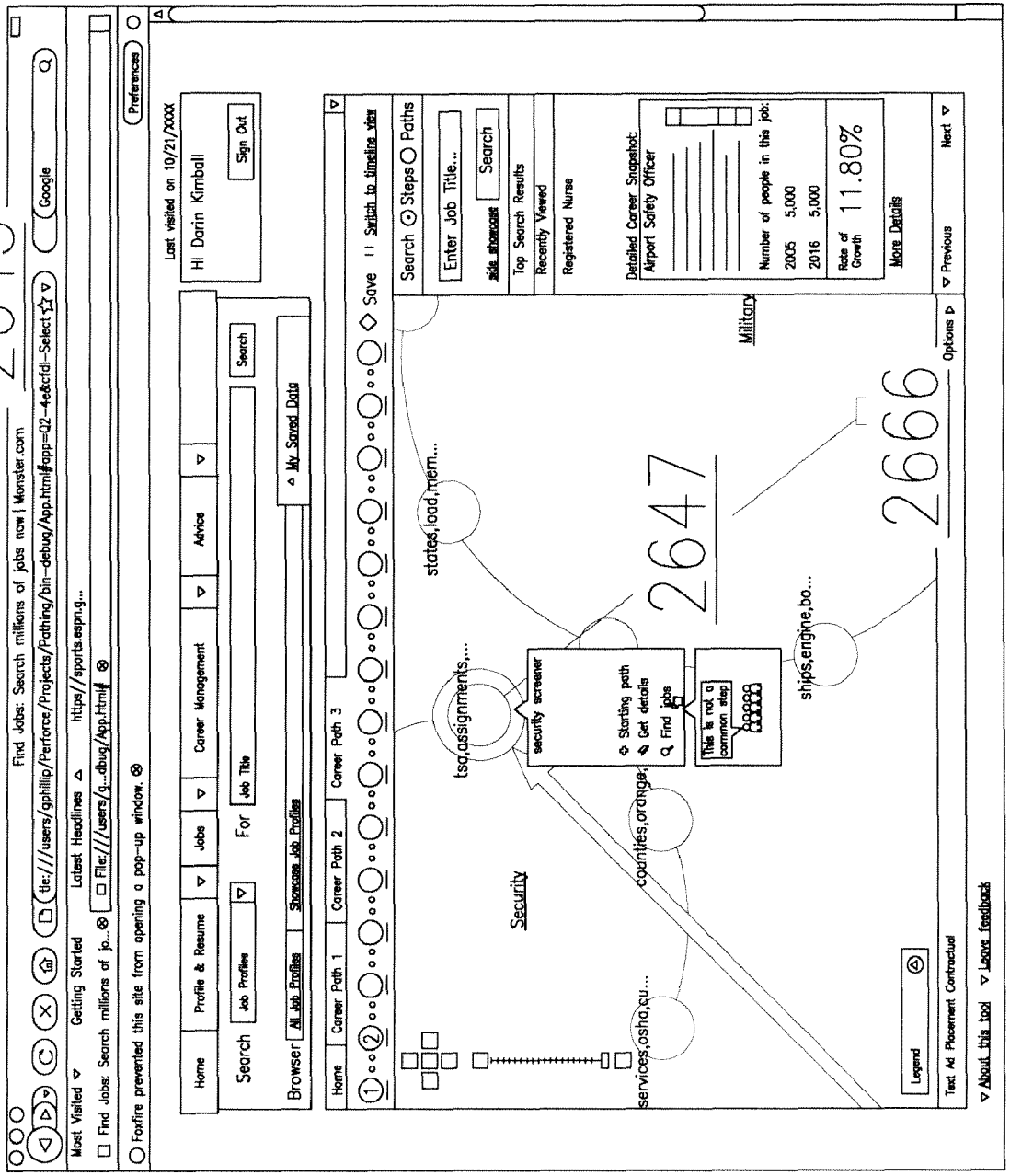
Figure 26C:
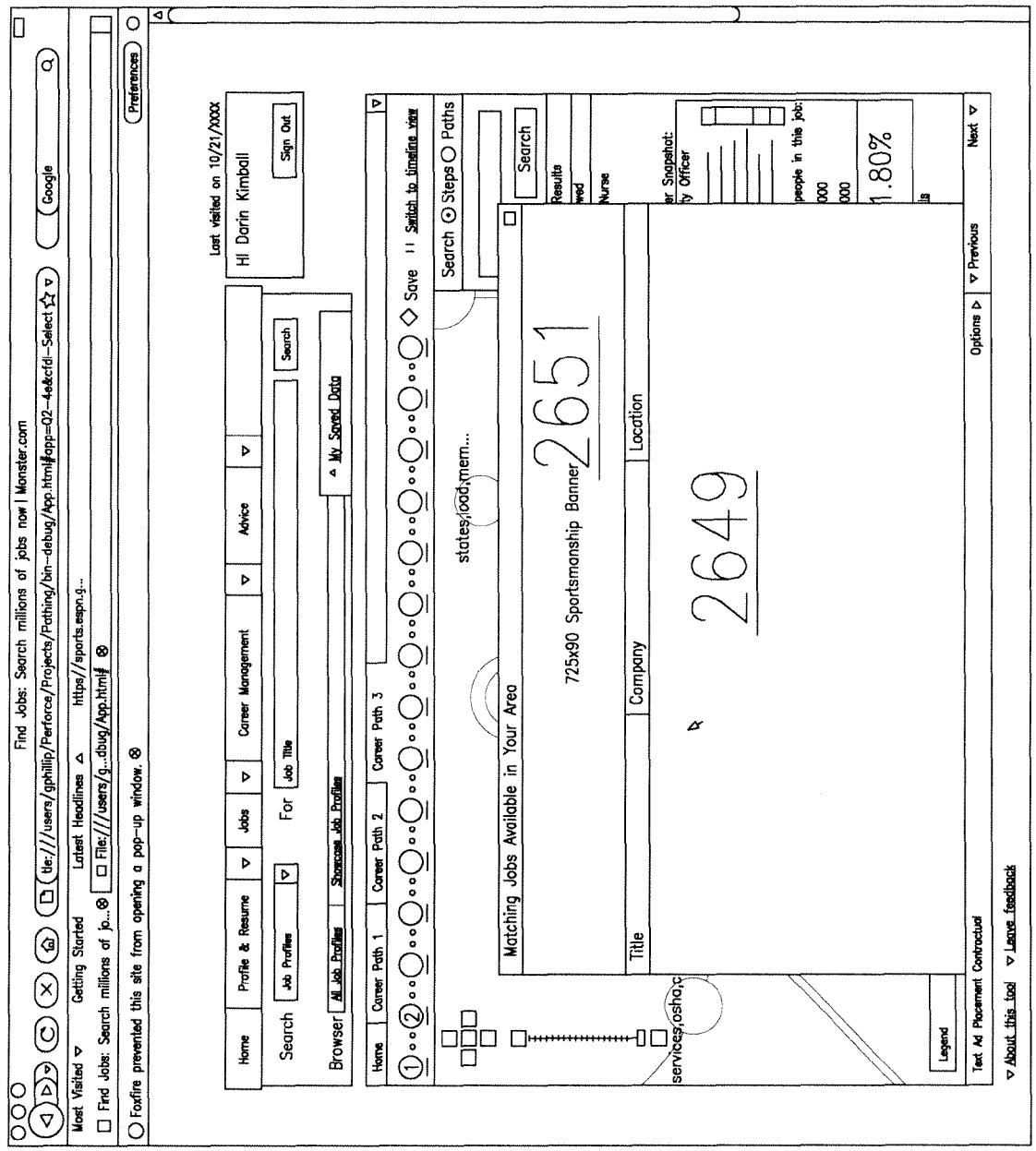
Figure 26D:
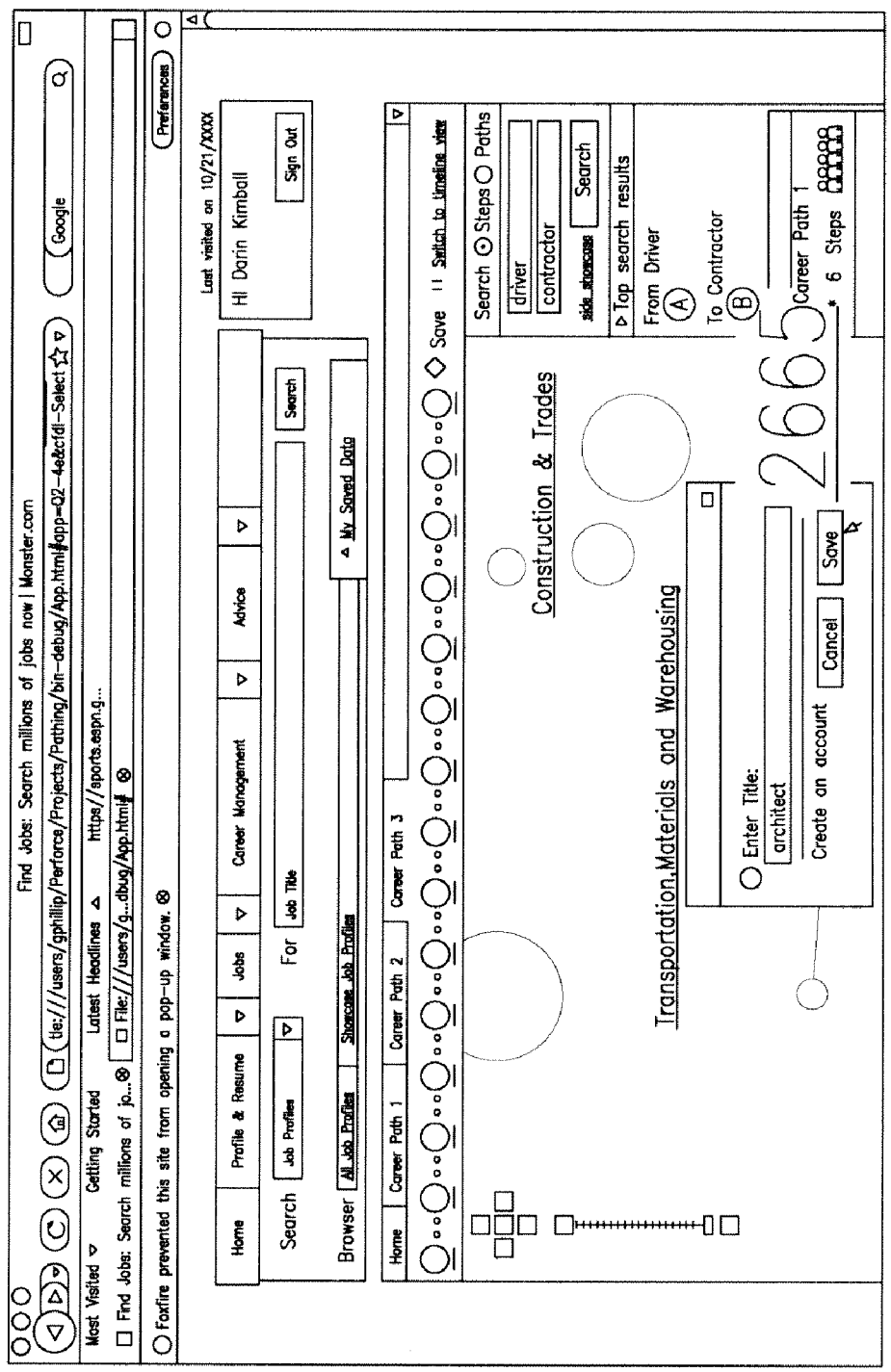
Figure 26E:
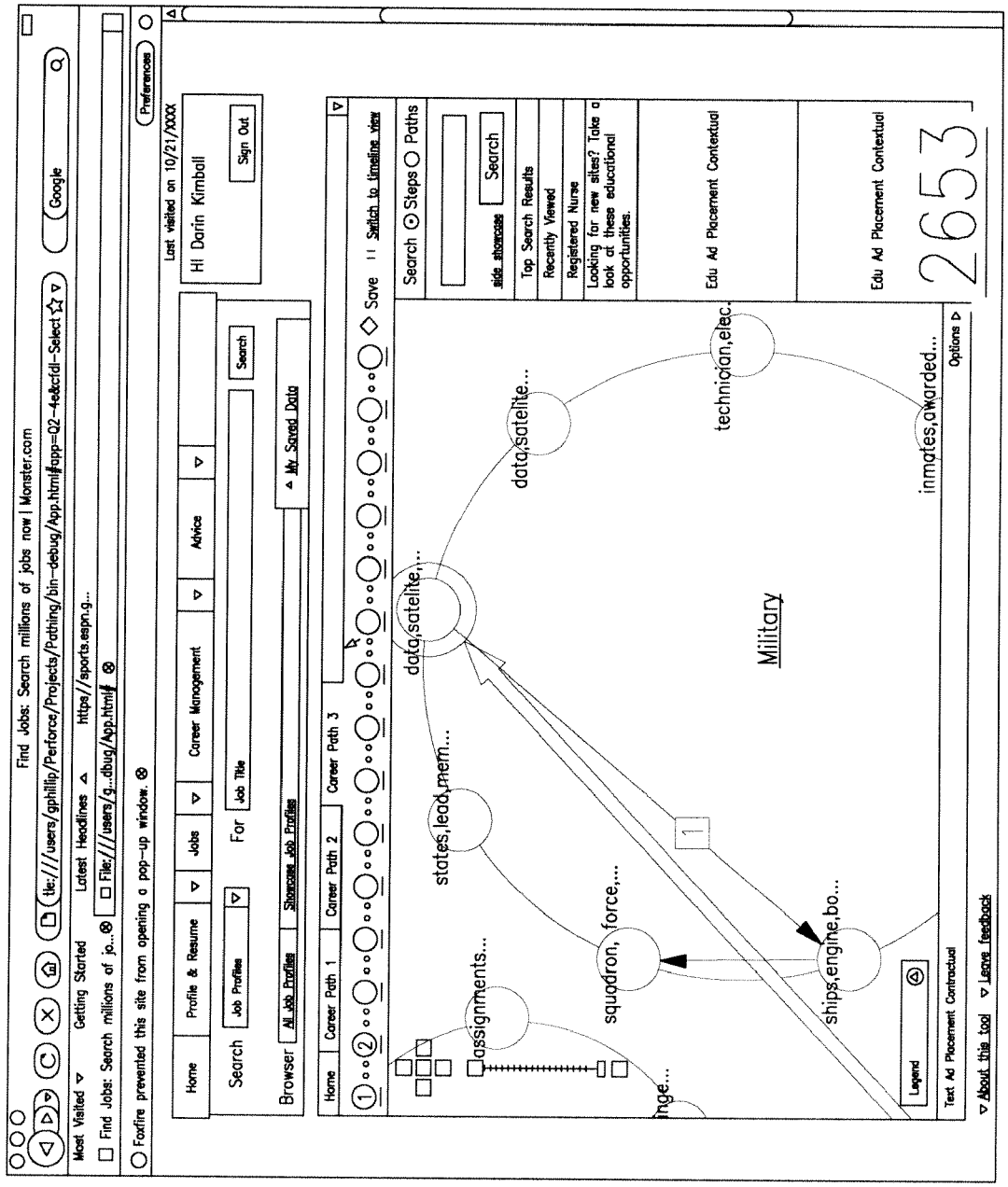
Figure 26F:
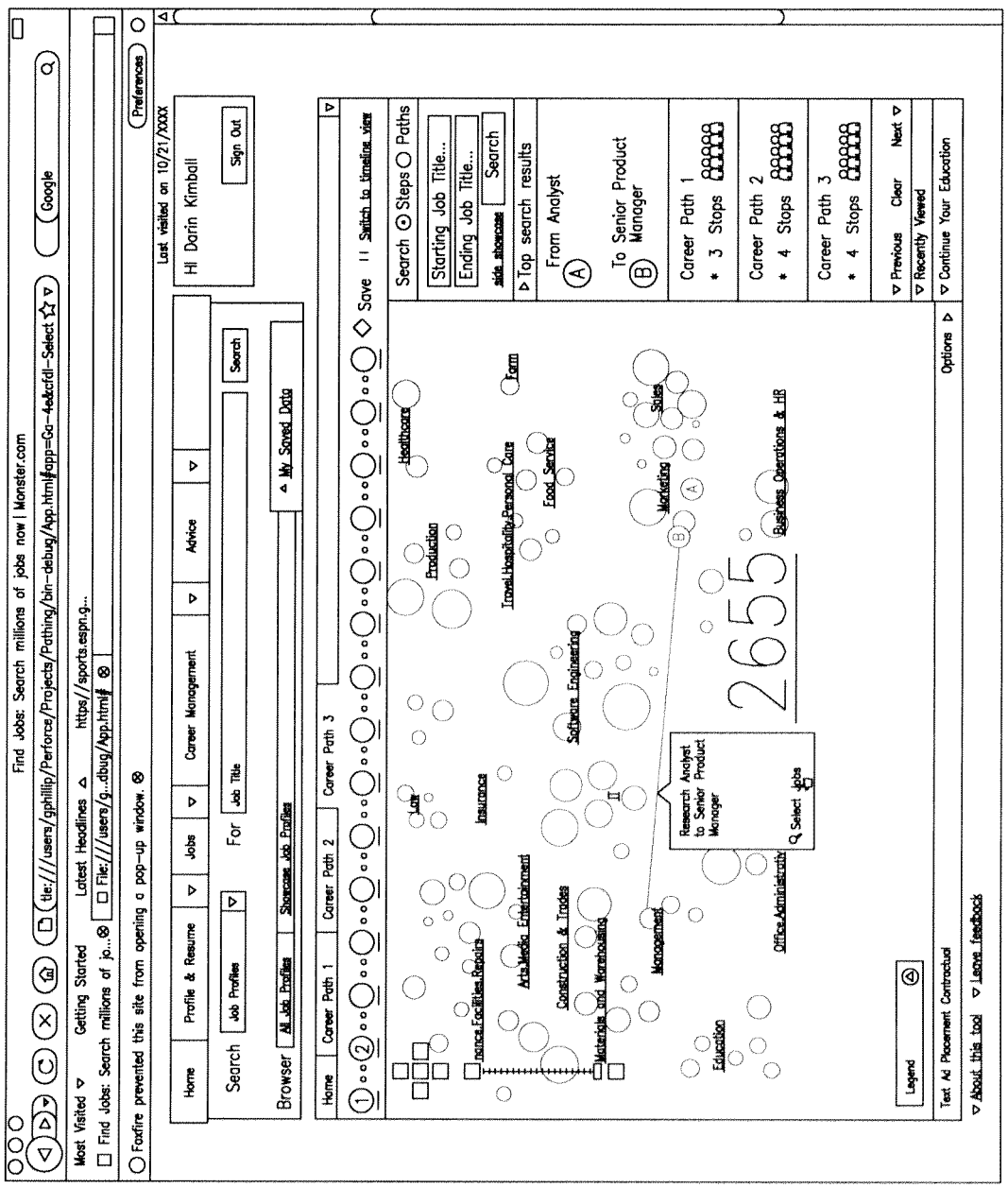
Figure 26G:
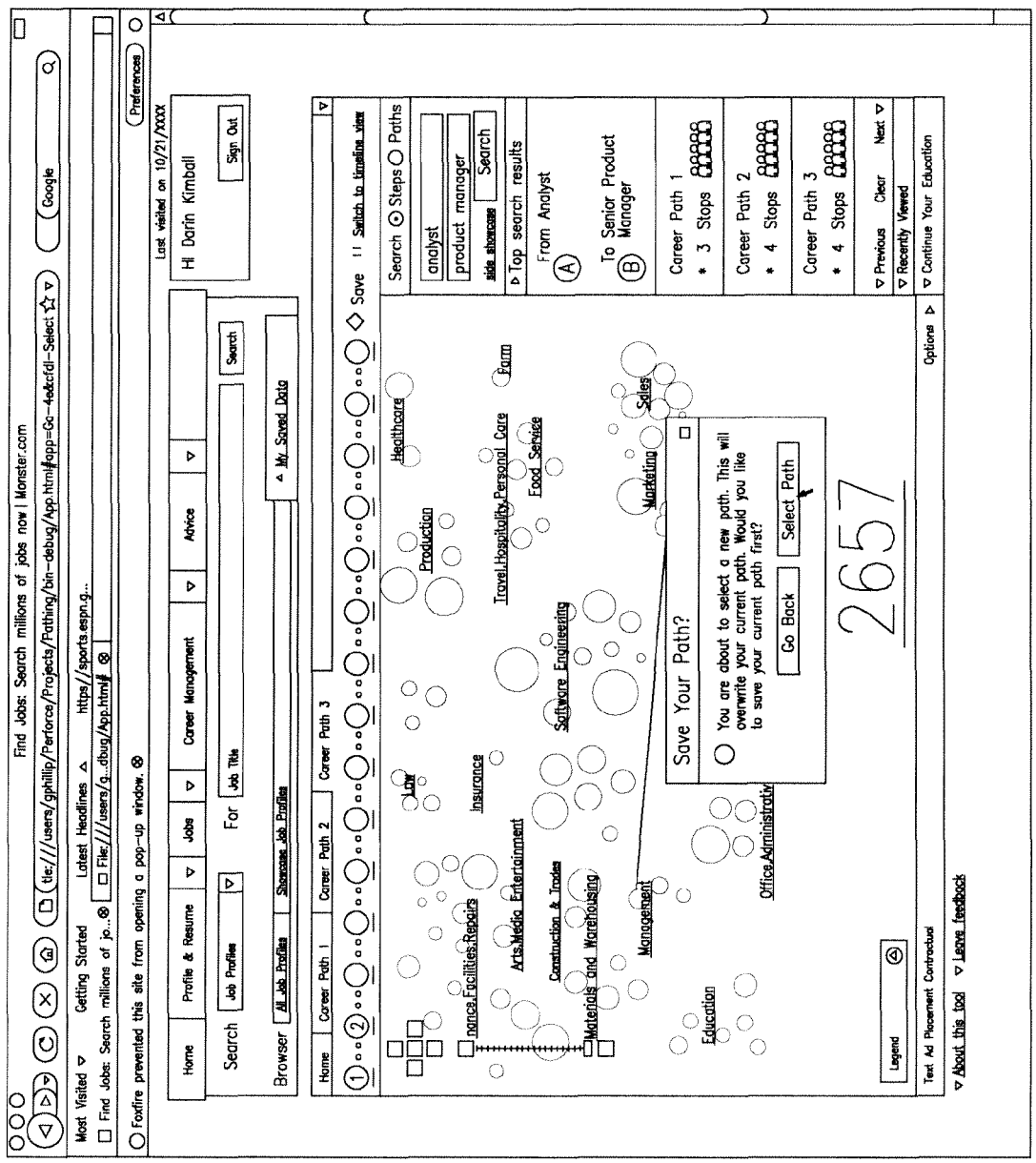
Figure 26H:
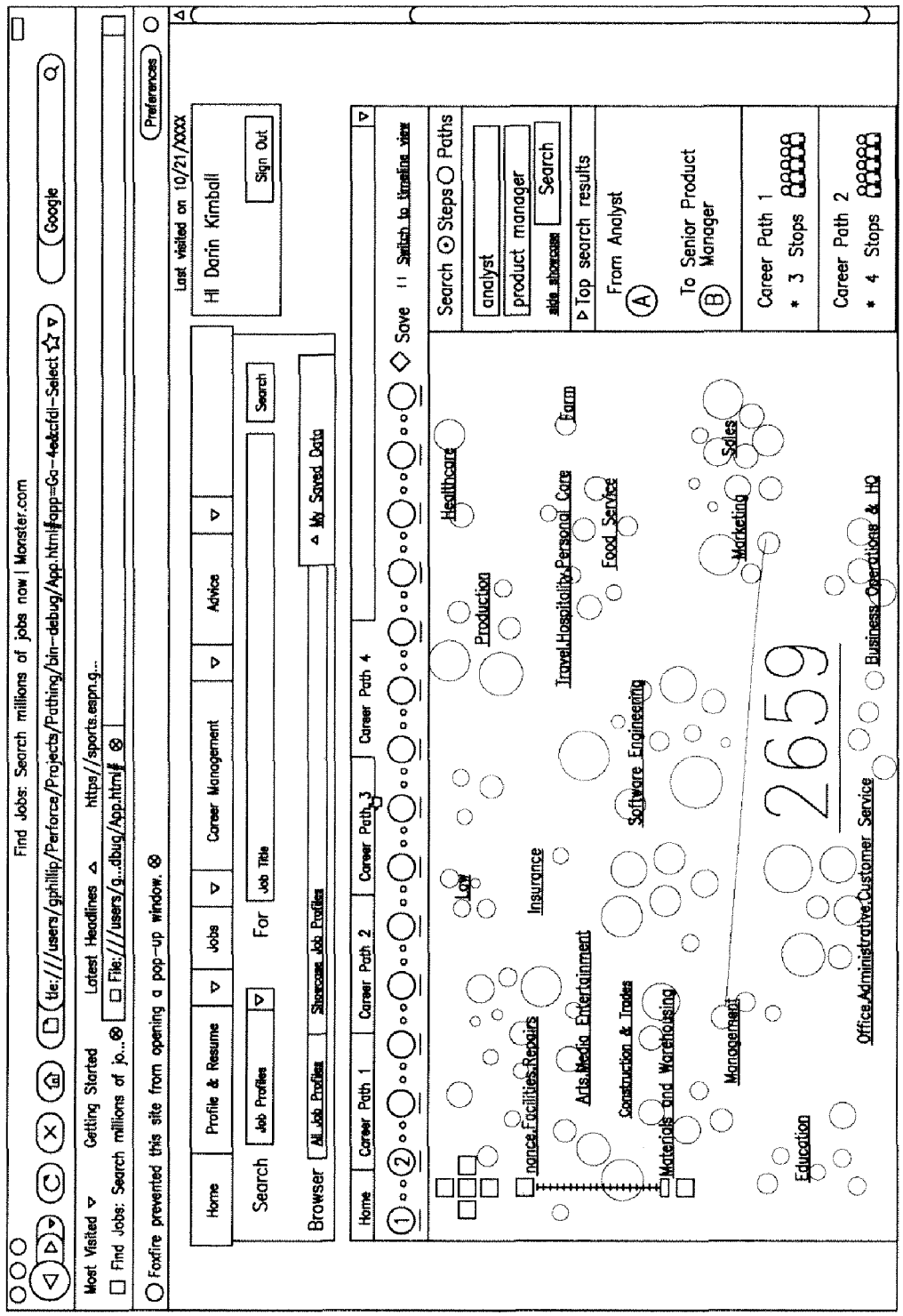

FIG. 23 is of a state path topography transition diagram illustrating gap analysis embodiments for the CLONER. In one embodiment, a gap analysis may be determined as between start state A 2310 and target state C 2301, having one intermediate state B 2305. In such an example, each state has a gap measurable attributes represented by F 2341, 2351, 2361, which may be float, integer, textual, and/or functions that represent stored attributes in an attributes database table. The features may be qualitative and/or quantitative. Features may include skills topics, terms, attributes (e.g., salary, vacation, etc.) and/or the like. Gap transition indicators may also represent part of a transition from one state to another. Transition indicators may include years of experience, obtainment of education (e.g., obtaining a new degree), attributes, and/or the like. In one example, state A (e.g., a state representing an assistant graphics designer position) have a set 2320 of attributes F 2361 having a salary of $50,000 2363 and a skill of using Microsoft Paint 2364. State B (e.g., a state representing a graphics designer position) may have a set of attributes F 2351, having a salary of $60,000 2353, a skill set of Microsoft Paint, Photoshop, and Team Management skills 2354, and provide 20 days of vacation time 2356. Also, in this example, state C (e.g., a state representing a managing graphics designer position) may have a set of attributes F 2341 having a salary of $75,000 2343, and skill requirements of Team Management, Administration 246.

A state may have a certain set of attributes associated with it that is exclusive to that state. The difference between state A and B, in one embodiment, may be represented as the features of B subtract out the same duplicative features of A. For example, there is a $10,000 difference in salary as between state A 2310, 2363 and state B 2305, 2353. There also are indicators driving people from state A to B, e.g., like years of experience, the obtainment of a specific degree, and or the like. In one example it make take 5 years of experience for a transition to occur on average, e.g., $AB_i=5$ 2307, $BC_i=5$ 2303; these are indicators of change between states. As such, in one embodiment gap indicators as between states A and B may be calculated as follows:

$$G_{i(A \to B)} = B_F - A_F + AB_i \text{ 2399, or}$$

Salary: $10,000; Skill: Photoshop, Team Management; 5 years transition,

As such, gap indicators as between states B 2305 and C 2301 may be calculated as follows:

$$G_{i(B \to C)} = C_F - B_F + BC_i \text{ 2398, or}$$

Salary: $15,000; Skill: Administration, -Paint, -Photoshop; 5 years transition and a Masters Degree.

The gap analysis may work as an additive between any two states. So the state change drivers takes drivers of change between two states and identifies them as subtractive features as well as indicators. As a consequence, gap indicators as between state A 2310 and C 2301 may be calculated as follows:

$$G_{i(A \to C)} = C_F - B_F - A_F + AB_i + BC_i \text{ 2397, or}$$

Salary: $25,000; Skill: Team Management, Administration, -Paint; 10 years transition and a Masters Degree.

Interaction Displays

FIGS. 24-26 are of a screen shot diagram illustrating embodiments for the CLONER. In FIGS. 24A-24G, the entry screen to the CLONER is shown 2401; however it should be noted that the CLONER may be used without having a user profile or account. In one embodiment, a seeker may initially interact with a state topology overview 2405, which may also have panels for accepting inputs from the seeker to search out states, and an area to show information and results from inputs provided to the CLONER 2407. In one embodiment, a seeker may move their cursor to an advancement (e.g., career) category displayed in the state topology overview and make a selection 2409. Upon selecting the category and/or state, the display area 2409 will focus in on the item selected 2412 and may provide the seeker with options (e.g., start/add to my path, get details about this state, find a job based on this state) 2414. It should also be noted that state paths may be represented in numerous ways; e.g., while in some figures the state paths are depicted as interconnected nodes on a graph topography 2555, 2544 of FIGS. 25E and 25F, respectively, in another embodiment the path may be represented as a series of numbered boxes 2547 of FIG. 25G having information relative to each state displayed within. A seeker may select to view the state path 2545 of FIG. 25 by providing indications that they wish to visualize the state path differently. In one embodiment, a template architecture is contemplated where numerous visual depictions are available and use the underlying state path and state structure topology as data constructs onto which the templates may be mapped. Further, the CLONER may provide a key showing what the various weight lines 2411 signify as connectors between (e.g., circular) nodes. For example, if a seeker selected an option to "get details" 2416, the CLONER may display attribute detail information about the selected state in a information display panel 2418, which may include the number of people in this job (both current and projected), expected rate of growth for the state, and other associated attribute information. The seeker may navigate about the topology by selecting a scale slider 242o which will allow the seeker to zoom out and see more of the topology 2422 (or conversely, to zoom in and see more detail; panning and other arrangement options may also be employed).

In another embodiment, a seeker may enter a search term they believe relates to a (e.g., career) state they have an interest in 2424, which will result in the CLONER showing its top matches 2426 in the information panel as well as highlighting relevant identified experience states in the topology itself 2427. It should be noted that in one embodiment, the topography will adjust its overall view (e.g., zoom level) to show the path results, and when making selections of states, the topography will traverse and provide a fly-by depiction of the topography on to to selected states.

In FIGS. 25A-25G, the CLONER allows a seeker to provide both start and target query terms 1124 (as well as additional options 2548 that would allow the seeker to provide additional attribute filter criteria). In one embodiment, the additional filter criteria may be entered in the CLONER information panel 2549 and be used as part of the basis of a query to find matches in a state structure. As a seeker types 2526, suggested terms and topics are displayed 2526. If a state is selected 2550, other related states are pointed to and highlighted 2560. In an alternative embodiment, upon providing and determining start and target states 2528, 2530, 2532, the CLONER may determining a path with intermediary states (e.g., 2531) as between the start and target states 2533; and provide the seeker with the ability to choose as between multiple paths that have differing numbers of intermediary states and likelihoods of attainment by the seeker 2535. For example, in one embodiment a seeker may make selections 2537 as among the various available paths between the start and target states, and the topology display area will be updated to reflect the different paths 2539. It should be noted that the CLONER allows a seeker to either build up or modify a path. In one embodiment this may be achieved by selecting adjacent states 2546 to states in a path 2555 and making selections to add the selected state to the path 2543. In one embodiment, a path list 2544 may show the current set of states that comprises the current path such that a seeker may be apprised of the current path even if it is not fully visible in the topography display area.

In FIGS. 26A-26H, the CLONER allows a seeker to vary visualizations in numerous ways. For example, a user may elect to vary the visual depiction of the display topology by engaging an option widget 2643, which may in turn show a dialogue box that allows the user to turn on/off the ability to show, e.g., common next states, show most common paths, show tips, show trace, and/or the like 2645. For example, selecting the show tips option will highlight potential and/or likely next states for consideration for a seeker. In another embodiment, if the seeker selects show trace, a breadcrumb trail of their path is highlighted. Another option is "find jobs in path," which when selected will allow a seeker to apply for one or more jobs that are identified along a constructed path. In another view upon selecting a state, the user may be presented with options to find a job and inform the user that the state is a common path state 2647, 2666. Another embodiment shows that upon selecting a "find a job" option 2647, the user may be presented with job listings 2649 and sponsored ads 2651. In one embodiment, occupational profile tags may be used with sponsored ads. In one embodiment, profile ad tags may be called as follows:
http://ads.monster.com/html.ng/
site=mons&affiliate=mons&app=op&size=728×
90&pp=1&opid=\*\*\*\*&path=(DynamicPathValue)
&dcpc=#####&ge=#&dcel=#&moc=######&dcc1=##&
mil=#&state=##&tile=
http://ads.monster.com/html.ng/
site=mons&affiliate=mons&app=op&size=300×
250&pp=1&opid=\*\*\*\*&path=(DynamicPathValue)
&dcpc=#####&ge=#&dcel=#&moc=######&dccl=##&
mil=#&state=##&tile=
http://ads.monster.com/html.ng/
site=mons&affiliate=mons&app=op&size=(TBD)
&pp=1&opid=\*\*\*\*&path=(DynamicPathValue)
&dcpc=#####&ge=#&dcel=#&moc=######&dccl=##&
mil=#&state=##&ti le=
: These values are set by the user's cookie.

In another example embodiment, in FIG. 27, job listings may be presented as part of a job carousel, as illustrated, where a user may view job listings 2733 in a "lazy susan" format 2793; the user may spin job widgets 2733 to the left 2791 or right 2792 by click-dragging or selecting "spin" arrows 2791, 2792 and rotating jobs out of view 2744, 2755. For example, if a user clicks on the left spin arrow 2791, job listing 0 2944 will spin into view and job listing 4 2766 will spin out of view. It should also be noted that the job carousel may also be used for job ads outside the context of the CLONER; in one embodiment, a user may click on a job listing 2777 and an apply for job menu/button/widget may appear 2793, which would allow a user to move on to apply for the job. In an alternative embodiment, the CLONER may prompt or otherwise request user identifying information 2794 (e.g., a unique identifier, a user name and password, a cookie having same, and/or the like), which may be used to obtain a seeker's experience information and begin a job application process. Moving back to FIG. 26, it should be noted that a seeker may engage and save a desired path to their profile 2665. Also, it should be noted that a user may select a tab pane that provides information to help a seeker advance/continue their education, including educational listings and ad space 2653. The CLONER also provides the opportunity for the seeker to select path segments 2655, which in turn will provide the seeker with opportunity to select a path, overwrite the path, modify the path, and/or the like 2657, 2659.

Interaction Interface Component

Figure 28:
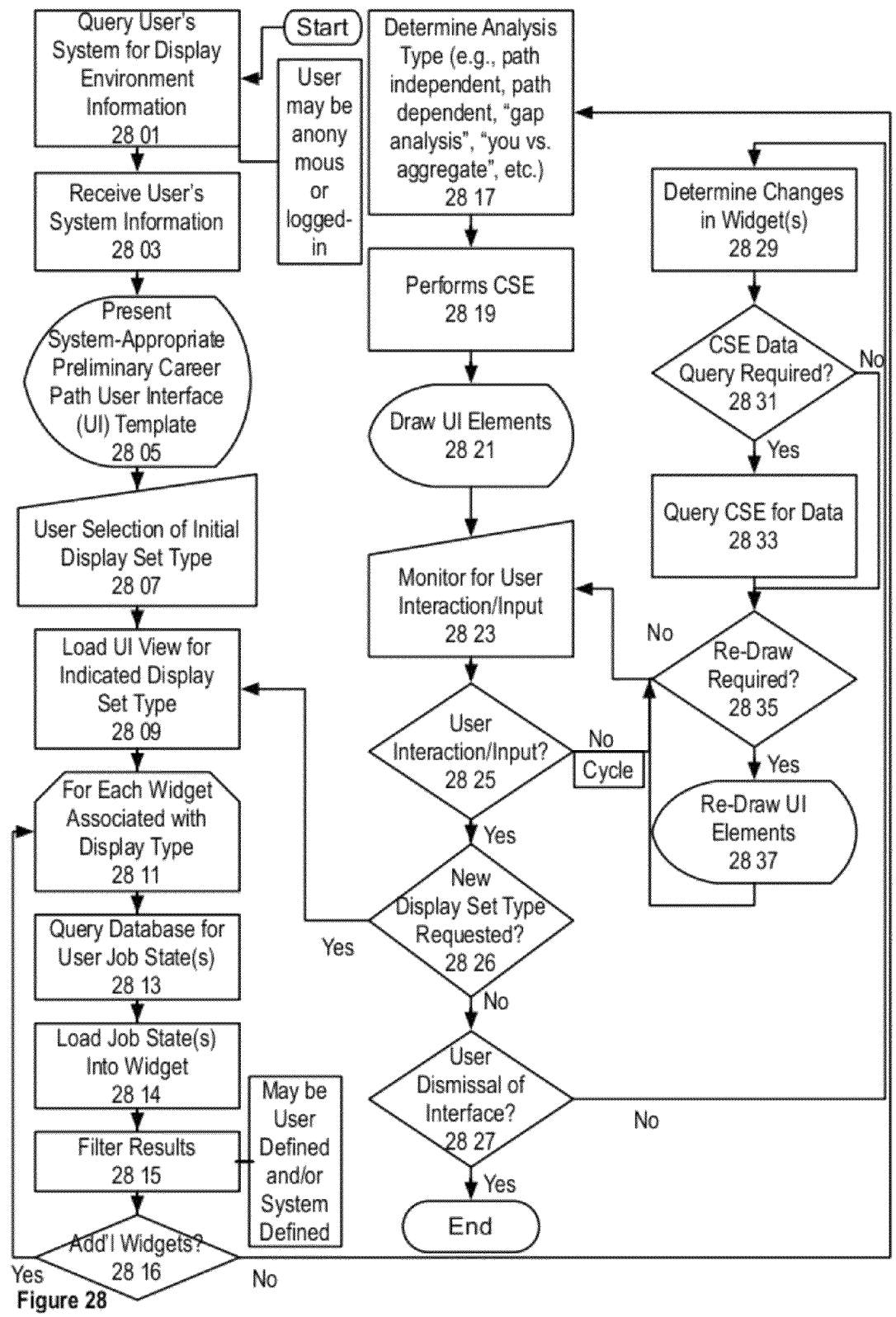
FIG. 28 is a logic flow diagram illustrating embodiments for invoking and displaying a CLONER.

FIG. 28 is a logic flow diagram illustrating embodiments for invoking and displaying an CLONER. In one embodiment, the CLONER may be manifested in a web environment as discussed throughout in FIGS. 24-26. In one such embodiment, the CLONER may be supplied, in one example embodiment, as Flex-based Shockwave Flash (SWFs) that interact with the CSM via a web services layer and with the parent through Javascript-based callbacks, which may be delivered via a web page served by an information server for use by seeker clients. Once the web page is loaded in a web client, the interface may be instantiated and connect with the CLONER, its database, its component collection, and in one embodiment, through the information server. Upon instantiation of the web page, presentation and operation of the interface may start by querying the seeker's web client to obtain display environment and browser capabilities information: this may include the type of browser, cookies (with account information, if any), plug-in capabilities (if any), Javascript support, Java support, version numbers thereof, screen resolution and dimensions, window sizes, and/or the like. In one embodiment, this may be done with an HTTPBrowserCapablities Request.Browser inquiry via a Microsoft.Net object call. The query may occur, and the seeker may access the CLONER by logging into an account (or by determining that a cookie contains identifying information allowing for login) or anonymously. Thereafter, the seeker's client may provide and the CLONER may obtain a user's system information, and if logged in and otherwise unsaved, this information may be stored in a profile database table 2803. The CLONER may then provide an interface appropriate to the seeker's client. In one embodiment, templates such as cascading style sheets, HTML templates, and/or the like may be supplied providing the seeker with a preliminary career path interaction interface 2805. In another embodiment, Flash-based content rendering may be used. In one embodiment, a seeker may select an initial display type 2807; for example, a seeker may select a topography based interface 2544 of FIG. 25, linear information view 2547, a straight-line list view 2544, a nodal path view 2533, and/or other views 2807. Upon providing such indication, the appropriate and selected view may be provided to and loaded by the seeker's web client and set 2809; in loading the template the appropriate interaction interface widgets are loaded.

Upon loading the template interface view 2809, the CLONER may then begin generating a representation of a given path for display in accordance with a given CLONER interaction interface template. For each node representing a state to be rendered to display 2811, the CLONER may query a CLONER database for seeker advancement states 2813. In one embodiment, this may be a seeker's advancement experience information. In another embodiment, it may be a clean state with no state topography, where a seeker may begin searches for job states, as has already been discussed earlier in FIGS. 24-26. Upon obtaining states from the CLONER, the state may be loaded into the interface element representing the state 2814. For example, in a topography map, a user's start state may be loaded as starting node in that topography. In one embodiment, a user may filter results 2815; the filters may be defined by the CLONER or the seeker. In one embodiment, a user may, for example, specify likelihood thresholds, salary levels, and/or the like. So for example, if a user starts with a blank topography and performs a search for a starting state, the user may specify filter attributes, which may be supplied as SQL query selects, and which will act to narrow the returned states. The CLONER may continue to iterate if there are additional interface widgets that need to be put into effect 2816, 2811, otherwise, the CLONER may then move on to determine the type of analysis to be used for path determination 2817. In one embodiment, the CLONER may allow a seeker to examine paths independent of their own advancement experiences in a path-independent approach, in a path dependant approach, perform gap analysis, examine seeker's status at a given state relative to the aggregate (e.g., comparing the aggregate salary for a state to the seeker's salary at a given state), and/or the like 2817. Upon having obtained an initial set of seeker states 2811, and selecting an analysis type 2817, the CLONER may perform a next-state and/or path determination analysis by using selected states as starting and/or target states and using that to query the state structure 2819. Upon obtaining analysis results 2819, the CLONER may provide user interface elements along with widgets representing states for display on the seeker's client 2812. Upon displaying the pathing interface 2821, the CLONER may monitor for seeker interaction with the pathing interface and/or for further information 2823, as has already been discussed with regard to FIGS. 24-26. If there is no interaction 2825, then the CLONER may continue to cycle looking for additional input 2823. If there is seeker interaction 2825, then the CLONER may check if a new display set type has been requested 2826; for example, if a user selects to view a path linearly 2545 instead of as a topography 2543 of FIG. 25. If a seeker elects to change the display set type 2826, then the CLONER will load in a corresponding template through which reimaging of the display may continue. If there is no indication of changing the display type 2826, then the CLONER may determine if the interaction interface is being dismissed and/or terminated; if so, termination will ensue and execution will come to an end. Otherwise, the CLONER will go on to determine if what changes need to take place 2829 as a result of user interaction 2825. For example, if a widget node is right-clicked upon, or other selection indicia is provided where a selection indicator (e.g., a cursor) intersects with a widget (e.g., a node representing an experience state), then the CLONER may determine if it needs to query its CSE component 2831. For example, if a user decides to change an experience path by adding a state to the path, changing one, and/or the like 2541, 2543 of FIG. 25, then the CLONER would need to obtain updated state and/or path information by querying the CSE component for updated data 2833. If no query is required 2831 or upon obtaining the results form the query, the CLONER will determine if re-drawing the display is required 2835. If no re-draw is required, the CLONER may continue to monitor for user input. If updates are required, e.g., to account for updated state information obtained from the state structure 2831, then the interface may be re-drawn to account for the update 2837, and then the CLONER may continue to monitor for interactions 2823.

Figure 29:
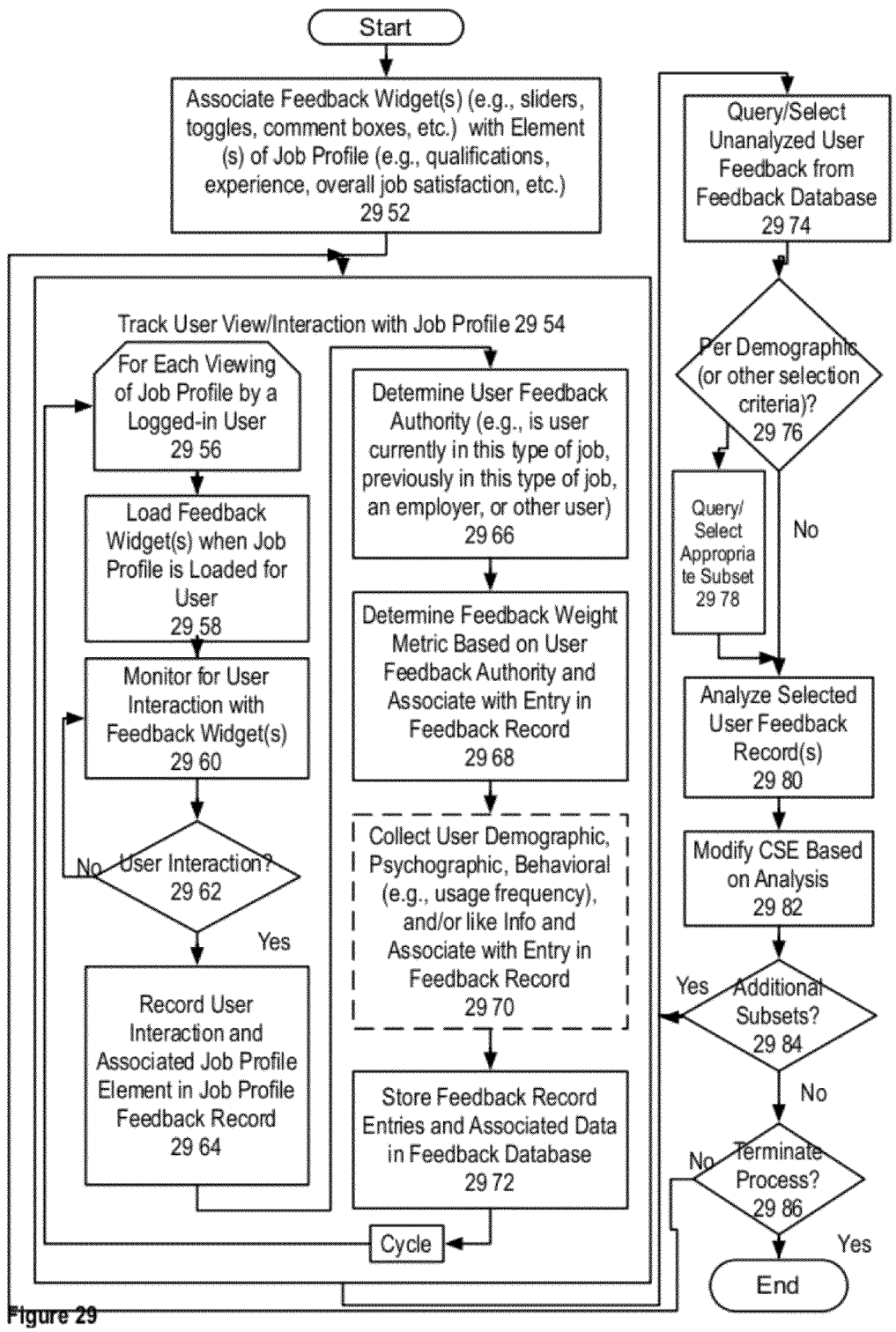
FIG. 29 is a logic flow diagram illustrating embodiments for tracking seeker interactions with a CLONER.

FIG. 29 is a logic flow diagram illustrating embodiments for tracking seeker interactions with a CLONER. In one embodiment, upon initiating interactions with the CLONER, e.g., as in FIG. 29, the CLONER may track seeker interactions by associating feedback widgets with elements of advancement experience information 2952. Momentarily moving to FIG. 30, it is of a block diagram illustrating feedback widgets for interactions with a CLONER. As has already been discussed, in one embodiment a seeker may provide a title, keywords, and/or the like to the CLONER 3001 and look for a match 3003. Such a search will result in search results that may be displayed and/or highlighted by the CLONER in a number of ways, including a list 3005, 2424, 2426, 2427 of FIG. 24. In one embodiment, seekers may provide feedback in a number of ways. In one embodiment, the seeker may inform the CLONER that search results are not appropriate matches 3010, in which case the seeker may specify a job state manually 3030. In one embodiment this may be achieved by allowing a seeker to navigate a hierarchical topic structure wherein various tiers represent top level topics and related nested topics. In one such embodiment, a seeker may make such selections by using pop-up menus that are populated from the structure model's topic tables. In one embodiment, the XML topic model structure may be used. Once selecting an appropriate advancement, e.g., job identifier, 3030 or selecting matches 3005 and asking to confirm either setting 3015, 3035, a feedback widget may be presented 3020 in the information inspection area of a CLONER interface, e.g., 2407, 2418 of FIG. 24. In one embodiment, a slider widget 3020 may be employed, wherein the seeker may move the slider to represent a range of a good match 1.0 to a poor match 0.0 by position of a slider 3020; that value may then be selected 3025 and stored in the CLONER. The ratings may be for all kinds of attributes, for example, instead of a confidence rating for the search results, a user may opt to "rate this job" 2543 of FIG. 25 by right-clicking on an experienced state and be presented with a rating widget 3040 where they may confirm how bad or good an experience was 3040, 3045. Similarly, a user may decide to provide comments about a job or experience through a text box 3050, the contents of which may be saved to the CLONER database. In addition, users may rate 3060 the comments and submit those 3055 to the CLONER. Moving back to FIG. 29, various other feed back attributes may be employed and/or stored, such as: text boxes to allow seekers to provide comments regarding a selected state, job satisfaction ratings for experienced states (e.g., using sliders), experience requirements (e.g., using toggles and/or text boxes to obtain additional requirements), and/or the like 2952.

Upon associating feedback with topic and/or job related information 2952, the CLONER may then track the users view and interaction with any given job profile 2954. In one embodiment, tracking may take place by doing the following for each viewing of a job/advancement profile by a seeker 2956. For each such interaction by a seeker with a job profile 2956, the CLONER may load in an appropriate feedback widget when a job profile is loaded for the user 2958. For example, when a job profile is loaded to represent a state in the path topology, various feedback widgets may be loaded; for example, a database table may contain various attributes that are associated with a given state and/or job and also are associated with various user interface templates and/or widgets, which may be loaded by the CLONER. Once the feedback widgets are loaded for an associated job profile 2958, the CLONER may then monitor for interaction with the feedback widgets 2960 (for example, as already discussed in FIG. 28). If no interaction is detected, the CLONER may continue to monitor 2960 until the interface is terminated. If the user does interact with the feedback widget(s) 2962, the values obtained from that interaction are stored in the CLONER database record associated with job profile 2964. The CLONER then determines if the user supplying the feedback has authority to do so 2966; for example, if the user is not currently employed for the selected type of job for which the feedback is proffered, and it was not previously an experience of the user, then such feedback may be deprecated (e.g., given low weight, may not be stored, and/or the like). The CLONER may then determine the weight to be given based on the user authority; for example, feedback from users whose most current employment is the same state for which they are offering feedback will have higher weight than for feedback from users who had such experience further back in their career; which in turn may have higher weight than feedback from a user who has no such experience and/or less related equivalent job state experience. In one embodiment, users with current experience in the equivalent state receive a weight of 1.0, while users having experience in the past receive a weight of 0.5, while users having no experience receive a weight of 0.1. Optionally, the CLONER may then collect behavioral (e.g., usage frequency), demographic, psychographic, and/or the like information and store it as associated attribute information 2970. For example, a user's profile may include their geographic region, and as such, feedback from users in one region may be analyzed distinctly from users in differing regions. The CLONER may then store the feedback as records entered as attributes in a CLONER database, which is associated with job information, state information, and/or the like and the CLONER may continue to cycle for any selected job profiles 2972, 2956.

In one embodiment, as the CLONER continues to track feedback information relating to job profiles 2954, it may periodically query its database for the feedback for purposes of analysis 2974. In one embodiment, a cron job may be executed at specified periods to perform an SQL select for unanalyzed feedback from the CLONER database. The CLONER may determine if any filter (e.g., demographic and/or other selection criteria) should be used for the analysis 2976. If so, such modifying selectors may be supplied as part of the query 2978. The returned feedback records are analyzed 2980, in one embodiment, using statistical frequency. For example, if a substantial number of seeker provide low confidence ratings for search results of a particular state, e.g., Systems Programmer, resulting from a particular query term, e.g., programmer; then this information may be used to demote state structure associations. In one example embodiment, each demotion may act to subtract the occurrence of a state traversal link. The CLONER may then allow a user to make additional subset selections 2984, which result in further results narrowing through more queries 2974. Otherwise the CLONER may determine if there is any indication to terminate 2986 and end, or otherwise continue on tracking user interactions with the job profile 2954.

Benchmarking

Figure 31:
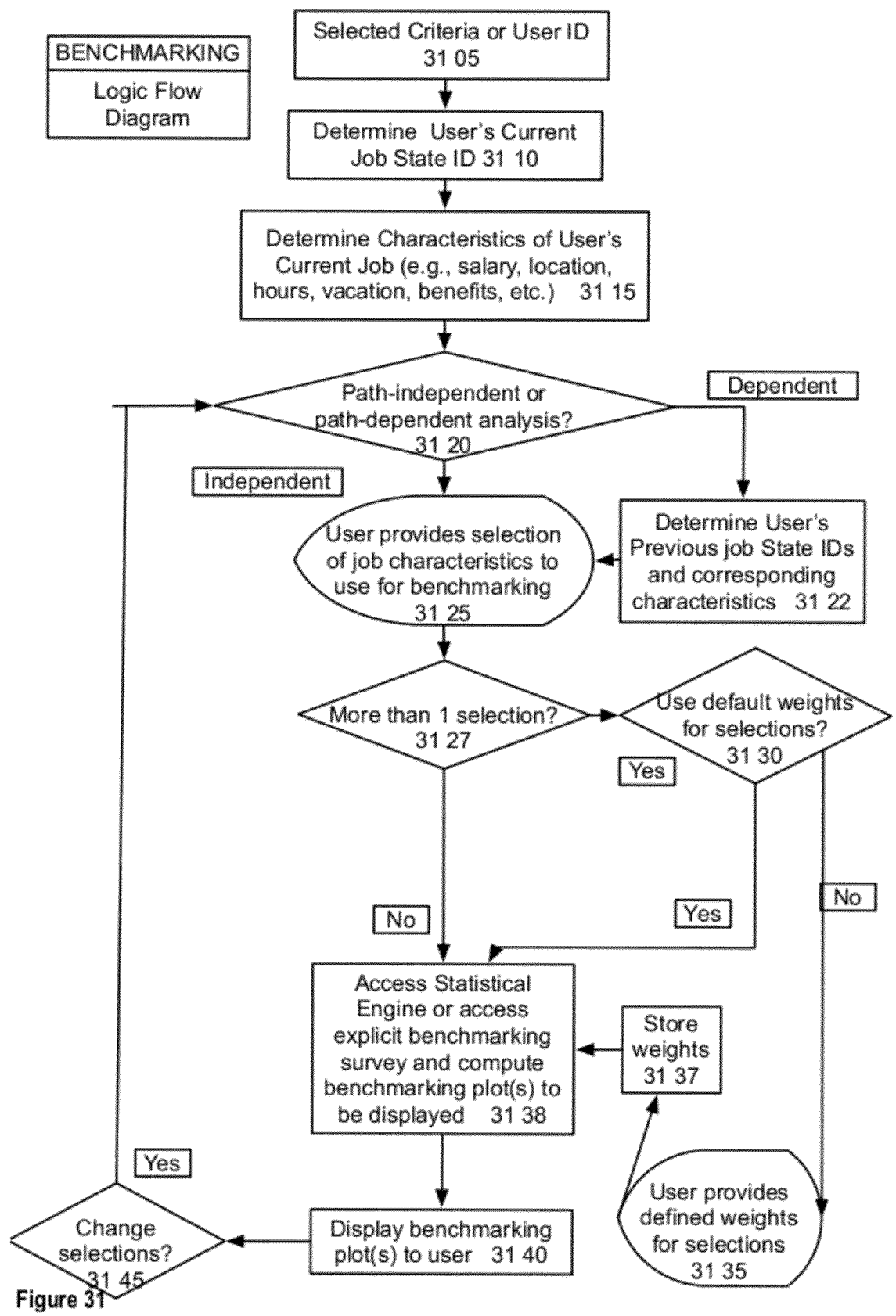
FIG. 31 is of a logic flow diagram illustrating benchmarking embodiments for the CLONER.

FIG. 31 is of a logic flow diagram illustrating benchmarking embodiments for the CLONER. In one embodiment, the CLONER allows one to select criteria such as a user identifier as a target of benchmarking 3105. In one embodiment, an CLONER interface may allow a logged in user to make a benchmark selection for any given piece of advancement experience information by right clicking on a desired target; e.g., right clicking on the target state in a path 2543 of FIG. 25, which brings up an option to perform benchmark analytics on the user and/or the target state. The CLONER may determine the seeker's current job state identifier For example, if the user makes a specific selection of a state representing advancement experience information in a state graph topology as in 2543 of FIG. 25, then the selected item's state ID will be the seeker's current job state 3110. Such a scenario allows the seeker to perform "what if" analytics on any state in the topography, and on any state in their experience path, or on any state in a career path. However, if no specific state is selected, in another embodiment, the seeker's most current experience information, e.g., there most current employment position, may be used as the current job state 3110. The CLONER may then look up the seeker's current experience characteristics. In one embodiment, a seeker may populate their user profile with characteristics of their advancement experience information. For example, for any given historical employment position, the seeker may also supply characteristic attributes regarding that employment positions, attributes that may include salary, geographic location, hours of work (e.g., total number of hours worked per year), vacation duration, benefits, and/or the like. With this information stored in the seeker's user profile, it may determine these values by finding the seeker's profile record by the seeker ID and retrieving the relevant attributes stored therein 3115. In an alternative embodiment, the CLONER may make an inquiry to companies connected to the CLONER that the seeker claims as elements of past advancement experiences, and the CLONER may query those employer records through a gateway to automatically retrieve the attribute information. Upon obtaining the characteristics of the seeker's current job 3115, the CLONER determines if path dependant analysis is desired, and if so, the CLONER will determine the seeker's previous job states and corresponding characteristics, iterating, 3122 until all such information for each, e.g., career, experience is determined 3122. Or if independent path analysis is required or upon determining the path dependant information 3122, then the CLONER may provide a list of relevant job characteristics to the seeker for selection 3125. For example, after making a selection of a single or multiple states in the state path graph topology and selecting "benchmark" as in 2543 of FIG. 25, the CLONER may present the user with a list of available benchmarking attributes in a dialogue box as shown in 3250 of FIG. 32, which provides check box selectors for one or more characteristics. The CLONER will then determine if the seeker selected one or more criteria for benchmarking purposes 3127. If there is more than one selection 3127, then CLONER may determine if default weights for each of the criteria are to be used In one embodiment, an attribute database table may maintain weights for each of the attributes. In an alternative embodiment, each of the selected weights may be equal. If there is indication that the seeker does not want to use default weights, the seeker may then provide weights 3135. In one embodiment, weights may be entered into a text box 3252, by making selections on a slider 3254, by making selections of weights from a pop-up menu 3256 of FIG. 32, and/or the like interface widget. Once the weights are obtained, they may be stored 3137 in a user profile as weights associated with the current job state, and/or otherwise persisted for use by the CLONER 3137. Once weights are established 3130, 3137, or no weights are used 3127, the CLONER may then query the CSE for the selected state and attribute data table for associated attributes to provide statistical surveys and benchmarking information 3138. For example, in one embodiment, the CSE may be queried with the user's current job state for all other instances of that job state encountered by other job seekers that were used to make up the advancement state structure in the CSE, and each of those returned query states having a state_ID may be used as a basis to query an attribute table with such state_IDs for associated attribute information. The returned attribute search selection results may be averaged, aggregated, and or run through statistical packages such as SAS (e.g., via API, pipe, messages, and/or the like) to generate covariance and other statistical information and/or plots. Such analyses may include statistical processing and evaluation (e.g., the calculation of means, medians, variances, standard deviations, covariances, correlations, and/or the like). For example, the salary attributes from the select may be aggregated, summed and averaged and as such provide a benchmark against the user's current job state. In an alternative embodiment, the user may provide filter information which may be supplied as query select attribute as well 3115; for example, a user may wish to have the average salary for a geographic region. Upon obtaining the statistical attribute information 3138, the CLONER may use the returned information to generate visualization plots for display 3140. Thereafter the seeker may make changes to the weights and job state selections so as to vary the benchmark results 3145, and if so, benchmarking may recurse 3120. In another embodiment, gap analysis may be performed 3138 and displayed 3140.

Figure 32:
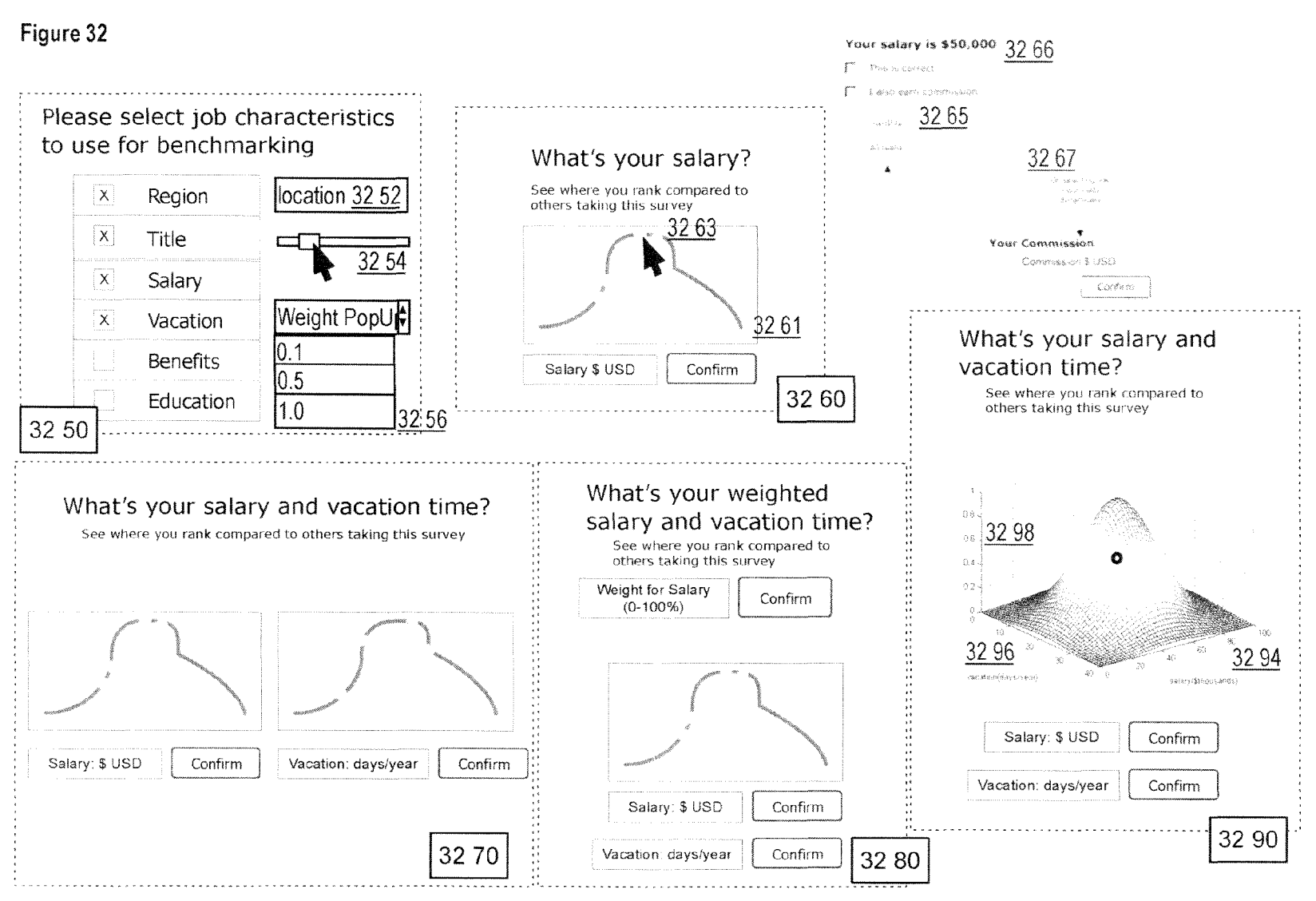

FIG. 32 is of a block diagram illustrating benchmarking interface embodiments for the CLONER. In one embodiment, for the specification of attributes to be benched marked 3250, the CLONER may use an interface selection mechanism that allows a seeker to specify which characteristics are to be benchmarked, locations, settings and weights for each selected attribute 3252, 3254, 3256, as has already been discussed. Upon selecting an attribute, e.g., salary, the CLONER may generate a curve showing where a curve representing a plot of other states with attribute values. For example, for salaries, a curve representing the distribution of salaries for states in the state structure may be plotted with 3260, 3261 and the curve allows a user to plot an orange dot along a curve 3263 that auto-populates a text box 3266 with format validated salary information by querying the attribute database. The user may then confirm that the value is correct, if the salary is monthly, annual, and if commissions are included 3267. In one embodiment, orange dots will show if there are at least 4 or 5 other relevant user records that exist with the specified attribute for that sate. Similar benchmark plots may be achieved for salary and vacation time 3270. Also, plots employing attribute weights may also be employed 3280. In yet another embodiment, multi-dimensional 3290 plots may show state attribute distributions across, e.g., vacation days 3296, salary 3294, and likelihood 3298 distributions.

Cloning

Figure 33:
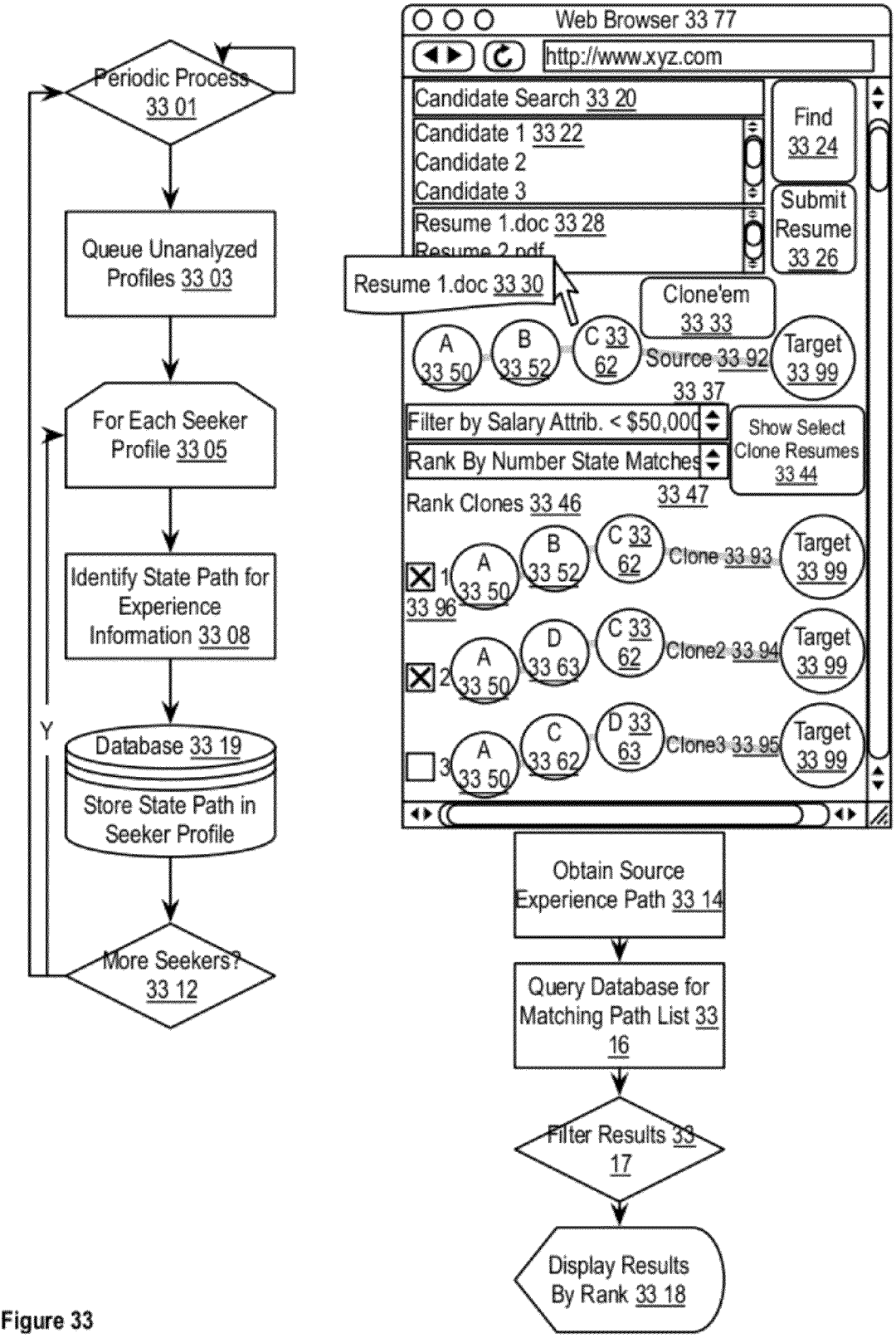
FIG. 33 is of a mixed logic and block diagram illustrating path cloning embodiments for the CLONER.

FIG. 33 is of a mixed logic and block diagram illustrating path cloning embodiments for the CLONER. In one embodiment, the CLONER may determine to periodically engage and process unanalyzed seeker profiles 3301. In one embodiment, a batch process may be engaged by cron at specified intervals. If the interval quantum has not occurred, then the CLONER will continue to wait until the occurrence of the period 3301. Upon occurrence and/or passage of the quantum 3301, the CLONER may queue all analyzed profiles 3303. In one embodiment, this may be achieved by querying the CLONER database for seeker's profiles without stored, e.g., career, state paths representing the seeker's experience information. Upon returning the query results, for each such seeker profile, the CLONER will iterate 3305. The CLONER will identify a, e.g., career, state path representing the seeker's experience information. As has already been discussed in earlier figures, the CLONER may map each, e.g., career, experience item (e.g., job experience) to a state and by querying the state structure for a states matching each of the seeker's experience items (See FIGS. 15, 16, et al.). As such, upon identifying all the associated states for each seeker experience item, the CLONER may build and thereby identify a state path for each seeker's experience information 3308. The CLONER may then store this state path in the seeker profile 3319 and set a flag in the profile indicating that the path has been constructed and date when that path was constructed. The CLONER may determine if there are more profiles in the queue and if it must continue to iterate for other unanalyzed profiles 3312. If there are more unanalyzed profile, the CLONER may continue to generate career paths for each 3305, otherwise the CLONER may continue on and wait to repeat the process upon the occurrence of the next specified quantum 3301. In this embodiment, the CLONER continues to update state paths for every seeker's experience information.

In so doing, all seeker's paths become available for analysis. In one embodiment, the CLONER provides an interface and a mechanism to identify and "clone" a specified seeker, by finding another seeker with identical and/or similar, e.g., career, state path. In one embodiment, the CLONER provides a web interface 3377 where an interested party, e.g., an employer, may provide the experience information of a source candidate to be cloned. The CLONER may allow the interested party to enter a search for a specific candidate 3320, where results to the search terms may be listed 3322 for selection by the interested party 3322. In one embodiment the interested party enters terms into a search field 3320, engages a "find" button 3324, and the CLONER will query for matching candidates and list the closest matching results 3322 from which the interested party may make selections 3322. In another embodiment, the interested party may search their file system for a source candidates experience information (e.g., a resume) or provide such 3330. In one embodiment, the CLONER allows the interested party to search their computer's file structure and list files for selections by engaging a "submit resume" button 3326, which will bring up the a file browser window through which the interested party may specify (e.g., drag-n-drop a resume document 3330) the source experience information. After the interested party selects what experience information it wishes to be the source 3328, the interested party may ask the CLONER to "make a clone," i.e., to identify another seeker having similar background and/or experiences.

As such, the CLONER may analyze the source's experience information and generate an experience path as has already been discussed. In one embodiment, upon obtaining a source experience path 3314, the CLONER may display the source's path 3392. The CLONER may then query its database for other seekers having the same experience information 3316. In one embodiment this may be achieved by using the source's state_IDs for each entry comprising its experience state path as a basis to select from its database. Then for the query results, for each candidate having all the matched states, the CLONER may further filter and rank the results 3317. It should be noted that an interested party may also apply attributes as a filter 3317, 3337; for example, by searching for other candidates with the same career path, but that have a set salary expectation (e.g., less than $50,000); one embodiment, the filter attributes may be provided in a popup menu 3337, a text field, a slider widget, and/or the like mechanism. In one embodiment, the CLONER may provide higher ranks for matches from the same regions, having experiences in the same order, and having other associated attributes (e.g., salary) that are most similar to the source seeker. In one embodiment, the CLONER may provide a pop-up menu interface to select the manner in which results are ranked 3347. In one embodiment, the rank clones 3346 may be displayed showing their matching paths 3393, 3394, 3395. The CLONER may rank the results by listing the paths that have the greatest number of states in common with the source more prominently than those having less matching states. The CLONER may then display the next closet "clone" or list of clones 3318, 3393, 3394, 3395 for review by the interested party. In one embodiment, the interested party may send offers, propositions, solicitations, and/or otherwise provide a clone with information about advancement opportunities. In one embodiment, a user may make checkbox selections 3396 of the desired clones and request to see the resumes of those selected clones 3344, upon which the CLONER will provide access to those clones. In another embodiment, an offer may be made by selecting the button 3344. In this way, interested parties may identify qualified individuals for advancement. It should be noted that a seeker's experience information may also include a state experience path comprising their education history. As such, in one embodiment, the CLONER may clone not only a seeker's, e.g., career, path experience, but also their education path experience.

Advancement Taxonomy

Figure 34:
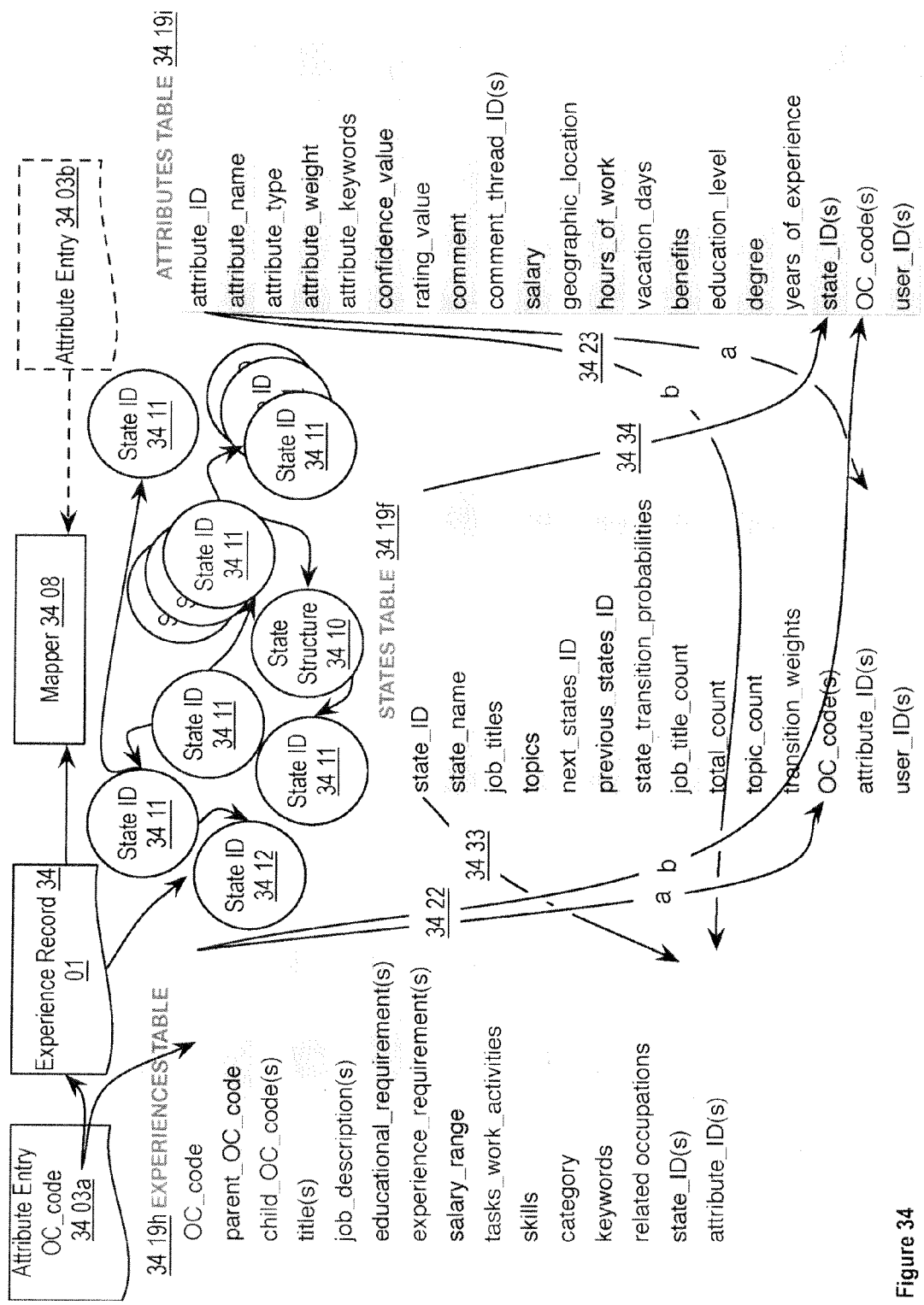
FIG. 34 is of a mixed block and data flow diagram illustrating advancement taxonomy embodiments for the CLONER.

FIG. 34 is of a mixed block and data flow diagram illustrating advancement taxonomy embodiments for the CLONER. In one embodiment, the CLONER may act as a "rosetta stone" as between a state structure (e.g., a states table) 3419f, 3410, attribute information (e.g., an attributes table) 3419j, and an experience structure 3419h. In one embodiment, the CLONER may take process experience structure records 3401 from the experiences table 3419h and map them to the appropriate state. Similarly, in one optional embodiment, the CLONER may take attribute records 3403b from the attributes table 3419j and map them to the appropriate state. As a consequence, the state structure and its states 3419f will be associated with both the experience structure and its Occupational Classification codes (hereinafter "OC_code") and with attribute information and its attribute_ID. An example of an OC_code is an Occupational Information Network (ONet) Standard Occupational Classification (SOC) code. Similarly, once an association is made for either experience structure 3422a or attribute information 3423a into a state 3419f, 3411, the CLONER may push (i.e., cause a database write of a value in a record field) a unique state_ID into the experience table 3433 and attribute table 3434. As such, with an experience table having a state_ID, it may use that state_ID to access the appropriate state in a state structure, and in turn, look up an associated attributes table entry; and vice versa for the attributes table being able to map to the experience structure. In another embodiment, the CLONER may push its own state_ID 3433 and an attributes_ID 3423b into the experience table, and its own state_ID 3434 and an OC_code 3422b into the attributes information 3419i so as to minimize database traversal. In another embodiment, simultaneous writes 3422, 3423, 3433, 3434 may take place.

In one embodiment, the CLONER 3408 may use the experience table's title, job description, skills, category, keyword and other field values as basis to discern and map to a matching state in the state structure, as has already been discussed in FIG. 15 et seq. In one embodiment, the CSE 3408 may similarly use values stored in the attributes table 3419j. However, in an alternative embodiment, attribute information 3419h and experience information 3419i may be related by being assigned by administrators who will fine tune said associations.

In another embodiment, attributes 3419i that are related to experience information 3419h assume a relationship that is discerned as between the experience information 3419h and a state 3419f. For example, a career system, such as Monster.com, may track attributes for various job listings that may be stored in a job listing table 36191 of FIG. 36. Such job listings often have numerous attributes and many other attributes may be discerned through statistical analysis of seekers that interacted with job listings. These job listings often have an OC_code, and as such may already be related to experiences 3619h of FIG. 36 in an experience structure 3619g of FIG. 36. As has already been discussed, the CLONER may associate unmapped experiences 3401, 3419h to states 3410, 3419f, and when so doing, it may relate attribute information 3419i that has already been associated to the unmapped experience 3419h to states in the same process. In another embodiment, structured resume information, i.e., experiences 3419h may be mapped to an OC codes as described in patent applications: Ser. No. 11/615,765 filed Dec. 22, 2006, entitled "APPARATUSES, METHODS AND SYSTEMS FOR AN INTERACTIVE EMPLOYMENT SEARCH PLATFORM," and Ser. No. 11/615,768 filed Dec. 22, 2006, entitled "A METHOD FOR INTERACTIVE EMPLOYMENT SEARCHING AND SKILLS SPECIFICATION,"; the entire contents of both applications is hereby expressly incorporated by reference.

Figure 36:
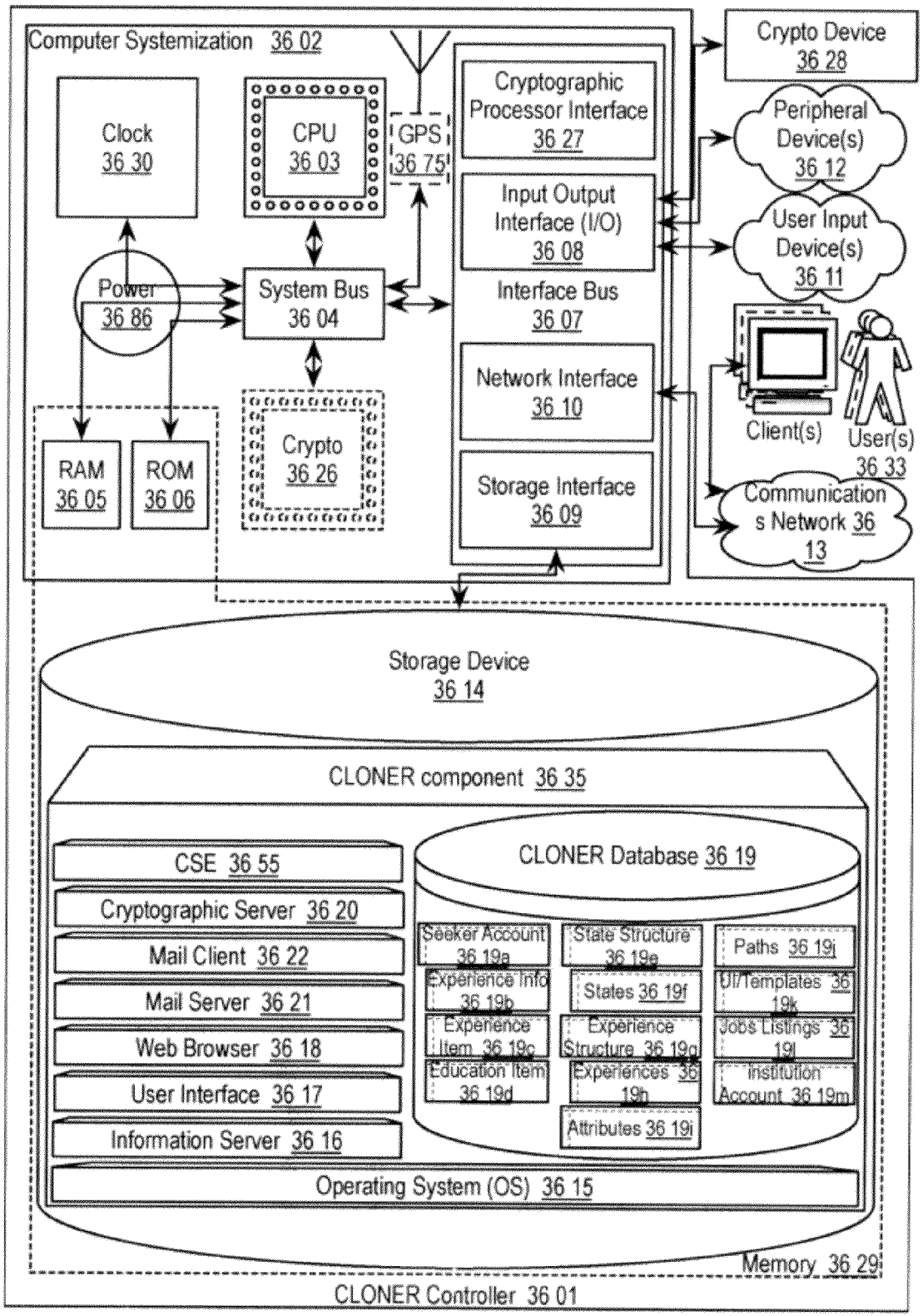
FIG. 36 is of a block diagram illustrating embodiments of the CLONER controller.

In one embodiment, the entities in FIG. 34 correspond to CLONER Controller's database component tables 3619, in that they correspond to FIG. 36's last two digit reference numbers, i.e., 3419h corresponds to table 3619h of FIG. 34.

Figure 35:
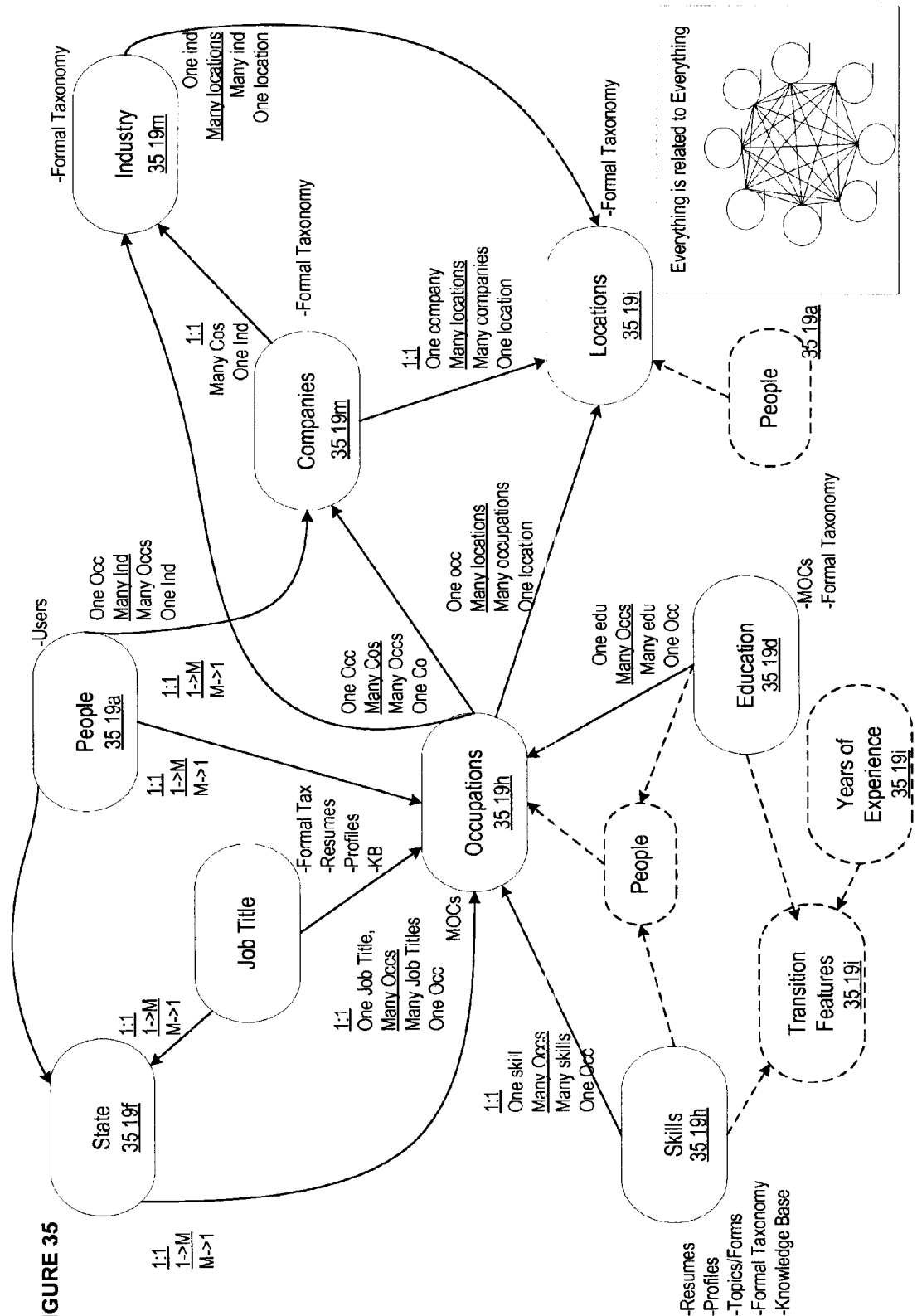
FIG. 35 is of a block diagram illustrating advancement taxonomy relationships and embodiments for the CLONER.

FIG. 35 is of a block diagram illustrating advancement taxonomy relationships and embodiments for the CLONER. Further to the base taxonomy introduced in FIG. 34, the CLONER may similarly forge relationships of various information bases through the state structure as shown in FIG. 35.

Similarly, all of the CLONER Controller's database component's interrelated database tables 3619 of FIG. 36 may be brought into association with the state structure as was done with the attribute information in FIG. 34. FIG. 35 shows one embodiment of some of the CLONER Controller's database component's tables cast into numerous types of connections and relationships (one to one, 1:1; one to many, 1->M, many to many, M->M; many to one, M->1) as between various structures and supporting database tables. It should be noted that in one embodiment, the CLONER database tables are all interconnected in a manner where every table is related to every other table.

In one embodiment, the entities in FIG. 35 correspond to CLONER Controller's database component tables 3619, in that they correspond to FIG. 36's last two digit reference numbers, i.e., 3519$m$ corresponds to table 3619$m$ of FIG. 34.

Cloner Controller

FIG. 36 illustrates inventive aspects of a CLONER controller 3601 in a block diagram. In this embodiment, the CLONER controller 3601 may serve to aggregate, process, store, search, serve, identify, instruct, generate, match, and/or facilitate interactions with a computer through advancement progression technologies, and/or other related data.

Typically, users, which may be people and/or other systems, may engage information technology systems (e.g., computers) to facilitate information processing. In turn, computers employ processors to process information; such processors 3603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CLONER controller 3601 may be connected to and/or communicate with entities such as, but not limited to: one or more users from user input devices 3611; peripheral devices 3612; an optional cryptographic processor device 3628; and/or a communications network 3613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CLONER controller 3601 may be based on computer systems that may comprise, but are not limited to, components such as: a computer systemization 3602 connected to memory 3629.

Computer Systemization

A computer systemization 3602 may comprise a clock 3630, central processing unit ("CPU(s)" and/or "processor(s)" (these terms are used interchangeable throughout the disclosure unless noted to the contrary)) 3603, a memory 3629 (e.g., a read only memory (ROM) 3606, a random access memory (RAM) 3605, etc.), and/or an interface bus 3607, and most frequently, although not necessarily, are all interconnected and/or communicating through a system bus 3604 on one or more (mother)board(s) 3602 having conductive and/or otherwise transportive circuit pathways through which instructions (e.g., binary encoded signals) may travel to effect communications, operations, storage, etc. Optionally, the computer systemization may be connected to an internal power source 3686. Optionally, a cryptographic processor 3626 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the CLONER controller and beyond through various interfaces. Should processing requirements dictate a greater amount speed and/or capacity, distributed processors (e.g., Distributed CLONER), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the CLONER may be achieved by implementing a microcontroller such as CAST's R8051XC2 microcontroller; Intel's MCS 51 (i.e., 8051 microcontroller); and/or the like. Also, to implement certain features of the CLONER, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CLONER component collection (distributed or otherwise) and/or features may be implemented via the microprocessor and/or via embedded components; e.g., via ASIC, coprocessor, DSP, FPGA, and/or the like. Alternately, some implementations of the CLONER may be implemented with embedded components that are configured and used to achieve a variety of features or signal processing.

Depending on the particular implementation, the embedded components may include software solutions, hardware solutions, and/or some combination of both hardware/software solutions. For example, CLONER features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the CLONER features. A hierarchy of programmable interconnects allow logic blocks to be interconnected as needed by the CLONER system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the CLONER may be developed on regular FPGAs and then migrated into a fixed version that more resembles ASIC implementations. Alternate or coordinating implementations may migrate CLONER controller features to a final ASIC instead of or in addition to FPGAs. Depending on the implementation all of the aforementioned embedded components and microprocessors may be considered the "CPU" and/or "processor" for the CLONER.

Power Source

The power source 3686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3686 is connected to at least one of the interconnected subsequent components of the CLONER thereby providing an electric current to all subsequent components. In one example, the power source 3686 is connected to the system bus component 3604. In an alternative embodiment, an outside power source 3686 is provided through a connection across the I/O 3608 interface. For example, a USB and/or IEEE 1394 connection carries both data and power across the connection and is therefore a suitable source of power.

Interface Adapters

Interface bus(ses) 3607 may accept, connect, and/or communicate to a number of interface adapters, conventionally although not necessarily in the form of adapter cards, such as but not limited to: input output interfaces (I/O) 3608, storage interfaces 3609, network interfaces 3610, and/or the like. Optionally, cryptographic processor interfaces 3627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3609 may accept, communicate, and/or connect to a number of storage devices such as, but not limited to: storage devices 3614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3610 may accept, communicate, and/or connect to a communications network 3613. Through a communications network 3613, the CLONER controller is accessible through remote clients 3633*b* (e.g., computers with web browsers) by users 3633*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CLONER), architectures may similarly be employed to pool, load balance, and/or otherwise increase the communicative bandwidth required by the CLONER controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3610 may be used to engage with various communications network types 3613. For example, multiple network interfaces may be employed to allow for the communication over broadcast, multicast, and/or unicast networks.

Input Output interfaces (I/O) 3608 may accept, communicate, and/or connect to user input devices 3611, peripheral devices 3612, cryptographic processor devices 3628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 3611 may be card readers, dongles, finger print readers, gloves, graphics tablets, joysticks, keyboards, mouse (mice), remote controls, retina readers, trackballs, trackpads, and/or the like.

Peripheral devices 3612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the CLONER controller may be embodied as an embedded, dedicated, and/or monitor-less (i.e., headless) device, wherein access would be provided over a network interface connection.

Cryptographic units such as, but not limited to, microcontrollers, processors 3626, interfaces 3627, and/or devices 3628 may be attached, and/or communicate with the CLONER controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 3629. However, memory is a fungible technology and resource, thus, any number of memory embodiments may be employed in lieu of or in concert with one another. It is to be understood that the CLONER controller and/or a computer systemization may employ various forms of memory 3629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 3629 will include ROM 3606, RAM 3605, and a storage device 3614. A storage device 3614 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); and/or other devices of the like. Thus, a computer systemization generally requires and makes use of memory.

Component Collection

The memory 3629 may contain a collection of program and/or database components and/or data such as, but not limited to: operating system component(s) 3615 (operating system); information server component(s) 3616 (information server); user interface component(s) 3617 (user interface); Web browser component(s) 3618 (Web browser); database(s) 3619; mail server component(s) 3621; mail client component(s) 3622; cryptographic server component(s) 3620 (cryptographic server); CSE component(s) 3655; the CLONER component(s) 3635; and/or the like (i.e., collectively a component collection). These components may be stored and accessed from the storage devices and/or from storage devices accessible through an interface bus. Although non-conventional program components such as those in the component collection, typically, are stored in a local storage device 3614, they may also be loaded and/or stored in memory such as: peripheral devices, RAM, remote storage facilities through a communications network, ROM, various forms of memory, and/or the like.

Operating System

The operating system component 3615 is an executable program component facilitating the operation of the CLONER controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NTNista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CLONER controller to communicate with other entities through a communications network 3613. Various communication protocols may be used by the CLONER controller as a subcarrier transport mechanism for interaction, such as, but not limited to: multicast, TCP/IP, UDP, unicast, and/or the like.

Information Server

An information server component 3616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CLONER controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CLONER database 3619, operating systems, other program components, user interfaces, Web browsers, and/or the like.

Access to the CLONER database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CLONER. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CLONER as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XPNista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 3617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3618 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the CLONER enabled nodes. The combined application may be nugatory on systems employing standard Web browsers.

Mail Server

A mail server component 3621 is a stored program component that is executed by a CPU 3603. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CLONER.

Access to the CLONER mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3622 is a stored program component that is executed by a CPU 3603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3620 is a stored program component that is executed by a CPU 3603, cryptographic processor 3626, cryptographic processor interface 3627, cryptographic processor device 3628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CLONER may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/ or facilities of the like. The cryptographic component supports encryption schemes allowing for the secure transmission of information across a communications network to enable the CLONER component to engage in secure transactions if so desired. The cryptographic component facilitates the secure accessing of resources on the CLONER and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CLONER Database

The CLONER database component 3619 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CLONER database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the CLONER database is implemented as a data-structure, the use of the CLONER database 3619 may be integrated into another component such as the CLONER component 3635. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3619 includes several tables 3619a-m (wherein the first listed field in each table is the key field and all fields with an "ID" suffix are fields having unique values), as follows:

A seeker_profiles table 3619a may include fields such as, but not limited to: user_ID, name, address, contact_info, preferences, friends, status, user_description, attributes, experience_info_ID, path_ID(s), attribute_ID(s), and/or the like.

A seeker_experience table (aka "experience" or "resume" table) 3619b may include fields such as, but not limited to: experience_info_ID, experience_item_ID(s), education_item_ID(s), resume_data, skills, awards, honors, languages, current_salary_prefrences, user_ID(s), path_ID(s), and/or the like.

A experience_item table 3619c may include fields such as, but not limited to: experience_item_ID, institution_ID, job_title, job_description, job_dates, job_salary, skills, awards, honors, satisfaction_ratings, state_ID, OC_code(s), attribute_ID(s), and/or the like.

A education_item table 3619d may include fields such as, but not limited to: education_item_ID, institution_ID, education_degre_subject_matter, education_item_description, education_degree, education_item dates, skills, awards, honors, satisfaction_ratings, state_ID, attribute_ID(s), and/or the like.

A state_structure table 3619e may include fields such as, but not limited to: state_structure_ID, state_structure_data, state_ID(s), and/or the like.

A states table 3619f may include fields such as, but not limited to: state_ID, state_name, job_titles, topics, next_states_ID, previous_states_ID, state_transition_probabilities, job_title_count, total_count, topic_count, transition_weights, OC_code(s), attribute_ID(s), user_ID(s), and/or the like. A experience_structure table 3619g may include fields such as, but not limited to: experience_structure_ID, experience_structure_data, OC_code(s), and/or the like.

A experiences table (aka "OC" table) 3619h may include fields such as, but not limited to: OC_code, parent_OC_code, child_OC_code(s), title(s), job_description(s), educational_requirement(s), experience_requirement(s), salary_range, tasks_work_activities, skills, category, keywords, related occupations, state_ID(s), attribute_ID(s), and/or the like.

An attributes table 3619i may include fields such as, but not limited to: attribute_ID, attribute_name, attribute_type, attribute_weight, attribute_keywords, confidence_value, rating_value, comment, comment_thread_ID(s), salary, geographic_location, hours_of_work, vacation_days, benefits, attribute_transition_value, attribute_transition_weight, education_level, degree, years_of_experience, state_ID(s), OC_code(s), user ID(s), and/or the like.

A paths table 3619j may include fields such as, but not limited to: path_ID, state_path_sequence, state_ID(s), attribute_ID(s), user_ID(s), attribute_key_terms, and/or the like.

A templates table 3619k may include fields such as, but not limited to: template_ID, state_ID, job_ID, employer_ID, attribute_ID, template data, and/or the like.

A job_listing table 3619l may include fields such as, but not limited to: job_listing_ID, institution_ID, job_title, job_description, educational_requirements, experience_requirements, salary_range, tasks_work_activities, skills, category, keywords, related occupations, OC_code, state_ID, attribute_ID(s), user_ID(s), UI_ID(s), and/or the like.

A institution table (aka "employer" table) 3619m may include fields such as, but not limited to: institution_ID, name, address, contact_info, preferences, status, industry sector, description, experience_ID(s), template_ID(s), state_ID(s), attributes, attribute_ID(s), and/or the like.

In one embodiment, the CLONER database may interact with other database systems. For example, employing a distributed database system, queries and data access by search CLONER component may treat the combination of the CLONER database, an integrated data security layer database as a single database entity.

In one embodiment, user programs may contain various user interface primitives, which may serve to update the CLONER. Also, various accounts may require custom database tables depending upon the environments and the types of clients the CLONER may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3619a-m. The CLONER may be configured to keep track of various settings, inputs, and parameters via database controllers.

The CLONER database may communicate to and/or with other components in a component collection, including itself, and/or facilities of the like. Most frequently, the CLONER database communicates with the CLONER component, other program components, and/or the like. The database may contain, retain, and provide information regarding other nodes and data.

The CLONERs

The CLONER component 3635 is a stored program component that is executed by a CPU. In one embodiment, the CLONER component incorporates any and/or all combinations of the aspects of the CLONER that was discussed in the previous figures. As such, the CLONER affects accessing, obtaining and the provision of information, services, transactions, and/or the like across various communications networks.

The CLONER component enables the management of advancement path structuring, and/or the like and use of the CLONER.

The CLONER component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java®, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the CLONER server employs a cryptographic server to encrypt and decrypt communications. The CLONER component may communicate to and/or with other components in a component collection, including itself, and/or facilities of the like. Most frequently, the CLONER component communicates with the CLONER database, operating systems, other program components, and/or the like. The CLONER may contain, communicate, generate, obtain, and/or provide program component, system, user, and/or data communications, requests, and/or responses.

The CSEs

The CSE component 3655 is a stored program component that is executed by a CPU. Similarly as discussed regarding CLONER in 3635, in one embodiment, the CSE component incorporates any and/or all combinations of the aspects of the CSE that was discussed in the previous FIGS. 1-14B. The CSE component may communicate to and/or with other components in a component collection, including itself, and/or facilities of the like. Most frequently, the CSE component communicates with the CLONER database, particularly the state structure database table, operating systems, other program components, and/or the like. The CSE may contain, communicate, generate, obtain, and/or provide program component, system, user, and/or data communications, requests, and/or responses. It should be noted in one embodiment, the CSE component may have its own database component, including a state structure table. As such, the CSE affects accessing, generation obtaining and the provision of information, services, advancement states, transactions, and/or the like across various communications networks.

Distributed CLONERs

The structure and/or operation of any of the CLONER node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CLONER controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

Additional alternative embodiments of the CLONER include:

100. An experience sequence frequency analyzing processor-implemented method, comprising:
[statistically analyzing a plurality of experience sequences to yield a state structure comprising a plurality of states and topics]
receiving an experience data structure comprising at least a title, a description, and information indicative of the data structure's sequential placement in an experience sequence;
mapping through a state structure the experience data structure to an experience state to yield an ordered sequence of experience states;
updating at least one experience state in the state structure with the results of the mapping; storing the updated at least one experience state.

101. The method of claim 100, wherein the updated at least one experience state is stored in the state structure.

102. The method of claim 100, wherein the updated at least one experience state is stored in queue for subsequent use.

103. A statistical career state structure updating processor-implemented method, comprising:
receiving resume data via a structured web form, the resume data including a sequence of jobs, wherein each job comprises a job title and a job description;
comparing the job title for each job to job title listings for a plurality of job states within a state structure to find a first set of job states having matching job titles;
parsing key terms from the job description for each job;
comparing key terms for each job to topic listings for job states in the first set of job states within the state structure to find a second set of job states having matching topics;
mapping each job in the sequence of jobs to a unique job state in the second set of job states within the state structure to yield a sequence of job states;
incrementing a first counter associated with each job state and a connected job state in the sequence of job states;
incrementing a second counter associated with a total number of updates to a job state data structure associated with each job state;
computing a ratio between a value of the first counter and a value of the second counter;
updating the job state data structure associated with each job state with the ratio in association with the connected job state; and
storing the job state data structure as part of the state structure in a database.

104. An experience trend structure updating processor-implemented method, comprising:
receiving an experience summary data structure comprising at least an experiential sequence, the experiential sequence comprising an ordered sequence of experiences;
mapping through an experience trend structure each experience of the ordered sequence of experiences to an experience state to yield an ordered sequence of experience states;
updating experience state data structures within the experience trend structure corresponding to each experience state of the ordered sequence of experience states based on the each experience state and connected experience states in the ordered sequence of experience states; and
persisting the experience state data structures as part of the experience trend structure in a database.

105. The method of claim 104, wherein the experience summary data structure comprises resume data.

106. The method of claim 105, wherein the resume data is received as entries to a structured form.

107. The method of claim 105, wherein the resume data is received as parsed data from a free-form document.

108. The method of claim 104, wherein each experience of the ordered sequence of experiences comprises at least a job title and a description.

109. The method of claim 108, wherein mapping further comprises:
for each experience of the ordered sequence of experiences,
comparing the job title to state record job titles associated with experience states in the experience trend structure to find a first set of matching experience states; and
comparing the description to state record topics associated with the first set of matching experience states to find a second set of matching experience states within the experience trend structure.

110. The method of claim 109, wherein the comparing the description only occurs if there are more than one state in the first set of matching pre-set experience states.

111. The method of claim 109, wherein comparing the description further comprises:
extracting at least one key term from the description; and
comparing the at least one key term to state record topics in the experience trend structure associated with the first set of matching experience states to find a second set of matching experience states.

112. The method of claim 109, further comprising:
performing state disambiguation if there are more than one state in the second set of matching experience states.

113. The method of claim 112, wherein the state disambiguation comprises a random selection among states of the second set of matching experience states.

114. The method of claim 112, wherein the state disambiguation comprises:
providing states in the second set of matching experience states for selection by a user; and
receiving a selection of a state from the second set of matching experience states.

115. The method of claim 104, wherein mapping further comprises:
    comparing each experience of the ordered sequence of experiences to an experience state table in the experience trend structure to determine a corresponding experience state.

116. The method of claim 104, wherein the connected experience states comprise a nearest previous experience state and a nearest next experience state.

117. The method of claim 104, wherein the connected experience states comprise all previous experience states in the ordered sequence of experience states.

118. The method of claim 104, wherein the experience summary further comprises a plurality of attributes, and further comprising:
    mapping through the experience trend structure each attribute to an attribute state; and
    wherein updates to the experience state data structures within the experience trend structure corresponding to each experience state of the ordered sequence of experience states based on the each experience state and connected experience states in the ordered sequence of experience states are associated with the plurality of attribute states.

119. The method of claim 118, wherein the plurality of attributes comprise at least a salary level, a location, and an employment benefit.

120. The method of claim 104, wherein updating experience state data structures further comprises:
    incrementing a first counter associated with the each experience state and a connected experience state;
    incrementing a second counter associated with a total number of experience summary data structures used to update the experience state data structure associated with the each experience state;
    computing a ratio between a value of the first counter and a value of the second counter; and
    storing the ratio in association with the each pre-set experience state and a connected pre-set experience state in the experience trend model.

121. An experience trend model generating apparatus, comprising:
    a processor;
    a memory in communication with the processor and containing program modules executable by the processor, wherein the program modules comprise:
        receive an experience summary data structure comprising at least an experiential sequence, the experiential sequence comprising an ordered sequence of experiences;
        map through an experience trend structure each experience of the ordered sequence of experiences to an experience state to yield an ordered sequence of experience states;
        update experience state data structures within the experience trend structure corresponding to each experience state of the ordered sequence of experience states based on the each experience state and connected experience states in the ordered sequence of experience states; and
        persist the experience state data structures as part of the experience trend structure in a database.

122. An experience trend model generating system, comprising:
    means to receive an experience summary data structure comprising at least an experiential sequence, the experiential sequence comprising an ordered sequence of experiences;
    means to map through an experience trend structure each experience of the ordered sequence of experiences to an experience state to yield an ordered sequence of experience states;
    means to update experience state data structures within the experience trend structure corresponding to each experience state of the ordered sequence of experience states based on the each experience state and connected experience states in the ordered sequence of experience states; and
    means to persist the experience state data structures as part of the experience trend structure in a database.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. An objective advancement cloning processor-implemented method, comprising:
    identifying a source for cloning;
    determining if an objective advancement state path exists for the source;
    generating an objective advancement state path from unanalyzed experience information stored in the source's profile, if no objective advancement state path exists for the source;
    querying a state structure with the source's objective advancement state path for targets;
    providing a target resulting from the query of the state structure, wherein the target's objective advancement state path matches the source's objective advancement state path.

2. The method of claim 1, further, comprising:
    ranking query results from querying the state structure.

3. The method of claim 2, wherein the provided target is a best match based on ranking criteria.

4. The method of claim 2, wherein the provided target is a best match based on attribute filtering criteria.

5. An objective advancement cloning processor-implemented method, comprising:
    querying a database for unanalyzed advancement seeker experience information from a seeker profile;
    enqueueing unanalyzed experience information record returned from the query;
    generating an objective advancement state path for each unanalyzed experience information record;
    storing the generated objective advancement state path in the seeker profile;
    searching the database for generated objective advancement state paths for cloning.

6. An objective advancement cloning processor-implemented system, comprising:
    means to identify a source for cloning;
    means to determine if an objective advancement state path exists for the source;
    means to generate an objective advancement state path from unanalyzed experience information stored in the source's profile, if no objective advancement state path exists for the source;
    means to query a state structure with the source's objective advancement state path for targets;
    means to provide a target result from the query of the state structure, wherein the target's objective advancement state path matches the source's objective advancement state path.

7. The system of claim 6, further, comprising:
    means to rank query results from query the state structure.

8. The system of claim 7, wherein the provided target is a best match based on rank criteria.

9. The system of claim 7, wherein the provided target is a best match based on attribute filter criteria.

10. An objective advancement cloning processor-implemented system, comprising:
    means to query a database for unanalyzed advancement seeker experience information from a seeker profile;
    means to enqueue unanalyzed experience information record returned from the query;
    means to generate an objective advancement state path for each unanalyzed experience information record;
    means to store the generated objective advancement state path in the seeker profile;
    means to search the database for generated objective advancement state paths for cloning.

11. An objective advancement cloning processor-readable non-transitory medium storing a plurality of processing instructions, comprising issuable instructions by a processor to:
    identify a source for cloning;
    determine if an objective advancement state path exists for the source;
    generate an objective advancement state path from unanalyzed experience information stored in the source's profile, if no objective advancement state path exists for the source;
    query a state structure with the source's objective advancement state path for targets;
    provide a target result from the query of the state structure, wherein the target's objective advancement state path matches the source's objective advancement state path.

12. The medium of claim 11, further, comprising:
    rank query results from query the state structure.

13. The medium of claim 12, wherein the provided target is a best match based on rank criteria.

14. The medium of claim 12, wherein the provided target is a best match based on attribute filter criteria.

15. An objective advancement cloning processor-readable non-transitory medium storing a plurality of processing instructions, comprising issuable instructions by a processor to:
    query a database for unanalyzed advancement seeker experience information from a seeker profile;
    enqueue unanalyzed experience information record returned from the query;
    generate an objective advancement state path for each unanalyzed experience information record;
    store the generated objective advancement state path in the seeker profile;
    search the database for generated objective advancement state paths for cloning.

16. An objective advancement cloning apparatus, comprising:
    a memory;
    a processor disposed in communication with said memory, and configured to issue a plurality of processing instructions stored in the memory, wherein the processor issues instructions to:
    identify a source for cloning;
    determine if an objective advancement state path exists for the source;
    generate an objective advancement state path from unanalyzed experience information stored in the source's profile, if no objective advancement state path exists for the source;
    query a state structure with the source's objective advancement state path for targets;
    provide a target result from the query of the state structure, wherein the target's objective advancement state path matches the source's objective advancement state path.

17. The apparatus of claim 16, further, comprising:
    rank query results from query the state structure.

18. The apparatus of claim 17, wherein the provided target is a best match based on rank criteria.

19. The apparatus of claim 17, wherein the provided target is a best match based on attribute filter criteria.

20. An objective advancement cloning apparatus, comprising:

a memory;

a processor disposed in communication with said memory, and configured to issue a plurality of processing instructions stored in the memory, wherein the processor issues instructions to:

query a database for unanalyzed advancement seeker experience information from a seeker profile;

enqueue unanalyzed experience information record returned from the query;

generate an objective advancement state path for each unanalyzed experience information record;

store the generated objective advancement state path in the seeker profile;

search the database for generated objective advancement state paths for cloning.

* * * * *

UNITED STATES PATENT AND TRADEMARK OFFICE
CERTIFICATE OF CORRECTION

| | | |
|---|---|---|
| PATENT NO. | : 8,244,551 B1 | Page 1 of 1 |
| APPLICATION NO. | : 12/427736 | |
| DATED | : August 14, 2012 | |
| INVENTOR(S) | : Matthew Mund | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 460 days.

Signed and Sealed this
Fifteenth Day of January, 2013

David J. Kappos
*Director of the United States Patent and Trademark Office*